United States Patent
Tsuboi et al.

(10) Patent No.: US 8,320,035 B2
(45) Date of Patent: Nov. 27, 2012

(54) MICRO-MOVABLE DEVICE

(75) Inventors: Osamu Tsuboi, Kawasaki (JP); Norinao Kouma, Kawasaki (JP); Tsuyoshi Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 685 days.

(21) Appl. No.: 12/458,601

(22) Filed: Jul. 16, 2009

(65) Prior Publication Data

US 2010/0067083 A1 Mar. 18, 2010

(30) Foreign Application Priority Data

Sep. 18, 2008 (JP) ................................. 2008-239709

(51) Int. Cl.
*G02B 26/08* (2006.01)
(52) U.S. Cl. .................................................. 359/221.2
(58) Field of Classification Search ............... 359/198.1, 359/199.1, 199.4, 200.8, 221.2
See application file for complete search history.

(56) References Cited

U.S. PATENT DOCUMENTS

| | | | |
|---|---|---|---|
| 7,426,066 B2 * | 9/2008 | Fu et al. ..................... 359/199.1 |
| 7,466,474 B2 * | 12/2008 | Jung et al. ..................... 359/290 |
| 7,474,165 B2 * | 1/2009 | Kato et al. ..................... 331/176 |
| 7,515,323 B2 * | 4/2009 | Mizoguchi ................. 359/224.1 |
| 7,573,022 B2 * | 8/2009 | Choo et al. ..................... 250/234 |
| 7,573,626 B2 * | 8/2009 | Urakawa ..................... 359/224.1 |
| 7,605,966 B2 * | 10/2009 | Tani et al. .................. 359/224.1 |
| 7,864,390 B2 * | 1/2011 | Mizumoto ................. 359/199.1 |
| 8,035,874 B1 * | 10/2011 | Fu .............................. 359/199.2 |
| 8,049,944 B2 * | 11/2011 | Moidu ....................... 359/199.4 |
| 2006/0061850 A1 * | 3/2006 | Fu et al. ......................... 359/223 |
| 2007/0063614 A1 * | 3/2007 | Tsuboi et al. ................. 310/309 |
| 2008/0225363 A1 * | 9/2008 | Saitoh et al. .................. 359/199 |
| 2008/0285044 A1 * | 11/2008 | Sin et al. ....................... 356/452 |
| 2008/0285103 A1 * | 11/2008 | Mizumoto ..................... 359/199 |
| 2009/0153935 A1 * | 6/2009 | Kajino ........................ 359/221.2 |
| 2009/0180168 A1 * | 7/2009 | Kurozuka et al. ........... 359/221.2 |

FOREIGN PATENT DOCUMENTS

| | | |
|---|---|---|
| JP | 2003-19700 | 1/2003 |
| JP | 2004-341364 | 12/2004 |
| JP | 2006-72252 | 3/2006 |

* cited by examiner

*Primary Examiner* — Frank Font
(74) *Attorney, Agent, or Firm* — Staas & Halsey LLP

(57) ABSTRACT

A micro-movable device includes a frame, a movable section including a body section, and a torsion coupling section for coupling the frame with the movable section to define an axis of oscillation of the movable section, wherein the frame includes a first extending portion and a second extending portion that are spaced apart from each other in a direction parallel to the axis and extend along the body section, and oppose the body section via a gap.

12 Claims, 48 Drawing Sheets

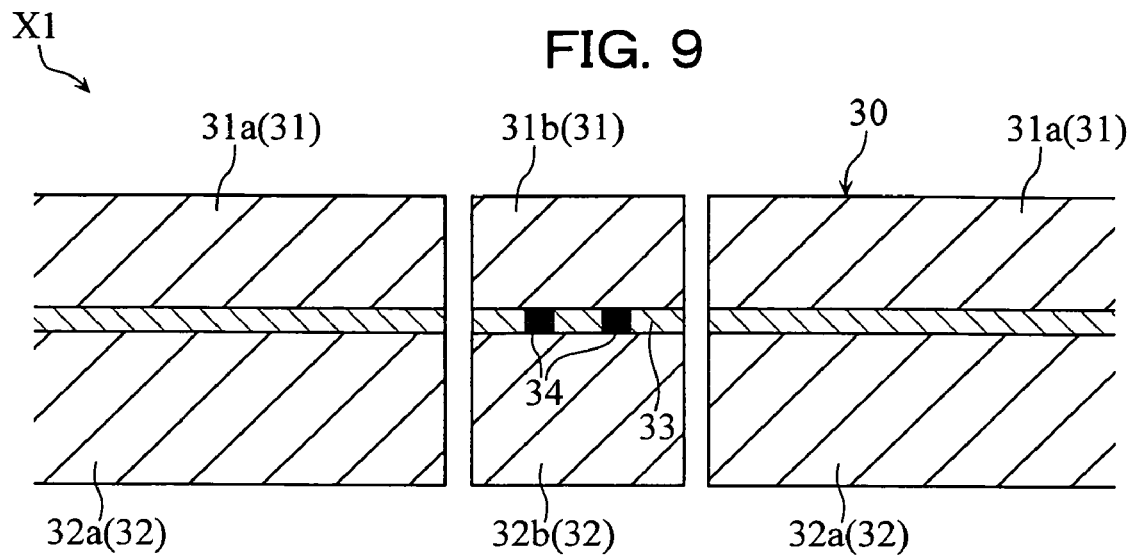
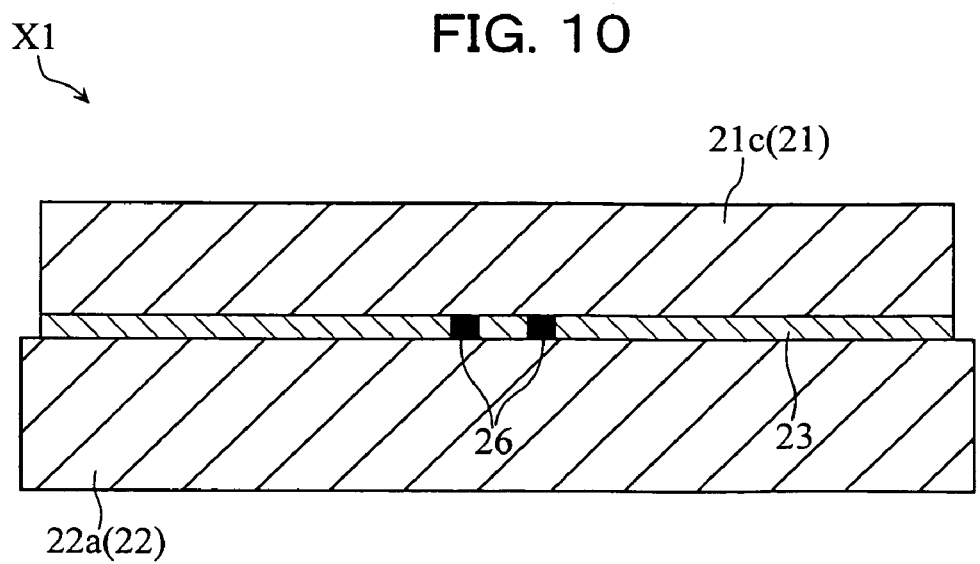

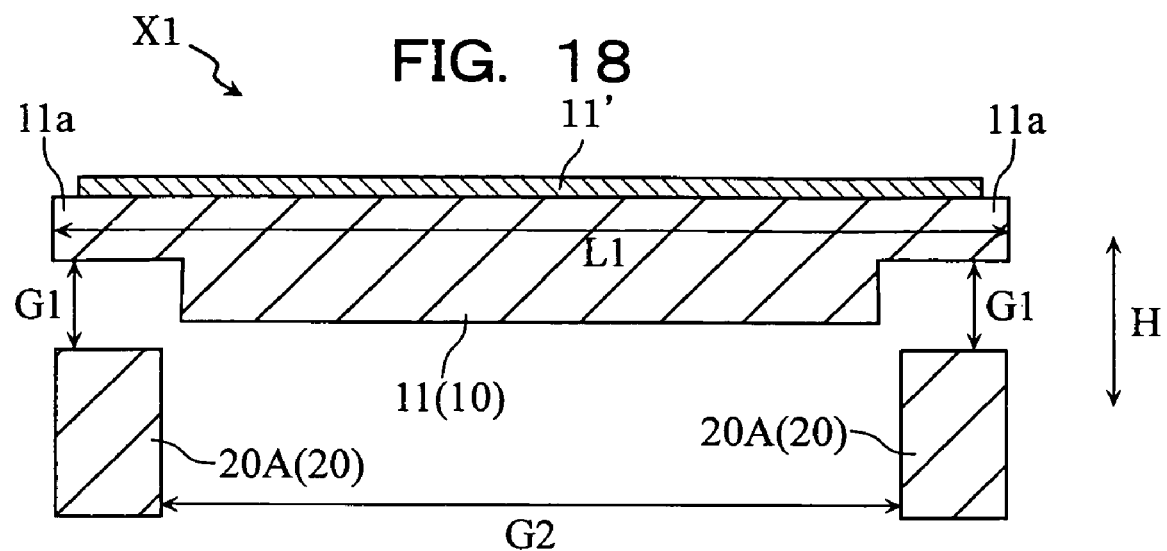

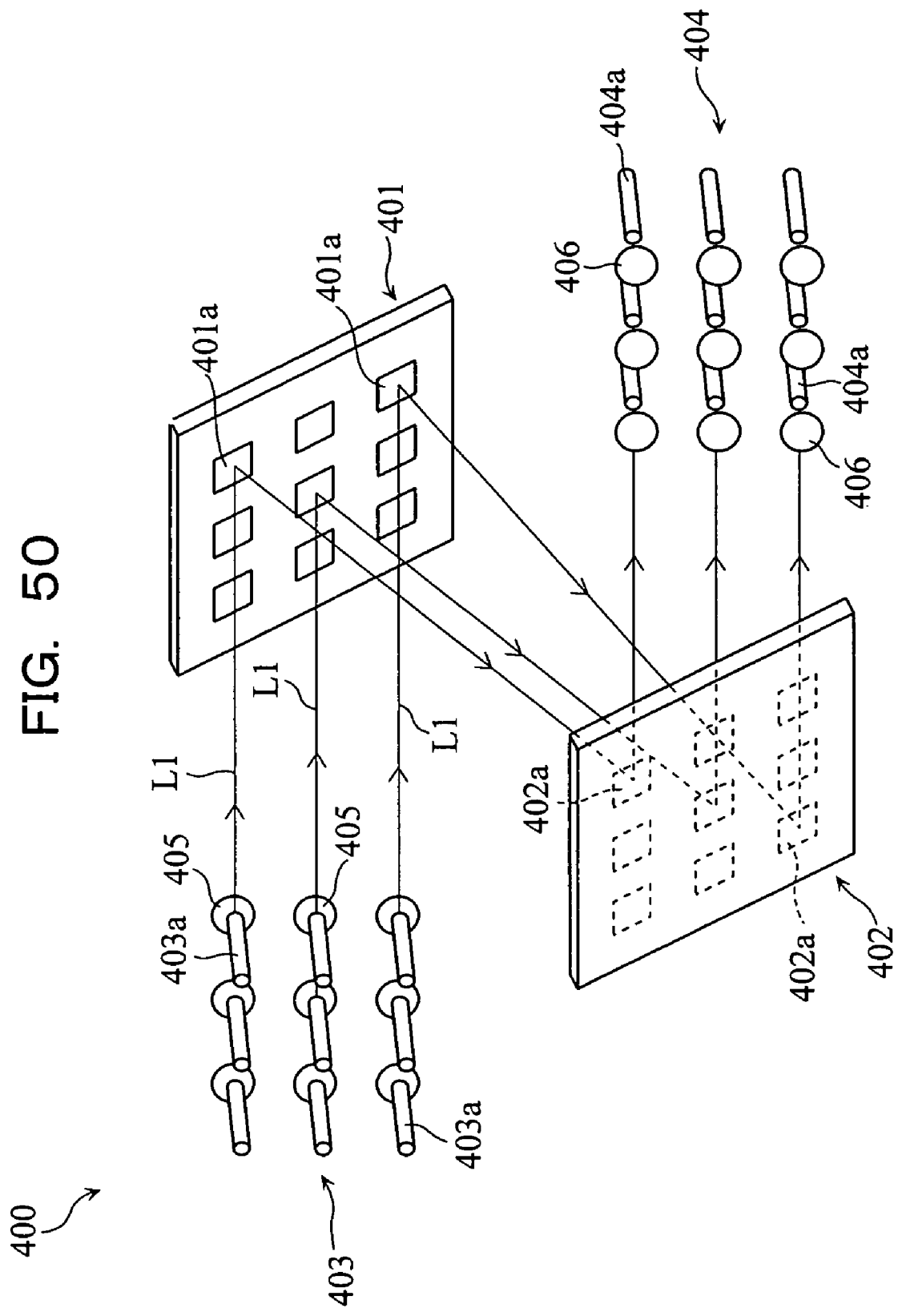

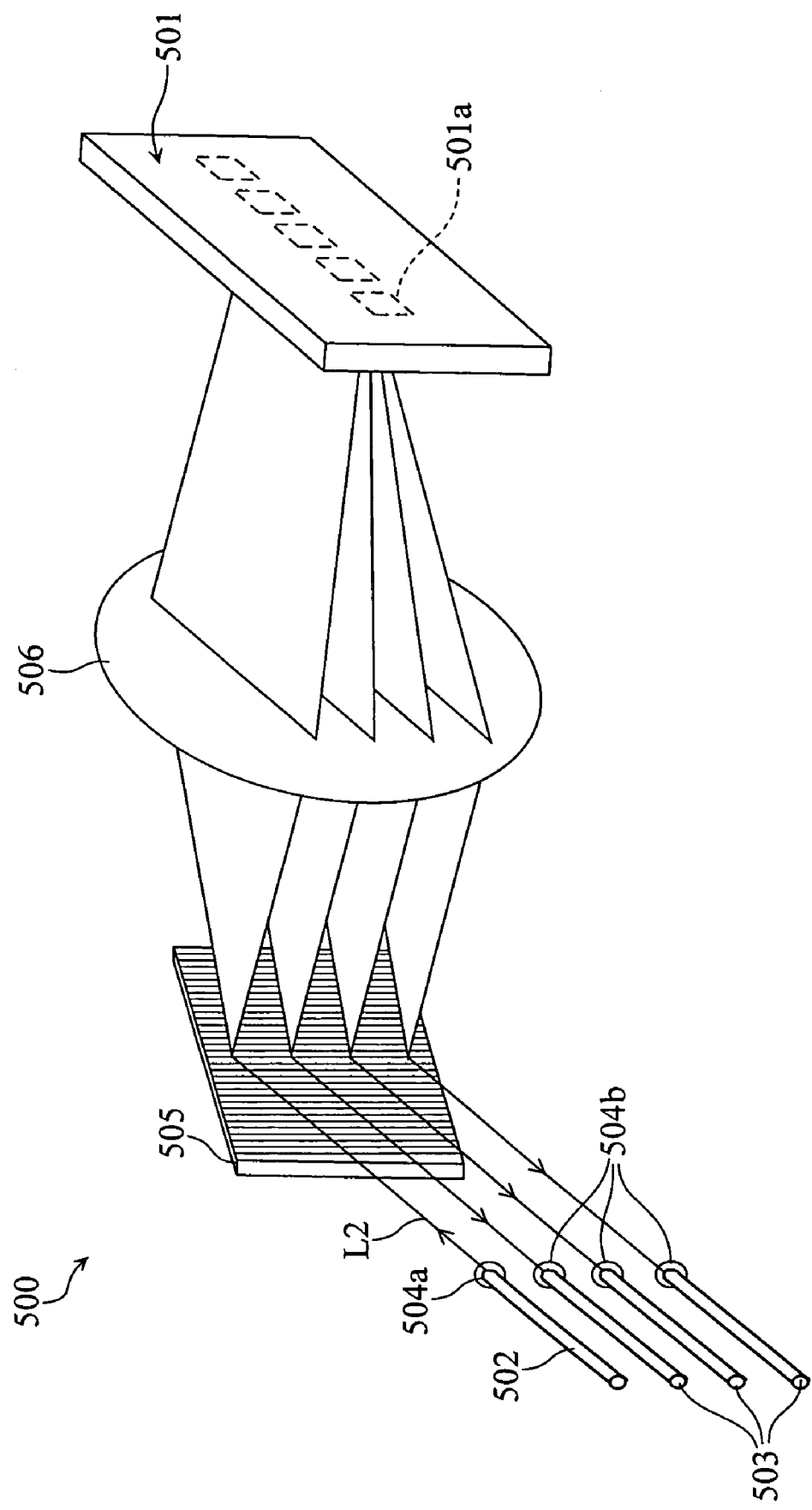

MICRO-MOVABLE DEVICE

CROSS-REFERENCE TO RELATED APPLICATION

This application is based upon and claims the benefit of priority of the prior Japanese Patent Application No. 2008-239709, filed on Sep. 18, 2008, the entire contents of which are incorporated herein by reference.

FIELD

The embodiments discussed herein are related to a micro-movable device including a micro-movable section.

BACKGROUND

In recent years, devices including a micro structure formed using a micro machining technique has been applied in a variety of technical fields. Micro mirror devices, angular velocity sensors, and acceleration sensors are known as examples of micro-movable devices that include a micro-movable section. Micro mirror devices are used as light reflection functions in optical communication techniques and optical disks. Angular velocity sensors and acceleration sensors are used in camera shake prevention functions for video cameras, mobile phones with cameras, car navigation systems, airbag release timing systems, and attitude control systems for a car, a robot, or the like. Japanese Patent Laid-Open No. 2003-19700, Japanese Patent Laid-Open No. 2004-341364, and Japanese Patent Laid-Open No. 2006-72252 disclose micro oscillating devices.

SUMMARY

According to an aspect of the embodiment, a micro-movable device includes: a frame; a movable section including a body section; and a torsion coupling section for coupling the frame with the movable section to define a first axis of oscillation of the movable section. The frame includes a first extending portion and a second extending portion that are spaced apart from each other in a direction parallel to the first axis and extend along the body section, and oppose the body section via a.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a cross-sectional view along the line IX-IX in FIG. 2;

FIG. 10 is a cross-sectional view along the line X-X in FIG. 2;

FIG. 18 is a cross-sectional view along the line XVIII-XVIII in FIG. 16;

FIG. 50 is a diagram of an optical switching apparatus according to a fourth embodiment; and FIG. 51 is a diagram of an optical switching apparatus according to a fifth embodiment.

DESCRIPTION OF EMBODIMENTS

Figure 1:
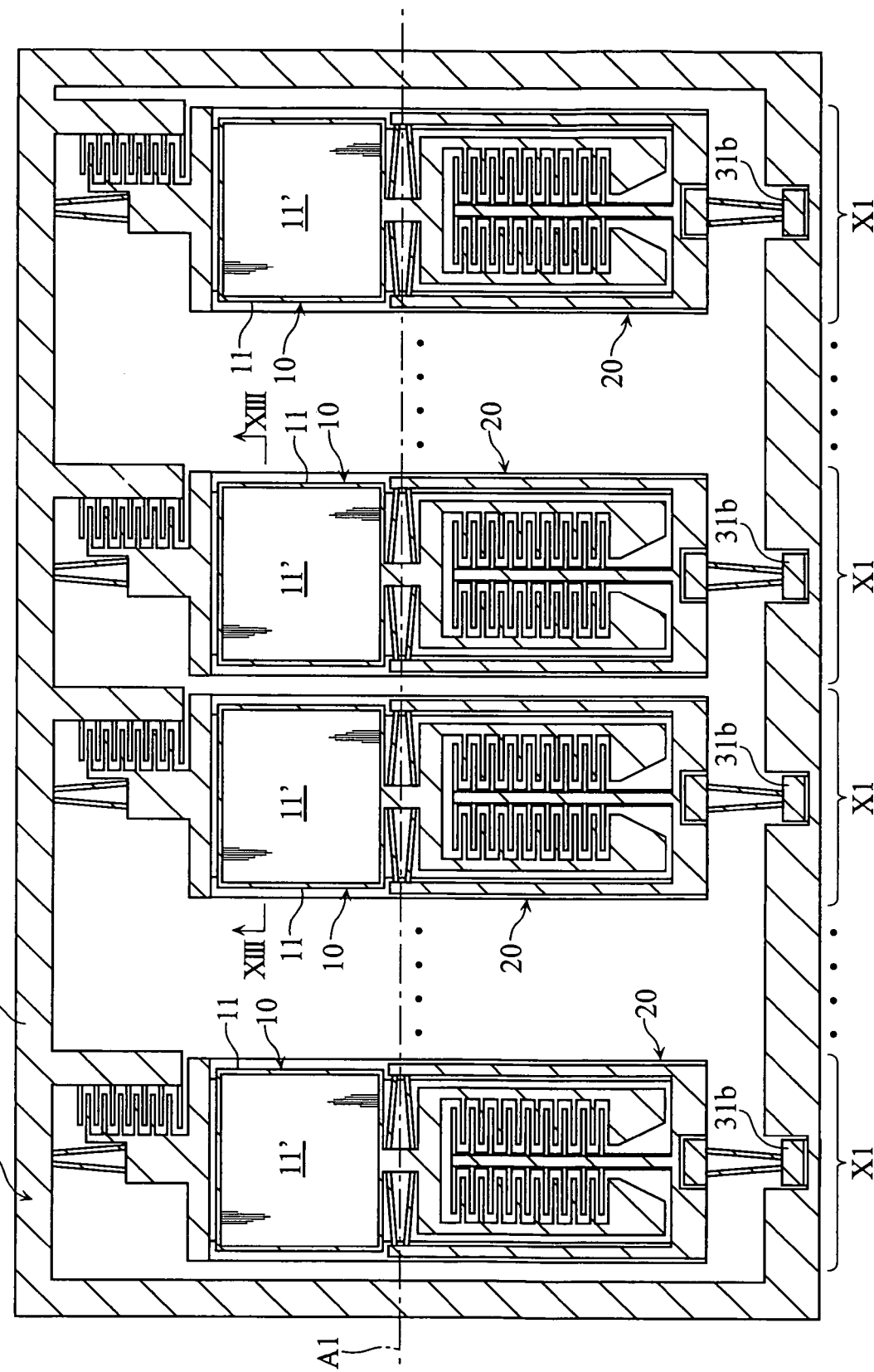
FIG. 1 is a plan view of a micro oscillating device array according to a first embodiment.

FIG. 1 is a plan view of a micro oscillating device array Y1 according to a first embodiment. The micro oscillating device array Y1 includes a plurality of micro oscillating devices X1. The micro oscillating device is an example of a micro-movable device.

Figure 2:
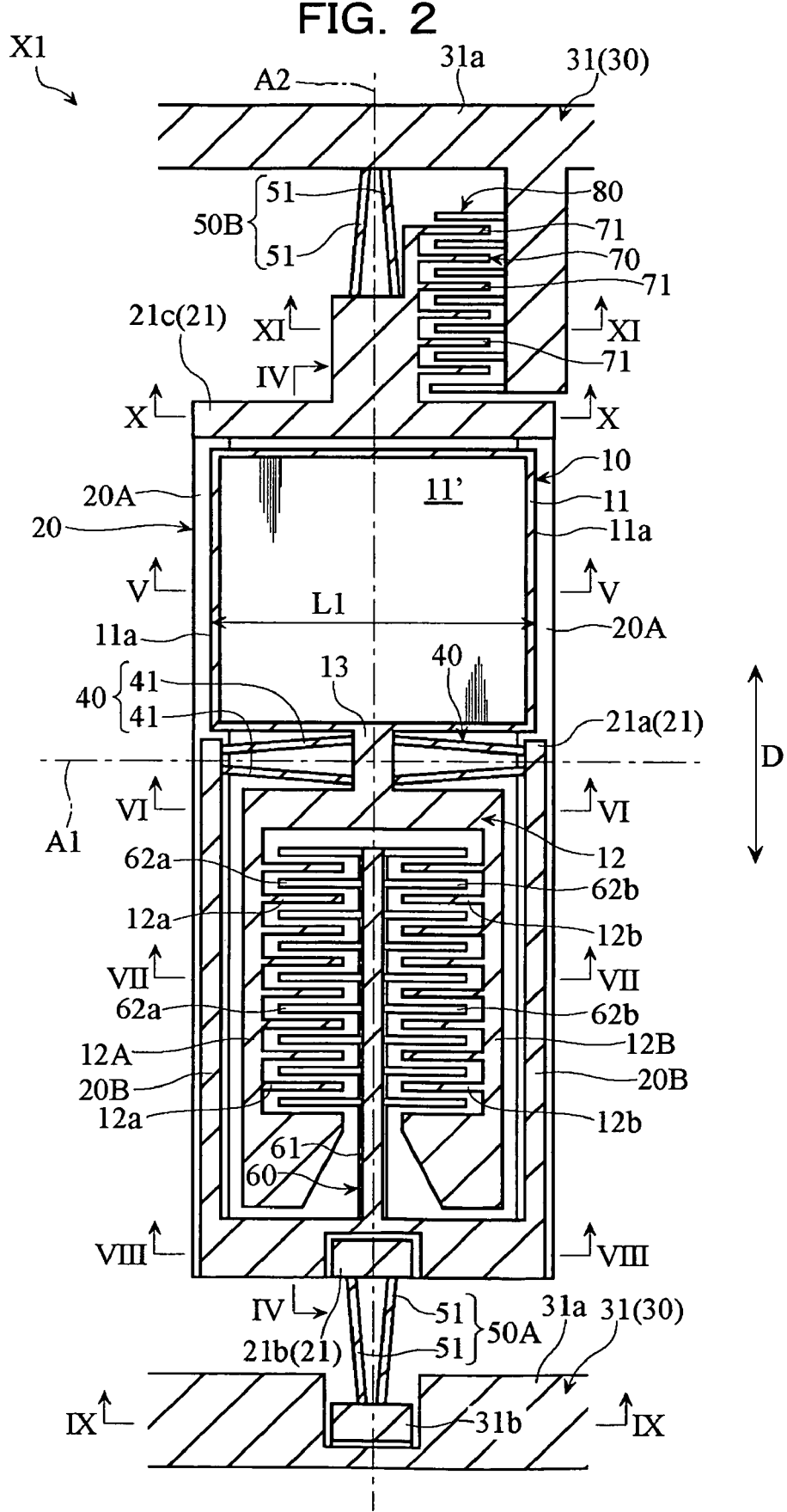
FIG. 2 is a plan view of the micro oscillating device included in the micro oscillating device array illustrated in FIG. 1.
Figure 3:
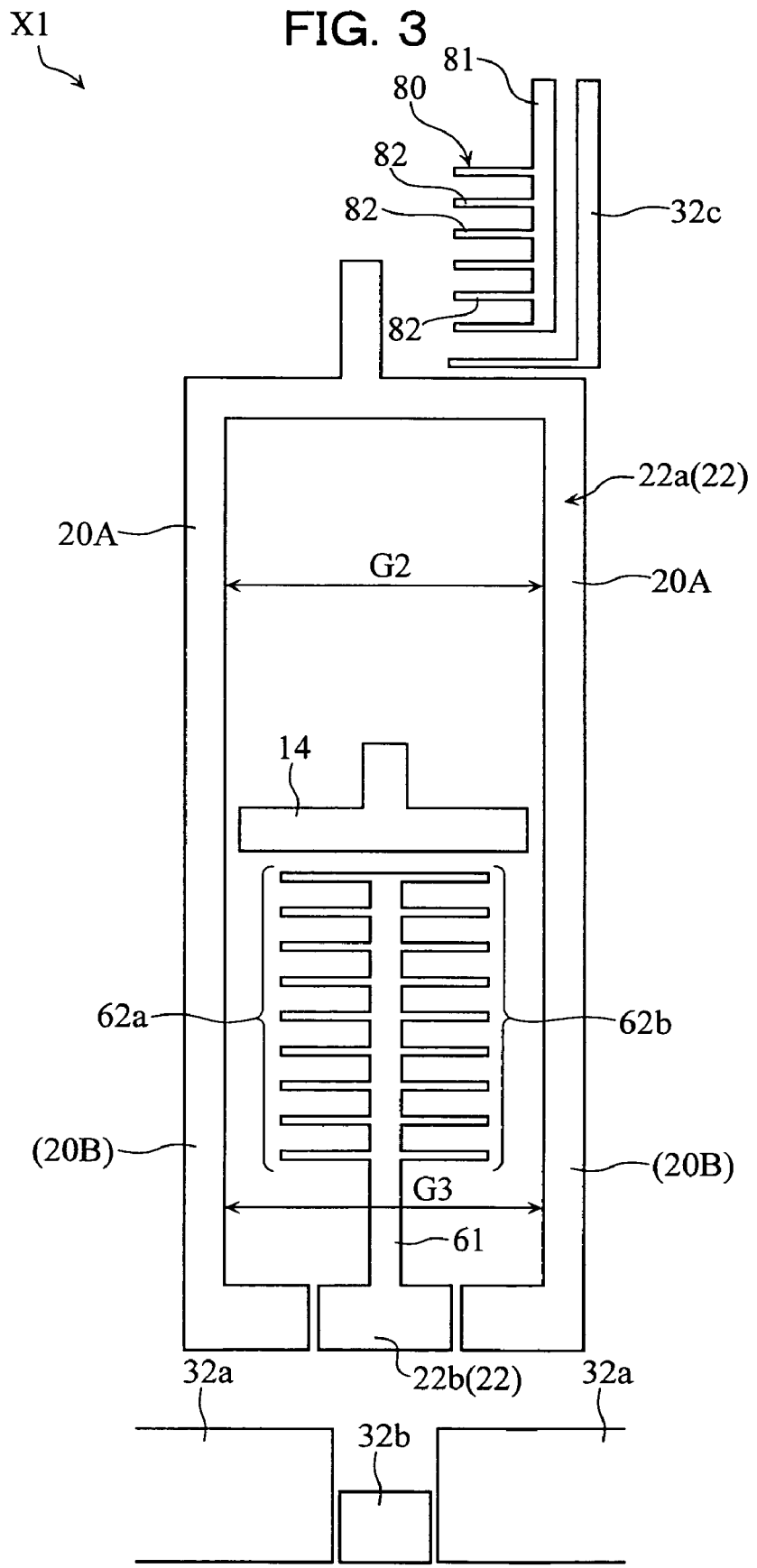
FIG. 3 is a plan view partially illustrating the micro oscillating device illustrated in FIG. 2.

FIG. 2 to FIG. 11 illustrate the micro oscillating devices X1 included in the micro oscillating device array Y1. FIG. 2 is a plan view of the micro oscillating device X1. FIG. 3 is a plan view partially illustrating the micro oscillating device X1. FIG. 4 to FIG. 11 illustrate cross-sectional views along lines IV-IV, V-V, VI-VI, VII-VII, VIII-VIII, IX-IX, X-X and XI-XI in FIG. 2.

Figure 4:
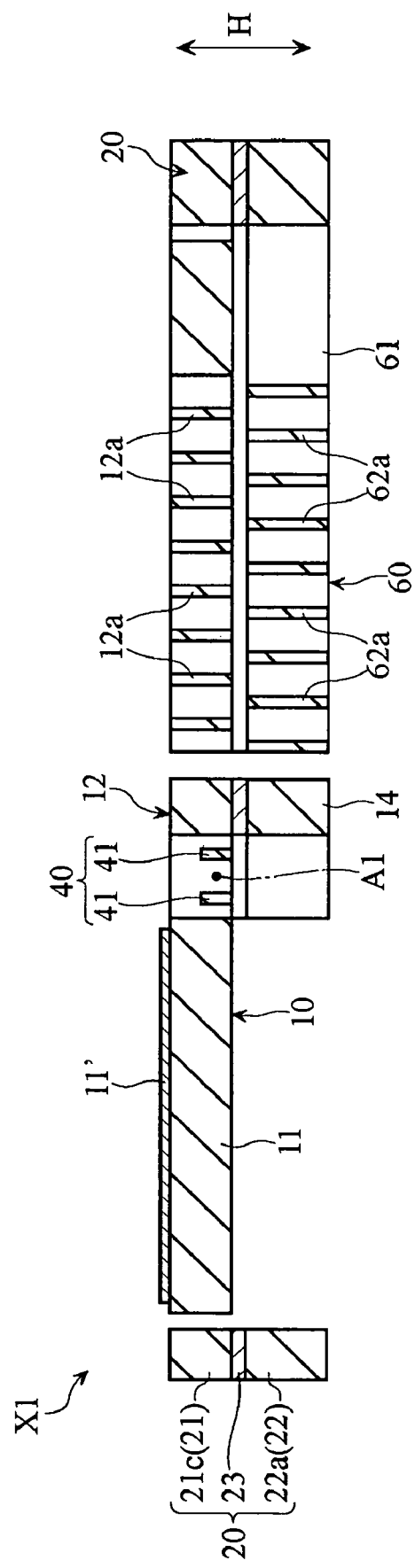
FIG. 4 is a cross-sectional view along the line IV-IV in FIG. 2.

The micro oscillating device X1 includes an oscillating section 10, a frame 20, a frame 30, a pair of coupling sections 40, a pair of coupling sections 50A and 50B, and electrode sections 60, 70, and 80. The oscillating section 10 is an example of a movable section. In the present embodiment, the micro oscillating device X1 may be applied, for example, to a micro mirror device. The micro oscillating device X1 is manufactured on a material substrate using a bulk micro machining technique such as a MEMS technique. A so-called SOI (silicon on insulator) wafer may be used for the material substrate. The material substrate has a multilayered structure including a first silicon layer, a second silicon layer, and an insulating layer between the first and second silicon layers. Each silicon layer is given conductivity by doping impurities. The above described sections of the micro oscillating device X1 are mainly derived and formed from the first silicon layer or second silicon layer. For this reason, from the standpoint of clarity of drawings, parts that protrude outward (i.e., toward the mirrored surface of the micro oscillating device X1 in the direction H as illustrated in FIG. 4) from the insulating layer derived from the first silicon layer are illustrated with diagonal hatching in FIGS. 1 and 2. Furthermore, the structure illustrated in FIG. 3 is derived from the second silicon layer in the micro oscillating device X1.

The oscillating section 10 includes a land section 11, an electrode section 12, a beam section 13, and a shield section 14.

Figure 5:
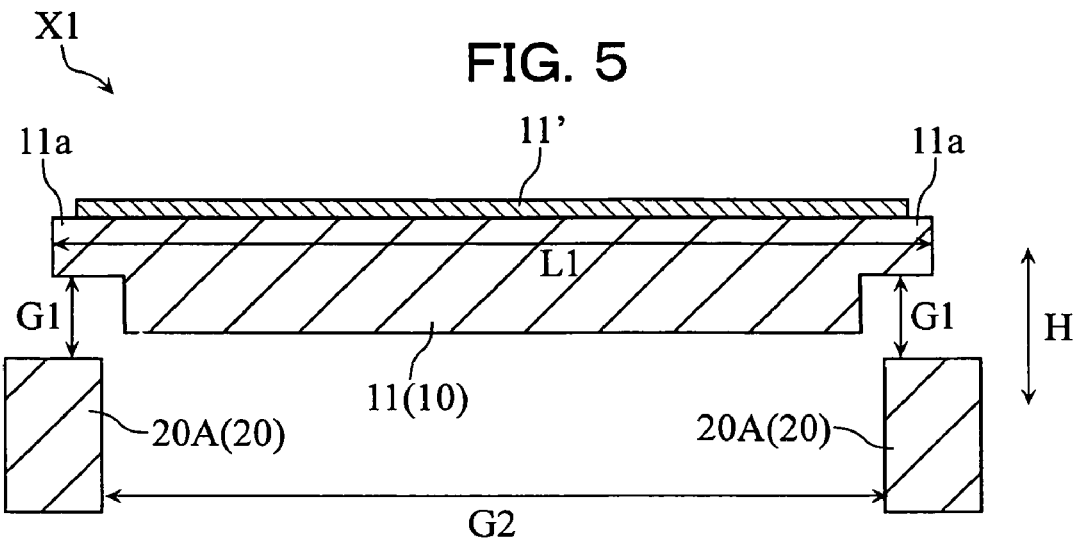
FIG. 5 is a cross-sectional view along the line V-V in FIG. 2.

The land section 11 is a part derived from the first silicon layer. A mirror surface 11' having a light reflection function is provided on the surface of the land section 11. A body section includes a land section 11 and a mirror surface 11'. As illustrated in FIG. 5, the body section or land section 11 includes a thin opposed section 11a opposed to the frame 20 in a direction H. The opposed section 11a extends in a direction illustrated by the arrow D in FIG. 2 along the edges of the land section 11. Furthermore, a length L1 of the land section 11 illustrated in FIG. 2 and FIG. 5 may be, for example, 20 to 300 μm.

Figure 7:
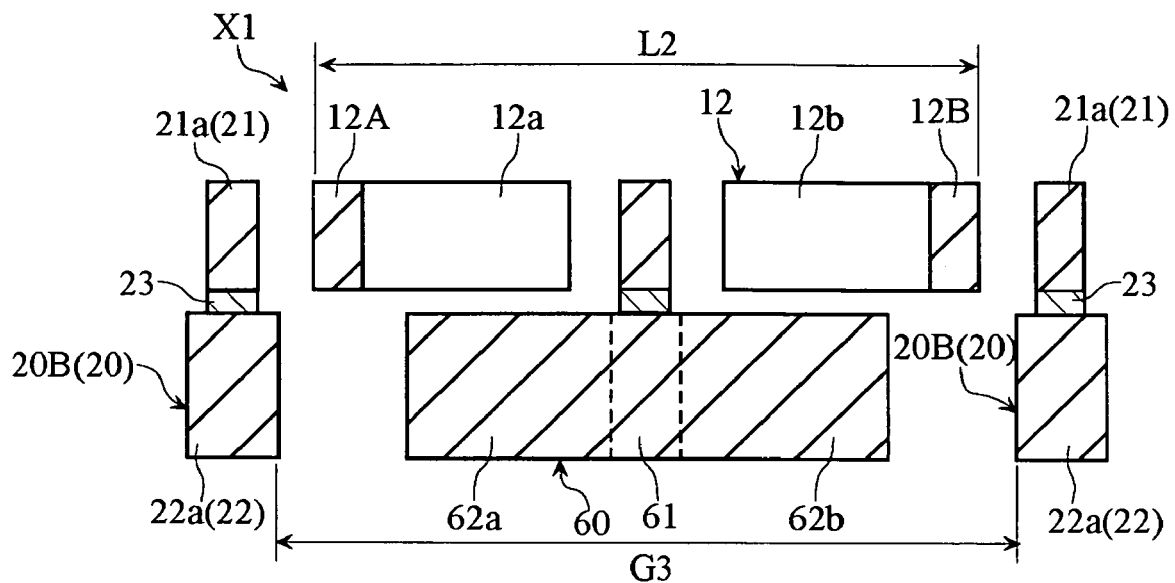
FIG. 7 is a cross-sectional view along the line VII-VII in FIG. 2.

The electrode section 12 is derived from the first silicon layer. The electrode section 12 includes a pair of arms 12A and 12B, a plurality of electrode teeth 12a and a plurality of electrode teeth 12b. As illustrated in FIG. 2 and FIG. 7, the electrode teeth 12a extend from the arm 12A toward the arm 12B. As illustrated in FIG. 2, the electrode teeth 12a are spaced apart from each other in the direction in which the arm 12A extends. The electrode teeth 12b extend from the arm 12B toward the arm 12A. The electrode teeth 12b are spaced apart from each other in the direction in which the arm 12B extends. Thus, the electrode section 12 has a comb electrode structure. Furthermore, the electrode section 12 is a section to which a reference potential (e.g., ground potential) is applied when the micro oscillating device X1 is driven.

The beam section 13 is derived from the first silicon layer. The beam section 13 couples the land section 11 and the electrode section 12.

Figure 6:
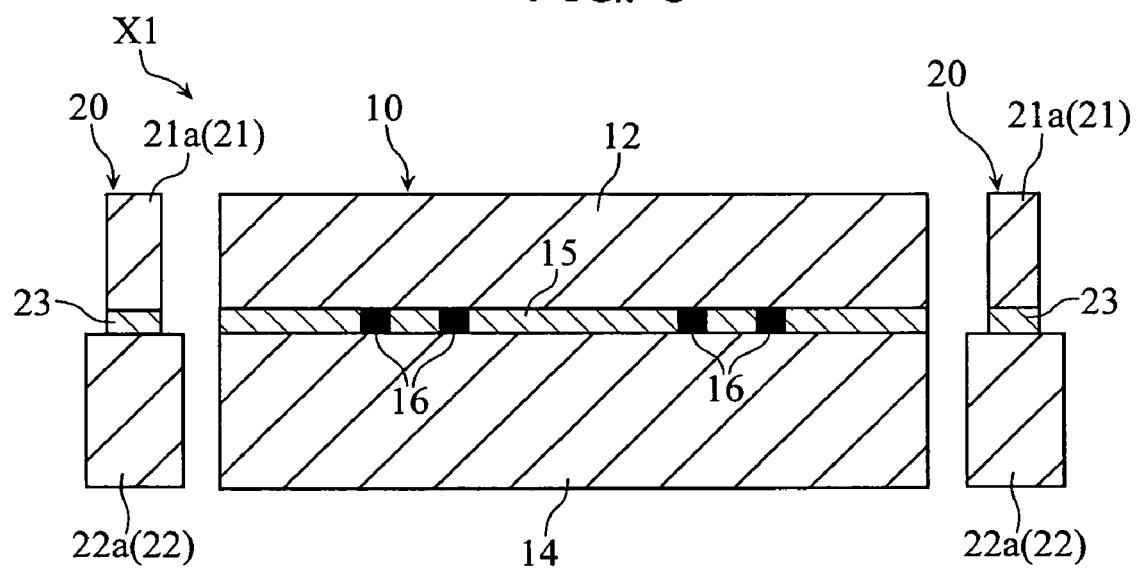
FIG. 6 is a cross-sectional view along the line VI-VI in FIG. 2.

As illustrated in FIG. 3, the shield section 14 is derived from the second silicon layer. The shield section 14 is connected to the electrode section 12 via an insulating layer 15 as illustrated in FIG. 6. The electrode section 12 is electrically connected to the shield section 14 via conductive vias 16 that penetrate the insulating layer 15.

Figure 8:
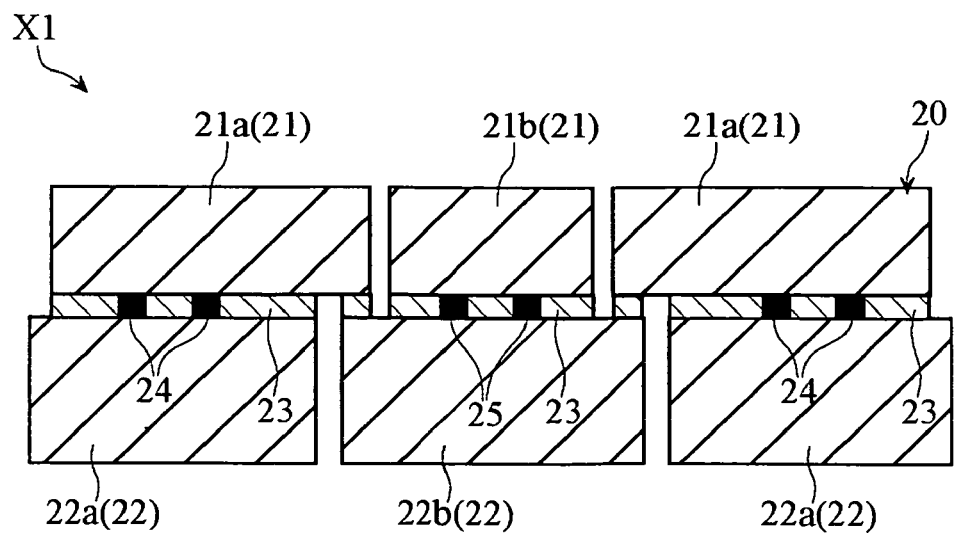
FIG. 8 is a cross-sectional view along the line VIII-VIII in FIG. 2.

As illustrated in FIG. 4 and FIG. 8, the frame 20 has a multilayered structure including a first layer section 21 derived from the first silicon layer, a second layer section 22 derived from the second silicon layer, and an insulating layer 23 between the first and second layer sections 21 and 22. As illustrated in FIG. 2, the first layer section 21 has portions 21a, 21b, and 21c that are spaced apart from each other. As illustrated in FIG. 3, the second layer section 22 includes portions 22a and 22b that are spaced apart from each other. The portion 21a of the first layer section 21 has a shape that partially surrounds the oscillating section 10 as illustrated in FIG. 2. The portion 22a of the second layer section 22 is a frame body having a shape that partially surrounds the oscillating section 10. The portions 21a and 22a are electrically connected via conductive vias 24 that penetrate the insulating layer 23 as illustrated in FIG. 8. The portions 21b and 22b are electrically connected via conductive vias 25 that penetrate the insulating layer 23. The portions 21c and 22a are electrically connected via conductive vias 26 that penetrate the insulating layer 23 as illustrated in FIG. 10.

Furthermore, the frame 20 includes a pair of extending portions 20A that extend in a direction illustrated by the arrow D in FIG. 2 along the land section 11 of the oscillating section 10, and a pair of extending portions 20B that extend in the direction illustrated by the arrow D along the electrode section 12 of the oscillating section 10.

The pair of extending portions 20A extend parallel to axis A2 and are spaced apart from each other by a distance measured parallel to axis A1, which will be described later. As illustrated in FIG. 5, each extending portion 20A is opposed to the opposed section 11a via a gap in the direction H. A distance G1 between the land section 11 and the extending portion 20A in the direction H is greater than the thickness of the insulating layer of the aforementioned material substrate. The distance G1 may be, for example, 0.5 to 20 m. Furthermore, a distance G2 between the pair of extending portions 20A is smaller than the length L1 of the land section 11.

The pair of extending portions 20B are spaced apart from each other in the direction parallel to the axis A1, which will be described later. As illustrated in FIG. 7, a distance G3 between the pair of extending portions 20B is greater than a length L2 of the electrode section 12 of the oscillating section 10. Furthermore, as illustrated in FIG. 3, the distance G3 is substantially equal to the above described distance G2 in the present embodiment.

Figure 11:
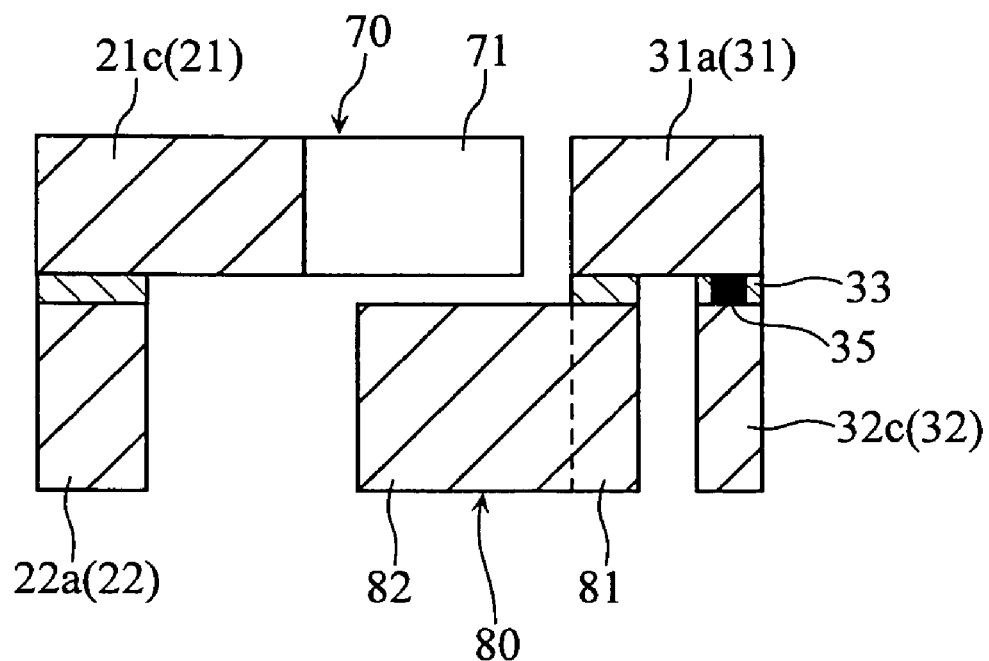
FIG. 11 is a cross-sectional view along the line XI-XI in FIG. 2.

As illustrated in FIG. 9, the frame 30 has a multilayered structure including a first layer section 31 derived from the first silicon layer, a second layer section 32 derived from the second silicon layer, and an insulating layer 33 between the first and second layer sections 31 and 32. As illustrated in FIG. 2 and FIG. 9, the first layer section 31 includes portions 31a and 31b that are spaced apart from each other. As illustrated in FIG. 3, FIG. 9, and FIG. 11, the second layer section 32 includes portions 32a, 32b, and 32c that are spaced apart from each other. As illustrated in FIG. 9, the portions 31b and 32b are electrically connected via conductive vias 34 that penetrate the insulating layer 33. The portions 31a and 32c are electrically connected via a conductive via 35 that penetrates the insulating layer 33 as illustrated in FIG. 11.

As illustrated in FIG. 2, the pair of coupling sections 40 includes two torsion bars 41. Each coupling section 40 is derived from the first silicon layer. Each coupling section 40 is connected to the beam section 13 of the oscillating section 10 and the portion 21a of the first layer section 21 of the frame 20. Thus, the oscillating section 10 and frame 20 are coupled together. The beam section 13 and the portion 21a are electrically connected via the coupling section 40. The distance between the two torsion bars 41 included in the coupling sections 40 gradually increases from the frame 20 toward the oscillating section 10. As illustrated in FIG. 4, the torsion bars 41 are thinner than the oscillating section 10 in the direction H and also thinner than the first layer section 21 of the frame 20. The pair of coupling sections 40 defines a center of axis A1 of the oscillation of the oscillating section 10. The direction in which the above described electrode teeth 12a and 12b extend is parallel to the direction of the axis A1. Since each coupling section 40 includes the two torsion bars 41 whose distance apart gradually increases as the torsion bars 41 extend from the frame 20 to the oscillating section 10, the occurrence of unnecessary displacement is suppressed during oscillation of the oscillating section 10.

The pair of coupling sections 50A and 50B include two torsion bars 51 as illustrated in FIG. 2. The coupling sections 50A and 50B are derived from the first silicon layer. The coupling sections 50A and 50B couple the frame 20 with the frame 30. As illustrated in FIG. 2, the coupling section 50A is connected to the portion 21b of the first layer section 21 of the frame 20 and to the portion 31b of the first layer section 31 of the frame 30. Thus, the frame 20 and the frame 30 are coupled together. The portions 21b and 31b are electrically connected via the coupling section 50A. The coupling section 50B is connected to the portion 21c of the first layer section 21 of the frame 20 and to the portion 31a of the first layer section 31 of the frame 30. Thus, the frame 20 and the frame 30 are coupled together. The portions 21c and 31a are electrically connected via the coupling section 50B. The distance between the two torsion bars 51 included in the coupling sections 50A and 50B gradually increases from the frame 30 toward the frame 20. The torsion bars 51 are thinner than the first layer section 21 of the frame 20 in the direction H and thinner than the first layer section 31 of the frame 30. The pair of coupling sections 50A and 50B defines a center of axis A2 of oscillation of the frame 20 and the oscillating section 10. In the present embodiment, the axis A2 is orthogonal to the axis A1. Since the coupling sections 50A and 50B include the two torsion bars 51 whose distance apart gradually increases as the torsion bars 51 extend from the frame 30 toward the frame 20, unnecessary displacement is suppressed in the oscillation of the frame 20 and the oscillating section 10.

The electrode section 60 is derived from the second silicon layer. As illustrated in FIG. 3, the electrode section 60 includes an arm 61, a plurality of electrode teeth 62a, and a plurality of electrode teeth 62b. The arm 61 extends from the portion 22b of the second layer section 22 of the frame 20. The plurality of electrode teeth 62a extend from the arm 61 toward the arm 12A of the electrode section 12. The plurality of electrode teeth 62a are spaced apart from each other in the direction in which the arm 61 extends. The plurality of electrode teeth 62b extend from the arm 61 toward the arm 12B of the electrode section 12. The plurality of electrode teeth 62b are spaced apart from each other in the direction in which the arm 61 extends. Thus, the electrode section 60 includes a comb electrode structure.

The electrode section 70 is derived from the first silicon layer. The electrode section 70 includes a plurality of electrode teeth 71 as illustrated in FIG. 2. The plurality of electrode teeth 71 extend from the portion 21c of the first layer section 21 of the frame 20 toward the electrode section 80 as illustrated in FIG. 2 and FIG. 11. The plurality of electrode teeth 71 are spaced apart from each other in the direction parallel to the axis A2. Thus, the electrode section 70 includes a comb electrode structure.

The electrode section 80 is derived from the second silicon layer. As illustrated in FIG. 3, the electrode section 80 includes an arm 81 and a plurality of electrode teeth 82. The arm 81 extends in the direction parallel to the axis A2. The plurality of electrode teeth 82 extend from the arm 81 toward the electrode section 70. The plurality of electrode teeth 82 are spaced apart from each other in a direction in which the arm 81 extends. Thus, the electrode section 80 includes a comb electrode structure.

In the micro oscillating device X1, the pair of electrode sections 12 and 60 constitutes a drive mechanism or actuator for generating a drive force according to the oscillation of the oscillating section 10 around the center of axis A1. The pair of electrode sections 70 and 80 constitutes a drive mechanism or actuator for generating a drive force according to the oscillation of the frame 20 and oscillating section 10 around the center of axis A2.

A reference potential is applied to the electrode section 12 and electrode section 70 of the oscillating section 10 to drive the micro oscillating device X1. The reference potential is applied to the electrode section 12 via the portion 31a of the first layer section 31 of the frame 30, the torsion bar 51 of the coupling section 50B, the portion 21c of the first layer section 21 of the frame 20, conductive vias 26 (illustrated in FIG. 10), the portion 22a of the second layer section 22 of the frame 20, conductive vias 24 (illustrated in FIG. 8), the portion 21a of the first layer section 21 of the frame 20, the torsion bars 41 of the coupling section 40, and the beam section 13 of the oscillating section 10. The reference potential is applied to the electrode section 70 via the portion 31a of the first layer section 31 of the frame 30, the torsion bars 51 of the coupling section 50B, and the portion 21c of the first layer section 21 of the frame 20. The reference potential is, for example, a ground potential and is preferably kept constant.

Figure 12:
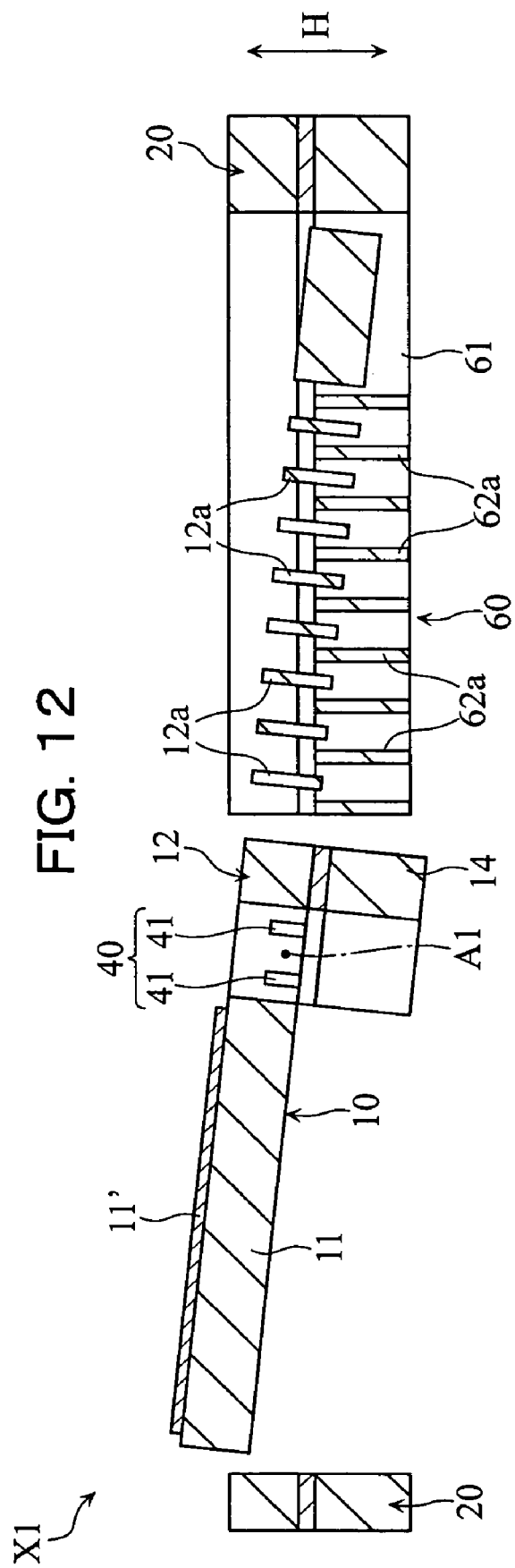
FIG. 12 is a cross-sectional view along the line IV-IV in FIG. 2 at the time of driving.

A drive potential higher than the reference potential is applied to the electrode sections 60 and 80 as required. Thus, when electrostatic attraction is generated between the electrode sections 12 and 60, as illustrated in FIG. 12, the oscillating section 10 may be rotated and displaced around the center of axis A1. On the other hand, when electrostatic attraction is generated between the electrode sections 70 and 80, the frame 20 and oscillating section 10 may be rotated and displaced around the center of axis A2. The micro oscillating device X1 is a so-called two-axis type oscillating device. The drive potential is applied to the electrode section 60 via the portion 32b of the second layer section 32 of the frame 30, conductive vias 34 (illustrated in FIG. 9), the portion 31b of the first layer section 31 of the frame 30, the torsion bars 51 of the coupling section 50A, portion 21b of the first layer section 21 of the frame 20, conductive vias 25 (illustrated in FIG. 8), and the portion 22b of the second layer section 22 of the frame 20. Such two-axis type oscillating driving allows the reflection direction of light reflected by the mirror surface 11' provided on the land section 11 of the micro oscillating device X1 to be switched.

The micro oscillating device array Y1 includes a plurality of the above described micro oscillating devices X1. In the micro oscillating device array Y1, a plurality of micro oscillating devices X1 are arranged in one row in the direction parallel to the axis A1 so that all the axes A2 (not illustrated in FIG. 1) of the micro oscillating devices X1 are parallel to each other.

In the micro oscillating device array Y1, the frames 30 of the respective micro oscillating devices X1 are integrated into one frame body. The frame 30 surrounds the movable sections of all micro oscillating devices X1 including the oscillating section 10 and frame 20. The portion 31a of the first layer section 31 of the frame 30 is continuous across all the micro oscillating devices X1. Therefore, the electrode section 12 and shield section 14 of the oscillating section 10, the portions 21a and 21c of the first layer section 21 of the frame 20, portion 22a of the second layer section 22, portion 32c of the second layer section 32 of the frame 30, and electrode section 70 in the respective micro oscillating devices X1 are electrically connected.

At the time of driving the micro oscillating device array Y1, the reference potential is applied commonly to the electrode section 12 and electrode section 70 of the oscillating section 10 in all the micro oscillating devices X1. In this condition, a drive potential may be applied to the electrode sections 60 and 80 of a selected micro oscillating device X1. This allows the oscillating section 10 and frame 20 of each micro oscillating device X1 to be individually oscillated. Therefore, it is possible to switch reflection directions of light reflected by the mirror surface 11' on the land section 11 of the oscillating section 10 of each micro oscillating device X1.

Figure 13:
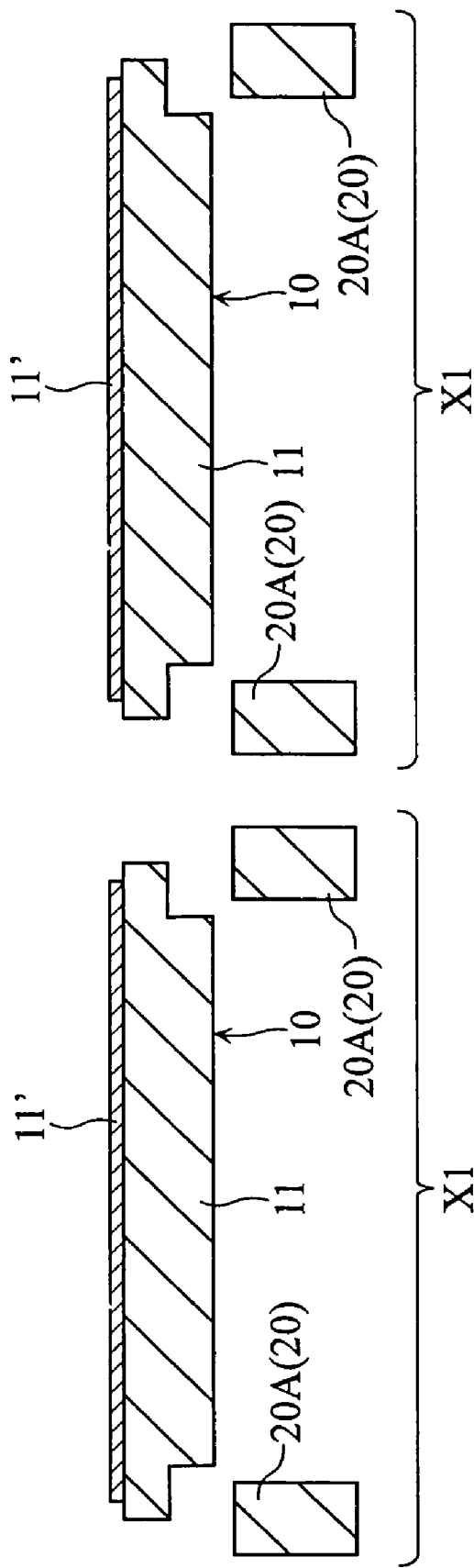
FIG. 13 is a cross-sectional view along the line XIII-XIII in FIG. 1.

As illustrated in FIG. 5, the two extending portions 20A of the frame 20 in the micro oscillating device X1 are spaced apart from the body section in the direction H. Furthermore, the two extending portions 20A partially overlap with the land section 11 in the direction parallel to the axis A1. That is, as illustrated in FIG. 13, in the micro oscillating device array Y1 in a natural condition (when not driven), the extending portion 20A of the frame 20 is not located between the land sections 11 of the two neighboring devices. Therefore, between two neighboring devices in the micro oscillating device array Y1, it is not necessary to secure a space that includes a space corresponding to the full width of each extending portion 20A and a space necessary between the land section 11 and the extending portion 20A of each device. Therefore, in the micro oscillating device array Y1, the land sections 11 or the body sections of the neighboring devices may be arranged close to each other. In such a micro oscillating device array Y1, a high occupancy rate of the body section (land section 11, mirror surface 11') may be realized in the device array direction (i.e., parallel to axis A1). As the occupancy rate of the mirror surface 11' in the device array direction increases, losses in optical signals reflected in the entire micro oscillating device array Y1 may be reduced.

In each micro oscillating device X1, the electrode section 12 of the oscillating section 10, the shield section 14, the portion 22a of the second layer section 22 of the frame 20, and the portion 32c of the second layer section 32 of the frame 30 are electrically connected. Therefore, when driving the device, a reference potential (e.g., ground potential) is also applied to the shield section 14 and portions 22a and 32c together with the electrode section 12. Therefore, for example, an electric field generated from the electrode section 60 toward the land section 11 side of the oscillating section 10 caused by a drive potential higher than the reference potential at the time of driving the device is easily absorbed by the shield section 14. That is, very little of the electric field reaches, for example, the land section 11 beyond the shield section 14. Also, the electric field generated from the electrode section 60 when driving the device is easily absorbed by the portion 22a. That is, very little of the electric field leaks out of the device beyond the portion 22a of the second layer section 22 of the frame 20. Also, the electric field generated from the electrode section 80 on the opposite side of the electrode section 70 caused by a drive potential higher than the reference potential at the time of driving the device is easily absorbed by the portion 32c. That is, very little of the electric field leaks out of the device beyond the portion 32c. These electric field absorbing effects suppress leakage of the electric field out of the micro oscillating device X1. The suppression of leakage of the electric field out of the device may avoid electric field leakage from the drive mechanism made up of the electrode sections 12 and 60 of one micro oscillating device X1 from adversely affecting the drive characteristics of neighboring micro oscillating devices X1. Therefore, the aforementioned electric field absorbing effect allows for an increase in the density of the micro oscillating devices X1 in the array direction, and by extension, improvement of the occupancy rate of the body section (land section 11, mirror surface 11') in the device array direction.

Figure 14:
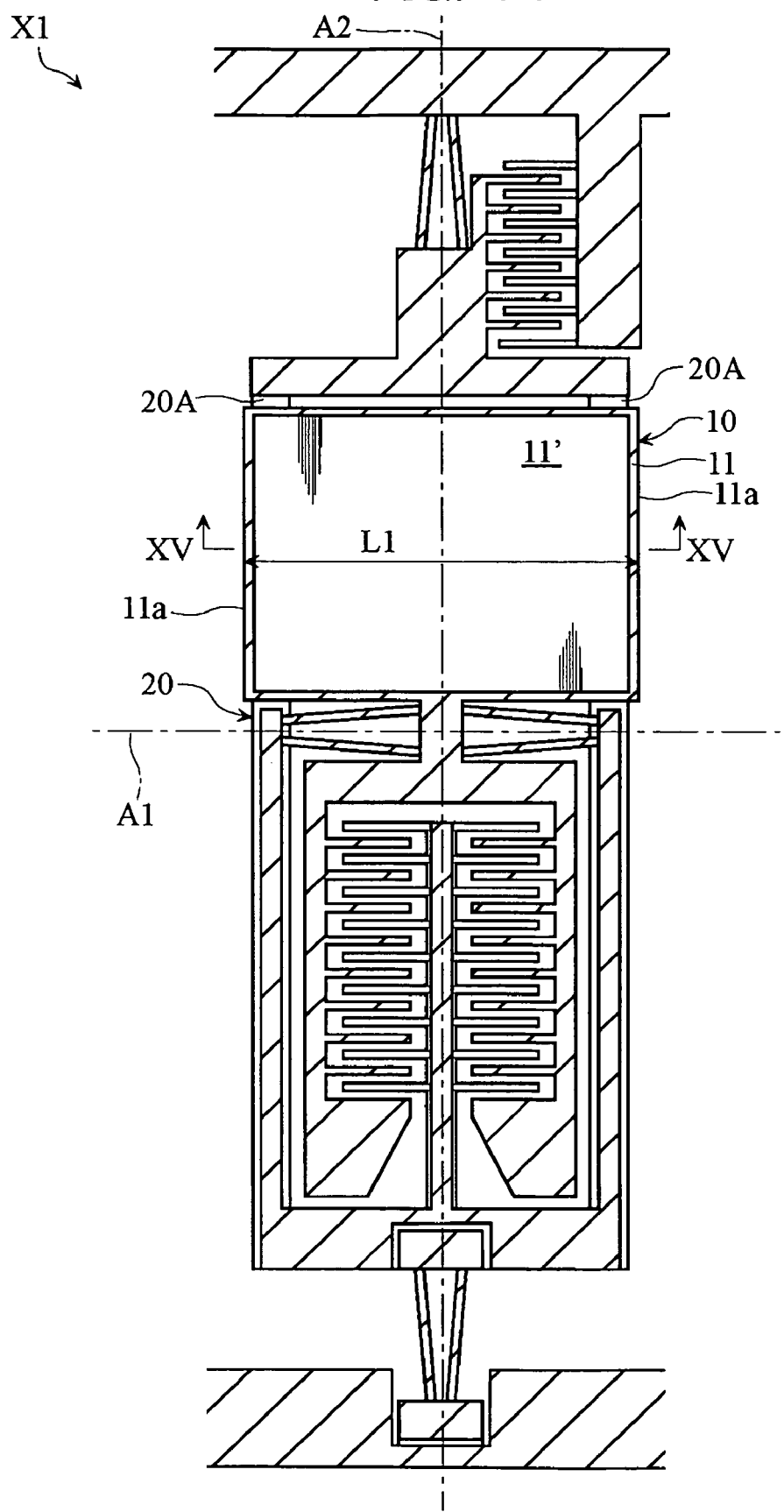
FIG. 14 is a plan view of a first modification example of the micro oscillating device of the first embodiment.
Figure 15:
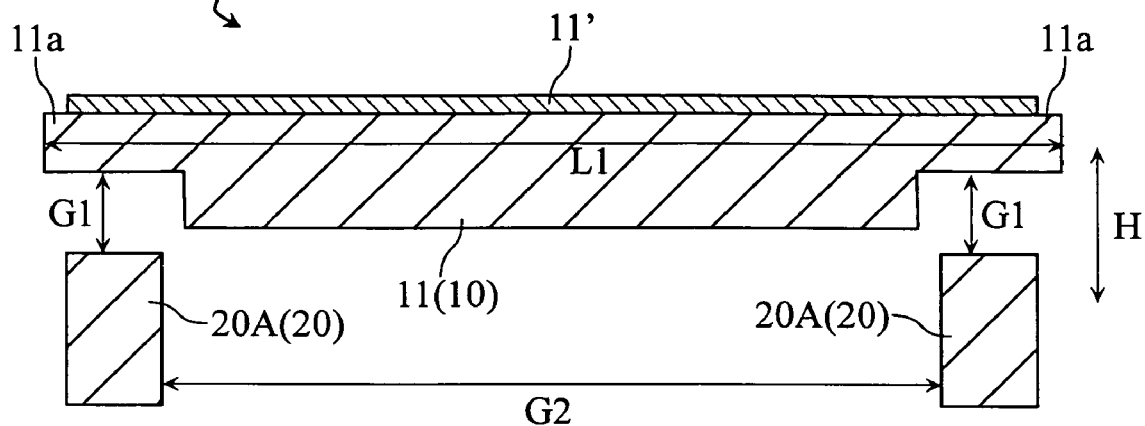
FIG. 15 is a cross-sectional view along the line XV-XV in FIG. 14.

FIG. 14 and FIG. 15 illustrate a first modification example of the micro oscillating device X1. FIG. 14 is a plan view of the first modification example and FIG. 15 is a cross-sectional view along a line XV-XV of FIG. 14.

In the micro oscillating device X1, as illustrated in FIG. 14 and FIG. 15, the length L1 of the land section 11 in the direction parallel to the axis A1 may be greater than the length L1 illustrated in FIG. 2 and FIG. 5. To be more specific, the length L1 of the land section 11 may be set such that the two extending portions 20A of the frame 20 are between the ends of the land section 11 or body section in the direction parallel to the axis A1. Such a configuration is preferable in arranging the land section 11 or body section in the neighboring devices close to each other in the micro oscillating device array Y1. By extension, this contributes to improvement of the occupancy rate of the body section (land section 11, mirror surface 11') in the array direction of the micro oscillating device X1.

Figure 16:
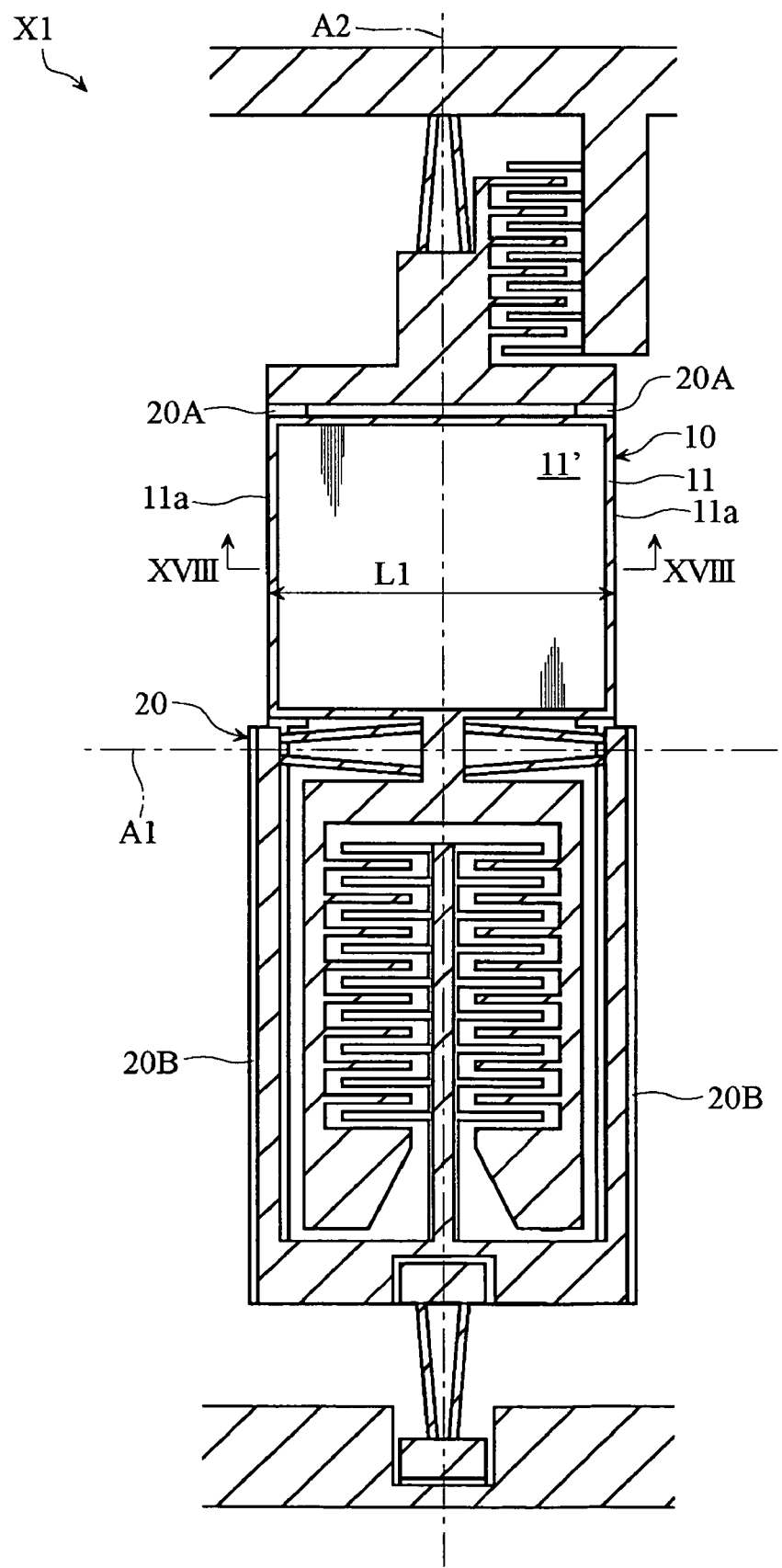
FIG. 16 is a plan view of a second modification example of the micro oscillating device of the first embodiment.
Figure 17:
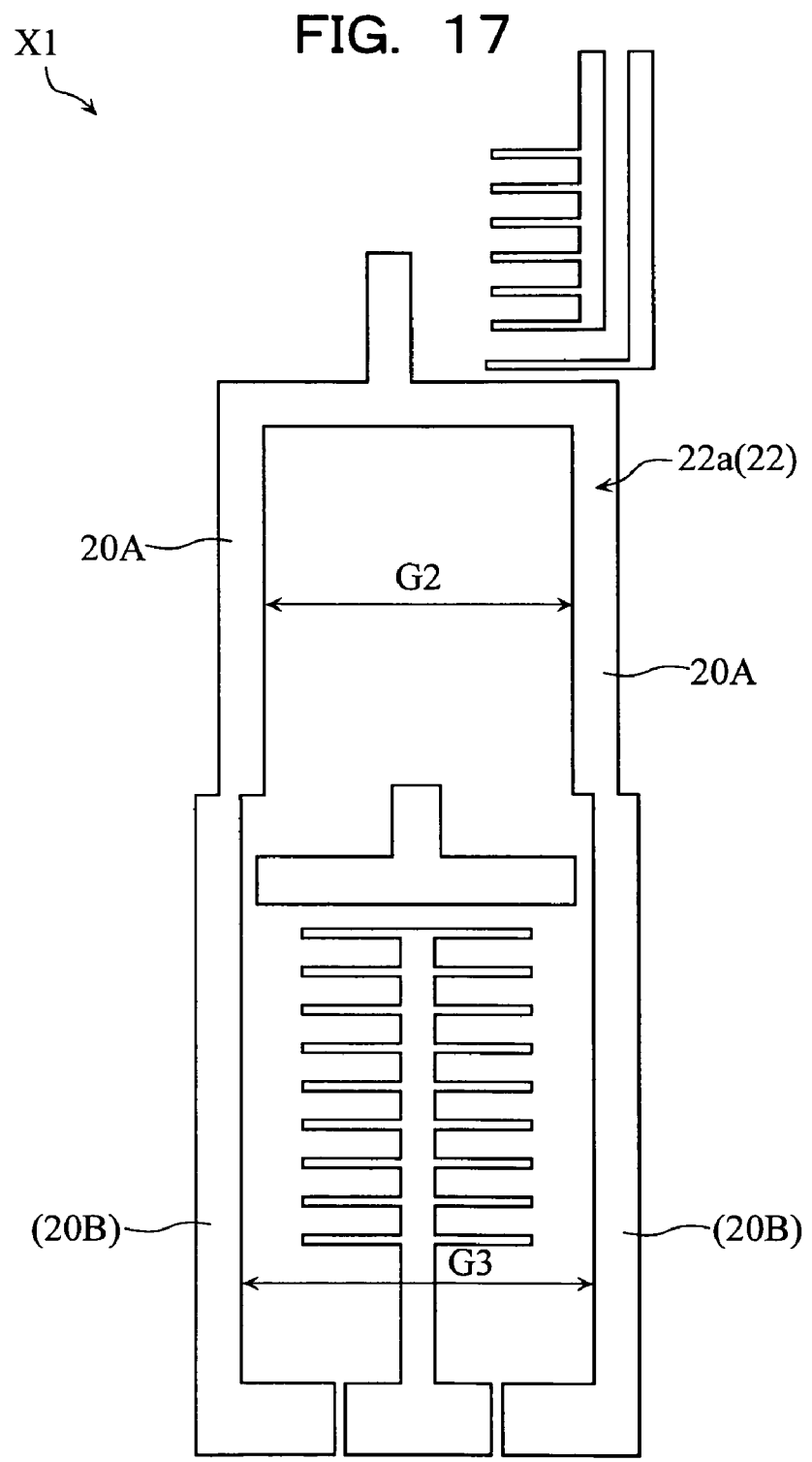
FIG. 17 is a plan view partially illustrating the micro oscillating device illustrated in FIG. 16.

FIG. 16 to FIG. 18 illustrate a second modification example of the micro oscillating device X1. FIG. 16 is a plan view of the second modification example. FIG. 17 is a plan view partially illustrating the second modification example. FIG. 18 is a cross-sectional view along a line XVIII-XVIII of FIG. 16.

As illustrated in FIG. 17 and FIG. 18, the distance G2 between the extending portions 20A of the frame 20 in the micro oscillating device X1 may be smaller than the distance G2 illustrated in FIG. 3 and FIG. 5. To be more specific, the distance G2 between the extending portions 20A may be designed such that in the direction parallel to the axis A1, the two extending portions 20A of the frame 20 are between the ends of the land section 11 or body section. In the present modification example, the distance G2 between the extending portions 20A of the frame 20 is smaller than the distance G3 between the extending portions 20B. Such a configuration is preferable in reducing electric interference between the frames 20 of the neighboring devices in the micro oscillating device array Y1. Therefore, such a configuration is preferable in arranging the land section 11 or body section close to the land section 11 or body section of neighboring devices. By extension, this contributes to improvement of the occupancy rate of the body section (land section 11, mirror surface 11') in the array direction of the micro oscillating device X1.

The micro oscillating device X1 may be applied to a sensing device such as an angular velocity sensor or an acceleration sensor. When the micro oscillating device X1 is applied to a sensing device, the mirror surface 11' on the land section 11 of the oscillating section 10 need not be provided.

When driving the micro oscillating device X1 applied to an angular velocity sensor, for example, the movable part (oscillating section 10, frame 20, coupling section 40, electrode section 60) may be operated to oscillate around the center of axis A2 at a specific frequency or period. This oscillating operation is realized by applying a voltage to the electrode sections 70 and 80 at specific periods. The present embodiment, for example, grounds the electrode section 70 and gives a potential to the electrode section 80 at specific periods.

When, for example, an angular velocity acts on the micro oscillating device X1 or oscillating section 10 while the movable part is allowed to oscillate or vibrate, the oscillating section 10 rotates around the center of axis A1. This causes the relative arrangement of the electrode sections 12 and 60 to change and causes the capacitance of the electrode sections 12 and 60 to change. The amount of rotational displacement of the oscillating section 10 may be detected based on such a change of capacitance. The angular velocity acting on the micro oscillating device X1 or oscillating section 10 may be derived based on the detection result.

When driving the micro oscillating device X1 applied to an acceleration sensor, the oscillating section 10 is kept at rest with respect to the frame 20 and the electrode section 60 by applying, for example, a DC voltage between the electrode sections 12 and 60. When acceleration in the direction of the normal to the micro oscillating device X1 or oscillating section 10 acts in this condition, a force of inertia of a vector component parallel to the acceleration acts. This causes rotating torque around the center of axis A1 defined by the pair of coupling sections 40 to act on the oscillating section 10 and thereby produces rotation (rotational displacement around the center of axis A1) proportional to the acceleration in the oscillating section 10. In the plan view illustrated in FIG. 2, the force of inertia may be generated by preventing the center of gravity of the oscillating section 10 from overlapping the center of axis A1. The amount of rotation may be electrically detected as a variation of capacitance between the electrode sections 12 and 60. The acceleration acting on the micro oscillating device X1 or oscillating section 10 may be derived based on the detection result.

FIGS. 19A-19D, FIGS. 20A-20D, and FIGS. 21A-21D illustrate an example of a process to manufacture a micro oscillating device X1 included in the micro oscillating device array Y1. This process is one example of a technique to manufacture the micro oscillating device X1 using a bulk micro machining technique. FIGS. 19A-19D, FIGS. 20A-20D, and FIGS. 21A-21D illustrate the processes of forming the land section L, beam section B, frames F1, F2 and F3, coupling sections C1 and C2, and the set of electrodes E1 and E2. The land section L corresponds to part of the land section 11. The beam section B corresponds to the beam section 13. The frame F1 corresponds to part of the frame 20. The frame F2 corresponds to the extending portion 20A (part of the portion 22a of the second layer section 22) of the frame 20. The frame F3 corresponds to part of the frame 30. The coupling section C1 corresponds to the coupling section 40. The coupling section C2 corresponds to the coupling sections 40, 50A, and 50B. The electrode E1 corresponds to part of the electrode sections 12 and 70. The electrode E2 corresponds to part of the electrode sections 60 and 80.

Figure 19A:
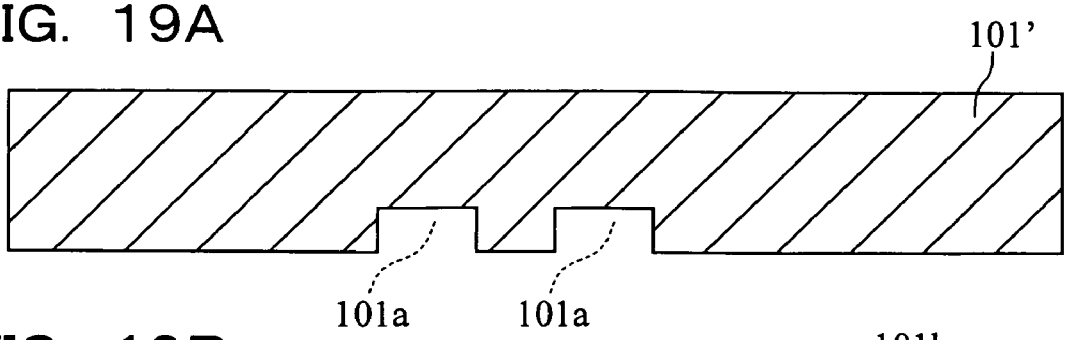
FIGS. 19A-19D illustrate manufacturing process of the micro oscillating device illustrated in FIG. 2.

In the manufacture of the micro oscillating device X1, a silicon wafer 101' as illustrated in FIG. 19A is prepared first. The silicon wafer 101' includes grooves 101a that extend in correspondence with the section at which the thin facing section 11a is formed in the land section 11. In the manufacture of such a silicon wafer 101', an unprocessed silicon wafer having a thickness of, for example, 200 μm is subjected to etching to a specific depth (e.g., 30 μm) by means of DRIE (deep reactive ion etching) using a resist pattern having an opening corresponding to the grooves 101a as a mask. DRIE uses a Bosch process that alternately repeats etching using an SF6 gas and side wall protection using a C4F8 gas. The use of the Bosch process allows good anisotropic etching to be performed. Such a Bosch process may also be adopted for DRIE which will be described later. Furthermore, the silicon wafer 101' is made of a silicon material. The silicon material is given conductivity by doping impurities. P-type impurities such as B, and n-type impurities such as P and Sb may be adopted as impurities.

Figure 19B:
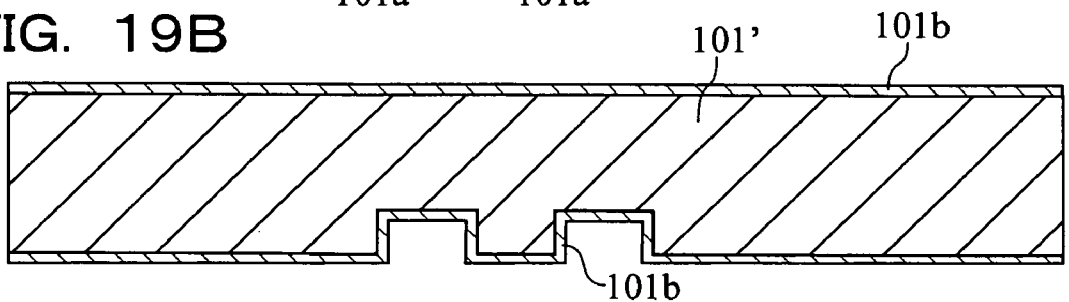

As illustrated in FIG. 19B, an insulating film 101b is formed on the silicon wafer 101'. The insulating film 101b may be formed by, for example, applying thermal oxidation to the surface of the silicon wafer 101'. The thickness of the insulating film 101b may be, for example, 500 nm. After this, a plurality of conductive parts (not illustrated) which become parts of the aforementioned conductive vias 16, 24 to 26, 34 and 35 are embedded in the insulating film 101b. To be more specific, openings are formed at specific locations of the insulating film 101b and the openings are filled with a conductive material. Tungsten or polysilicon, for example, may be used as the conductive material.

Figure 19C:
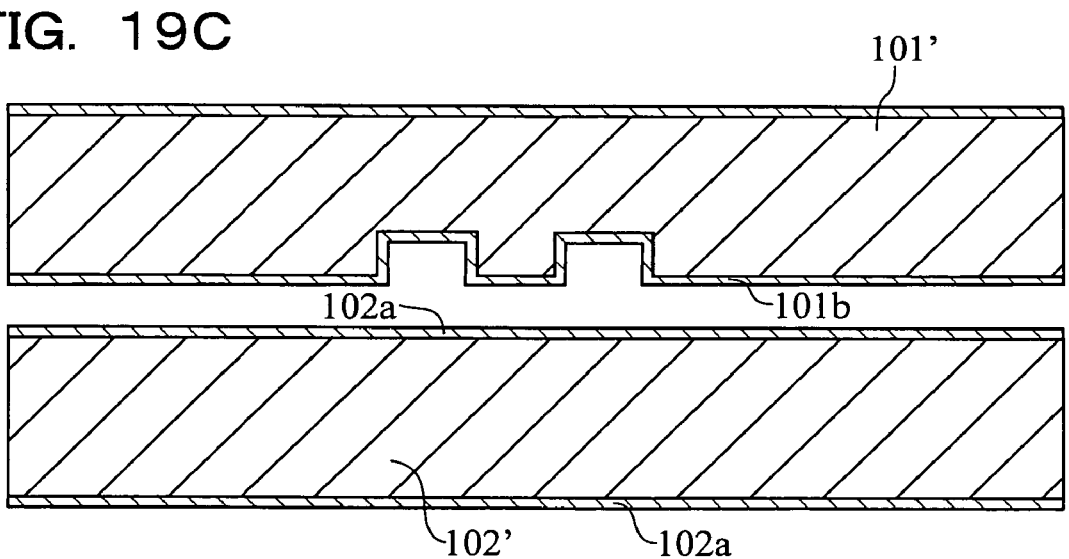

As illustrated in FIG. 19C, a silicon wafer 102', on the surface of which an insulating film 102a is formed, is prepared. The silicon wafer 102' is made of a silicon material. The silicon material is given conductivity by doping impurities. P-type impurities such as B, or n-type impurities such as P and Sb may be adopted as impurities. The thickness of the silicon wafer 102' may be, for example, 200 μm. The thickness of the insulating film 102a may be, for example, 500 nm. The insulating film 102a is formed by applying thermal oxidation to the surface of the silicon wafer 102'. Furthermore, a plurality of conductive parts (not illustrated) which become parts of the aforementioned conductive vias 16, 24 to 26, 34 and 35 are embedded in the insulating film 102a. Such conductive parts are formed by forming openings at specific locations of the insulating film 102a and filling the openings with a conductive material. As the conductive material, for example, tungsten or polysilicon may be adopted.

Figure 19D:
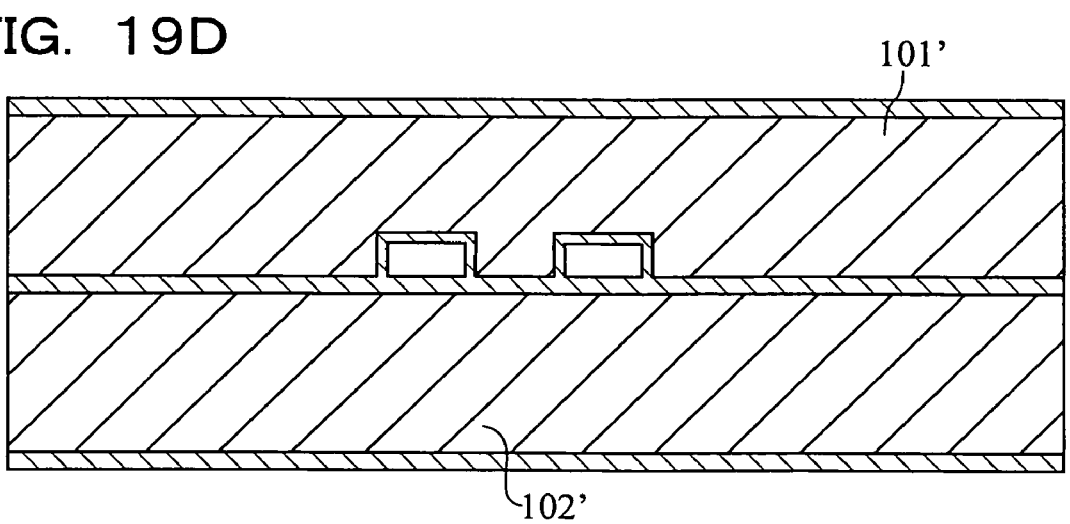

As illustrated in FIG. 19D, the silicon wafers 101' and 102' are aligned with each other and both wafers are bonded together. Thus, the conductive vias 16, 24 to 26, 34 and 35 are formed with the aforementioned conductive parts embedded in the insulating film 101b and the aforementioned conductive parts embedded in the insulating film 102a. The silicon wafers 101' and 102' may be pasted together, for example, by cleaning the silicon wafers 101' and 102' with an aqueous solution of ammonium, pasting both wafers together in a clean environment, and annealing the wafers in a nitrogen atmosphere. The annealing temperature may be, for example, 1200° C.

Figure 20A:
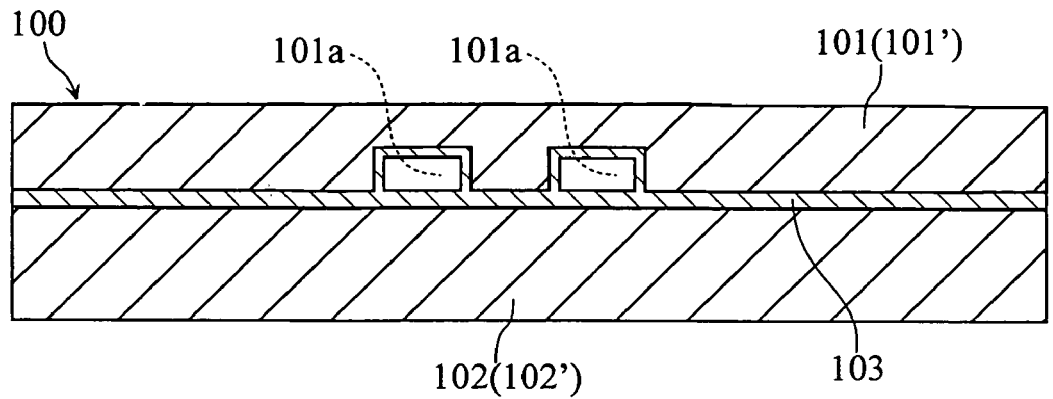
FIGS. 20A-20D illustrate manufacturing process following FIG. 19.

The silicon wafers 101' and 102' are subjected to polishing to reduce the thickness of the silicon wafers 101' and 102' to a desired thickness as illustrated in FIG. 20A. Thus, a material substrate 100 having a multilayered structure is obtained, which includes the silicon layer 101 including the grooves 101a, the silicon layer 102 and the insulating layer 103 between the silicon layers 101 and 102. The aforementioned conductive vias 16, 24 to 26, 34 and 35 are formed at specific locations of the insulating layer 103 of the material substrate 100. The thickness of the silicon layer 101 may be, for example, 20 to 200 μm. The thickness of the silicon layer 102 may be, for example, 20 to 200 μm. The thickness of the insulating layer 103 may be, for example, 0.3 to 2 μm.

Figure 20B:
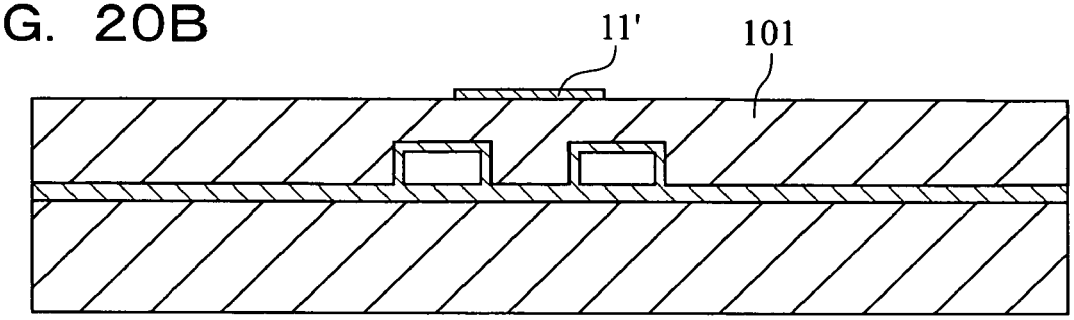

As illustrated in FIG. 20B, the mirror surface 11' is formed on the silicon layer 101. In the formation of the mirror surface 11', a metal film of, for example, Cr (e.g., 50 nm) is formed on the silicon layer 101 using a sputtering method. A metal film of Au (e.g., 200 nm) or the like is formed and a pattern of the mirror surface 11' is formed by sequentially applying etching processing to the metal films using a specific mask. An aqueous solution of potassium iodide-iodine, for example, may be used as the etching liquid for Au. An aqueous solution of ceric ammonium nitrate, for example, may be used as the etching liquid for Cr.

Figure 20C:
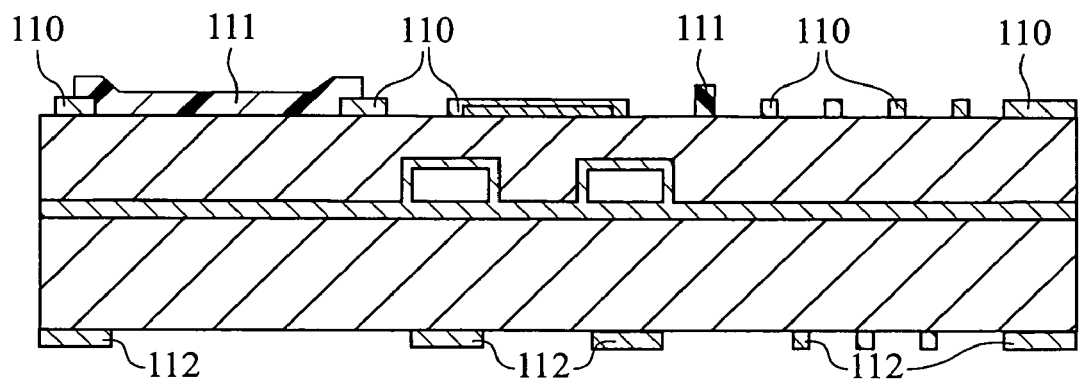
Figure 22:
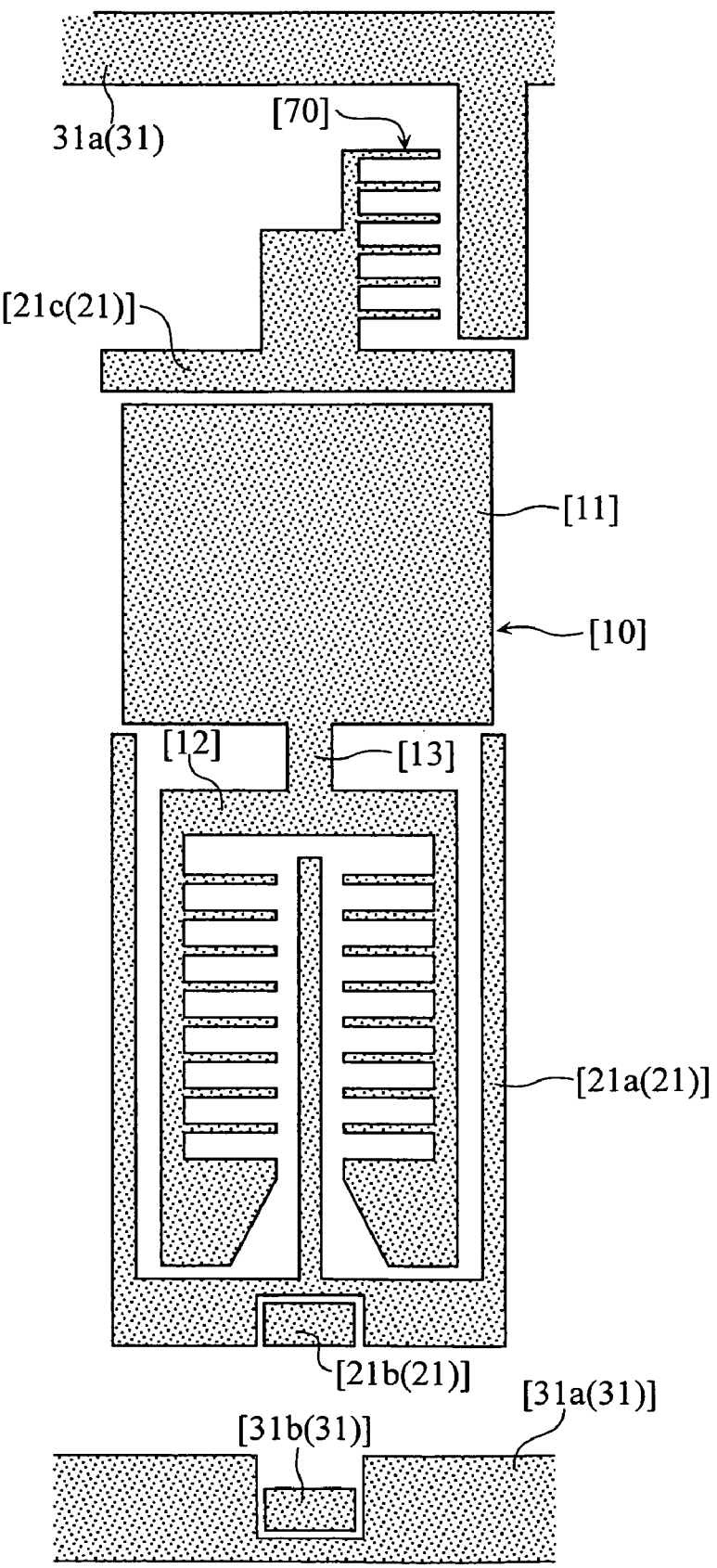
FIG. 22 is a plan view of a mask pattern.
Figure 23:
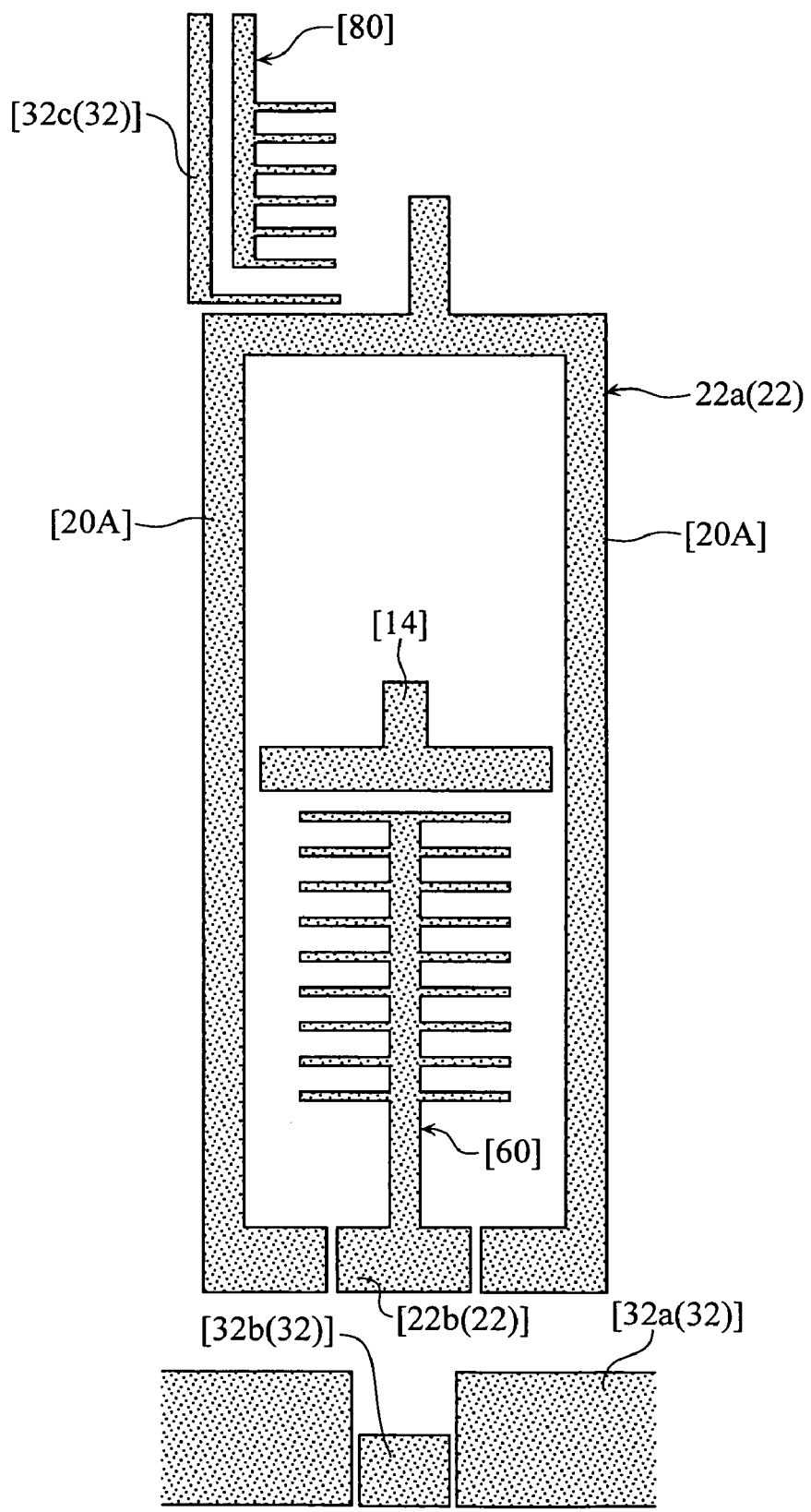
FIG. 23 is a plan view of another mask pattern.

As illustrated in FIG. 20C, an oxide film pattern 110 and a resist pattern 111 are formed on the silicon layer 101. An oxide film pattern 112 is formed on the silicon layer 102. The oxide film pattern 110 has a shape corresponding to parts of the oscillating section 10 (including the land section 11, electrode section 12, beam section 13) to be formed in the silicon layer 101, the first layer section 21 of the frame 20, the first layer section 31 of the frame 30, and the electrode section 70 (see FIG. 22). In the formation of the oxide film pattern 110, a film of an oxide material is formed on the silicon layer 101 side of the material substrate 100 using, for example, a sputtering method or CVD method. The oxide film is patterned. The resist pattern 111 has a pattern shape corresponding to the coupling sections 40, 50A, and 50B. In the formation of the resist pattern 111, a film of a resist material is formed on the silicon layer 101 of the material substrate 100 using, for example, a spin coating method. The resist film is patterned. The oxide film pattern 112 has a pattern shape corresponding to the shield section 14 of the oscillating section 10 to be formed in the silicon layer 102, the second layer section 22 of the frame 20, the second layer section 32 of the frame 30, and the electrode sections 60 and 80 (see FIG. 23). In the formation of the oxide film pattern 112, a film of an oxide material is formed on the silicon layer 102 side of the material substrate 100 using, for example, a sputtering method or CVD method. The oxide film is patterned.

Figure 20D:
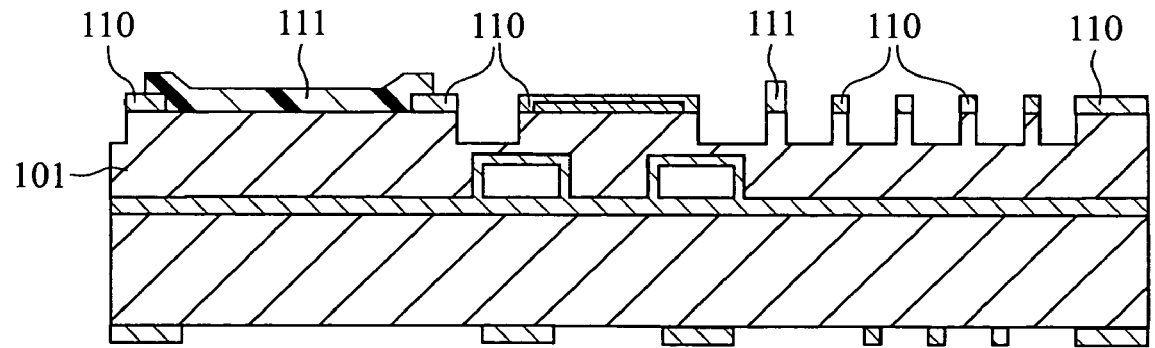

Next, as illustrated in FIG. 20D, the silicon layer 101 is subjected to etching by means of DRIE to a specific depth using the oxide film pattern 110 and resist pattern 111 as a mask. The specific depth may be a depth corresponding to the thicknesses of the coupling sections C1 and C2 which may be, for example, 5 μm.

Figure 21A:
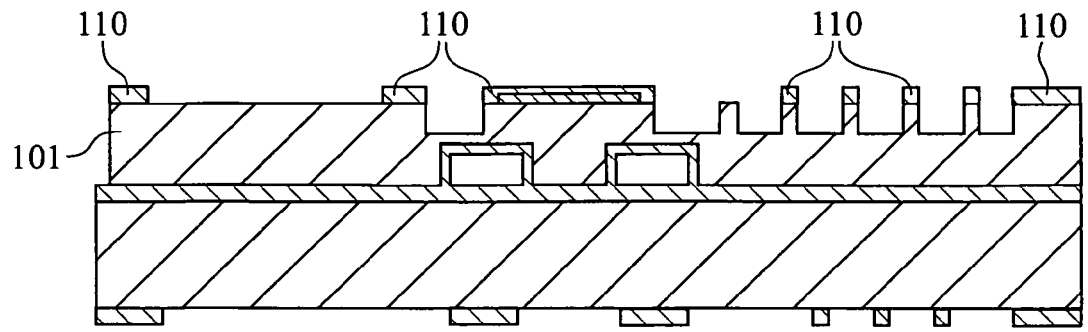
FIGS. 21A-21D illustrate manufacturing process following FIG. 20.

As illustrated in FIG. 21A, the resist pattern 111 is removed. For example, the resist pattern 111 may be peeled off by exposing the resist pattern 111 to a peeling liquid.

Figure 21B:
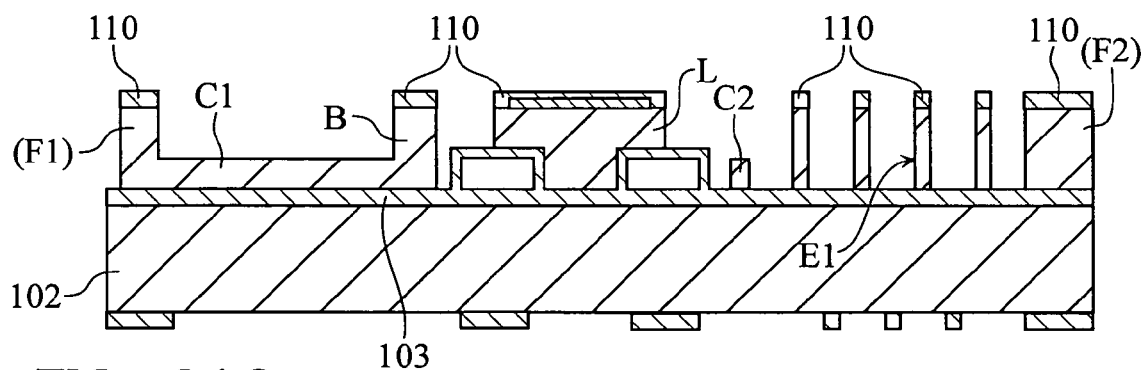

As illustrated in FIG. 21B, the silicon layer 101 is subjected to etching by means of DRIE using the oxide film pattern 110 as a mask. In this case, the coupling sections C1 and C2 are kept. In this process, the land section L, the beam section B, the electrode E1, part of the frame F1 (first layer section 21 of the frame 20), part of the frame F3 (first layer section 31 of the frame 30), and the coupling sections C1 and C2 are formed.

Figure 21C:
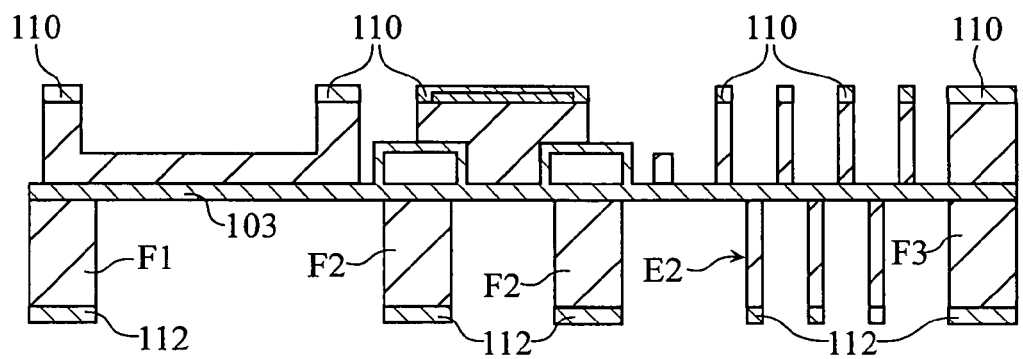

Next, as illustrated in FIG. 21C, the silicon layer 102 is subjected to etching by means of DRIE using the oxide film pattern 112 as a mask. In this process, part of the frame F1 (second layer section 22 of frame 20), the frame F2 (extending portion 20A as part of second layer section 22 of the frame 20), part of the frame F3 (second layer section 32 of the frame 30), and the electrode E2 are formed.

Figure 21D:
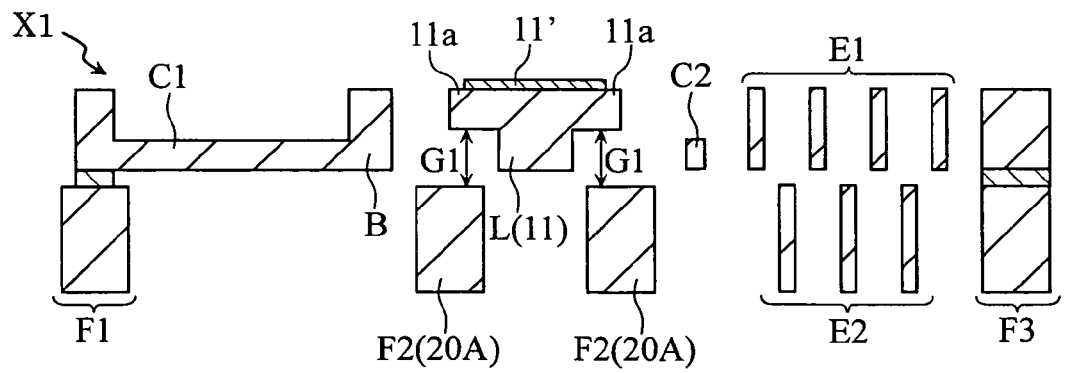

As illustrated in FIG. 21D, the exposed section of the insulating layer 103 and the oxide film patterns 110 and 112 are removed by etching. A dry etching or wet etching may be adopted as the etching technique. When dry etching is adopted, CF4, CHF3 or the like may be used as an etching gas. When wet etching is adopted, a buffered fluorinated acid (BHF) including, for example, fluorinated acid and ammonium fluoride may be used as the etching liquid.

Through the above described processes, the micro oscillating device X1, which includes the land section L, the beam section B, the frames F1, F2 and F3, the coupling sections C1 and C2, and electrodes E1 and E2, is manufactured.

The opposed section 11a of the land section 11 (or body section) in the oscillating section 10 of the micro oscillating device X1 is derived from the thin portion of the silicon layer 101. The distance G1 between the opposed section 11a and the extending portion 20A is greater than the thickness of the insulating layer 103 of the material substrate 100. Thus, the present embodiment may ensure a sufficient distance G1 between the land section 11 and the extending portion 20A.

Figure 24:
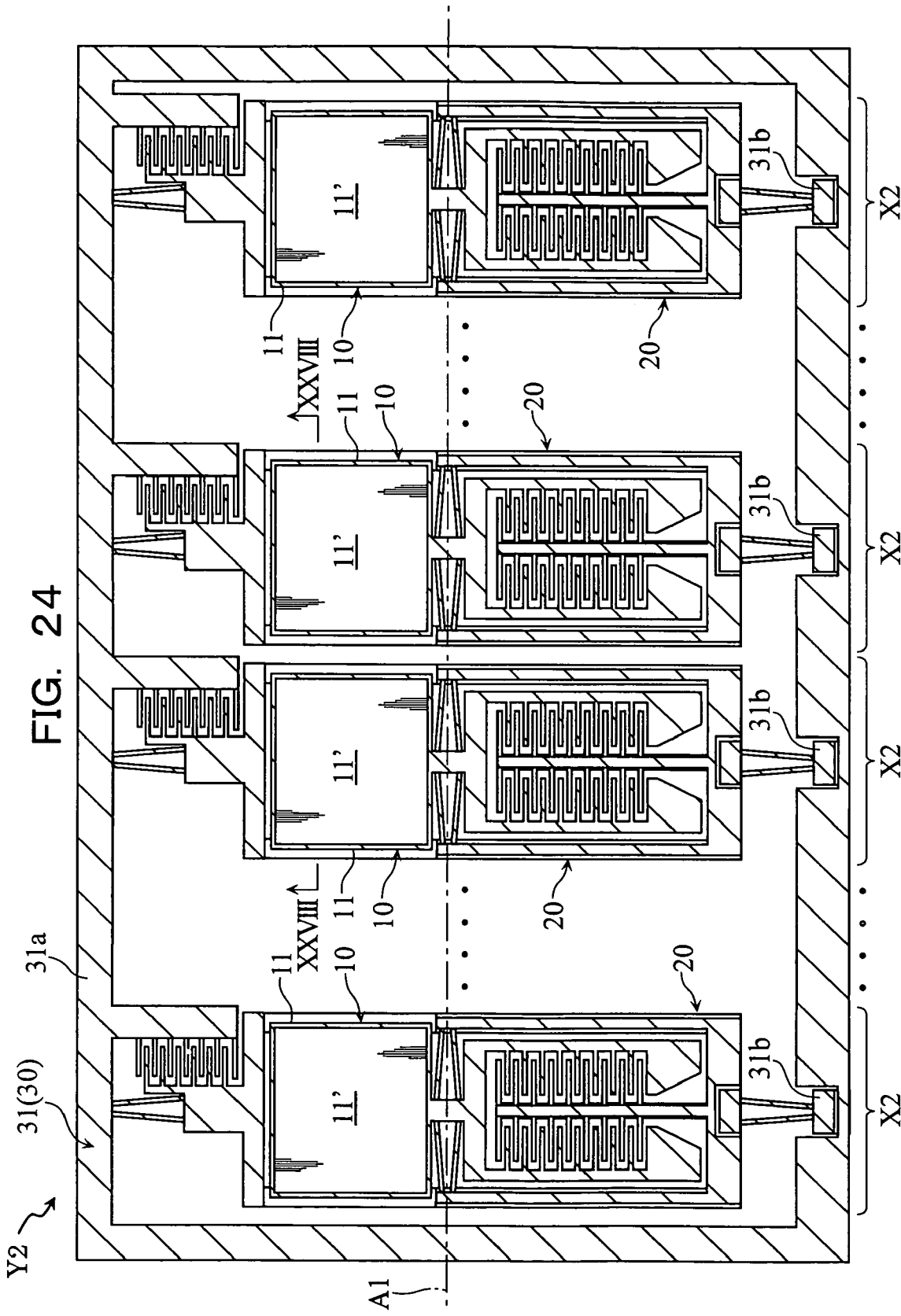
FIG. 24 is a plan view of a micro oscillating device array according to a second embodiment.

FIG. 24 is a plan view of a micro oscillating device array Y2 according to a second embodiment. The micro oscillating device array Y2 includes a plurality of micro oscillating devices X2.

Figure 25:
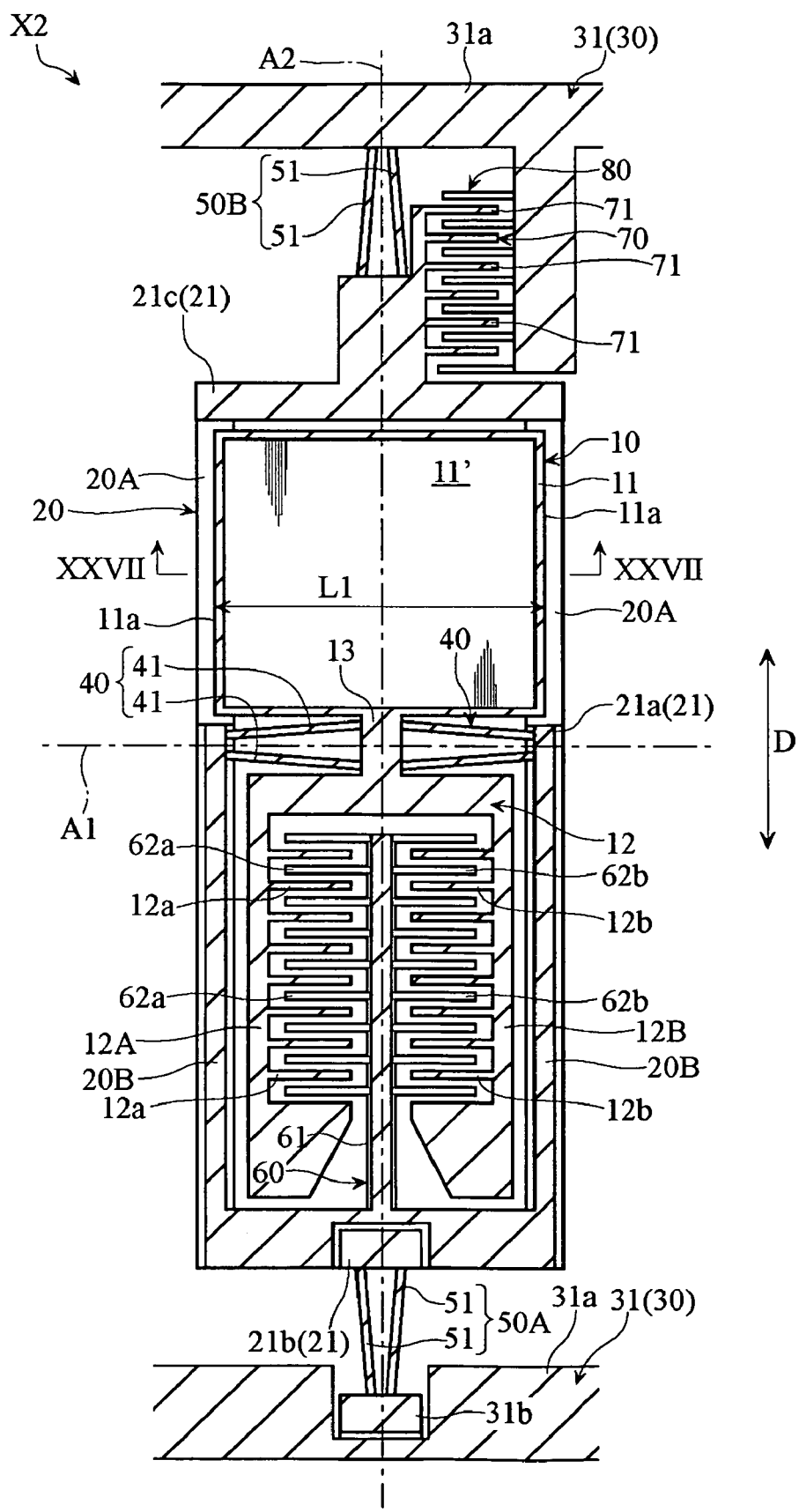
FIG. 25 is a plan view of a micro oscillating device included in the micro oscillating device array illustrated in FIG. 24.
Figure 26:
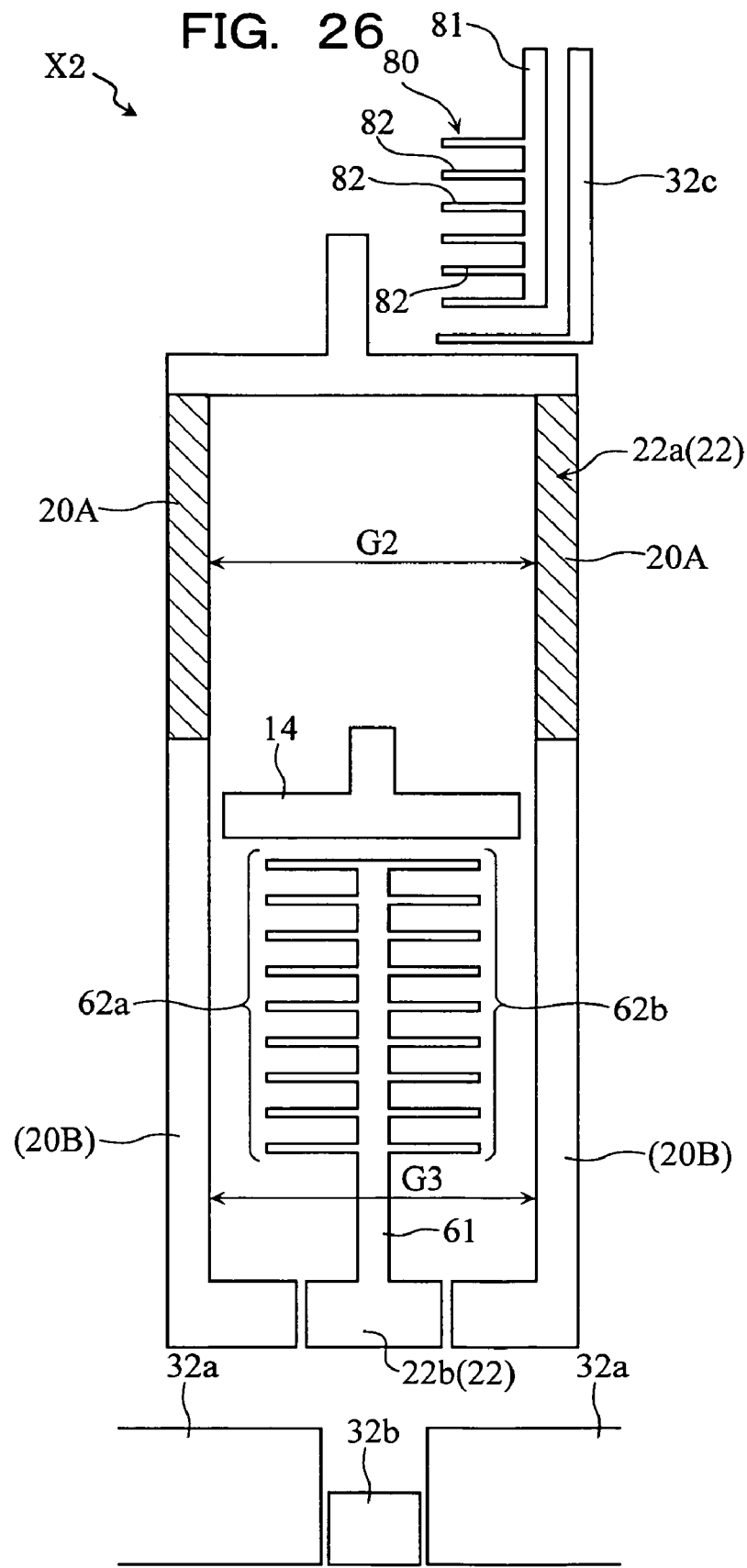
FIG. 26 is a plan view partially illustrating the micro oscillating device illustrated in FIG. 25.
Figure 27:
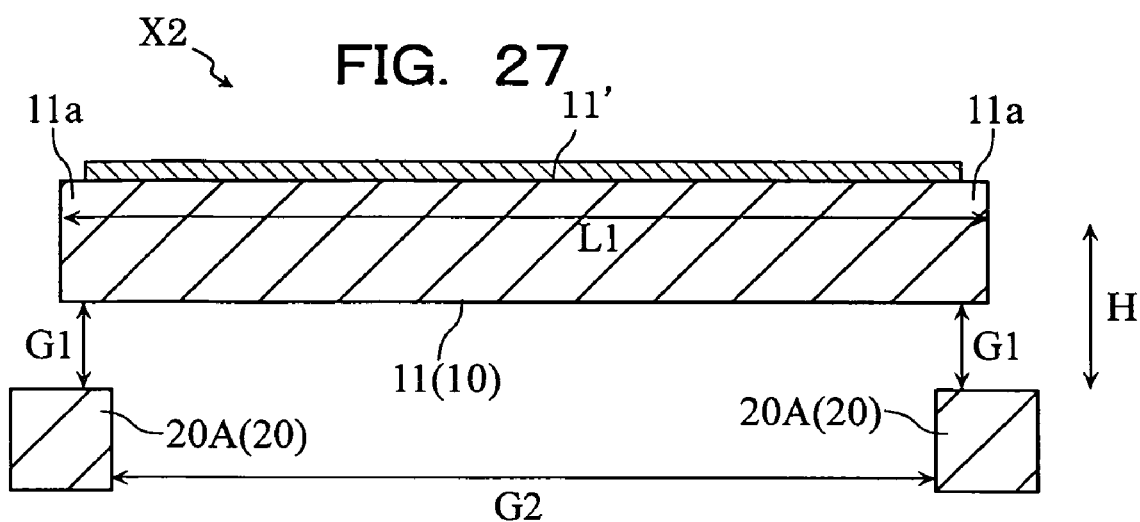
FIG. 27 is a cross-sectional view along the line XXVII-XXVII in FIG. 25.

FIG. 25 to FIG. 27 illustrate the micro oscillating device X2 included in the micro oscillating device array Y2. FIG. 25 is a plan view of the micro oscillating device X2. FIG. 26 is a plan view partially illustrating the micro oscillating device X2. FIG. 27 is a cross-sectional view along the line XXVII-XXVII of FIG. 25.

The micro oscillating device X2 includes an oscillating section 10, a frame 20, a frame 30, a pair of coupling sections 40, a pair of coupling sections 50A and 50B, and electrode sections 60, 70, and 80. The micro oscillating device X2 may be applied to, for example, a micro mirror device. Furthermore, the micro oscillating device X2 may be manufactured by processing the material substrate using a bulk micro machining technique such as an MEMS technique. The material substrate has a multilayered structure including a first silicon layer, a second silicon layer, and an insulating layer between the first and second silicon layers. The first and second silicon layers are given conductivity by doping of impurities. The above described parts of the micro oscillating device X2 are derived and formed from the first silicon layer or second silicon layer. Therefore, from the standpoint of clarity of drawings, FIG. 24 and FIG. 25 illustrate parts that protrude outward from the insulating layer derived from the first silicon layer (i.e., protrude outward in the direction H as illustrated in FIG. 18) with diagonal hatching. Furthermore, the structure illustrated in FIG. 26 is derived from the second silicon layer in the micro oscillating device X2.

Part of the structure of the oscillating section 10 and part of the structure of the frame 20 in the micro oscillating device X2 differ from the micro oscillating device X1 according to the first embodiment.

The oscillating section 10 of the present embodiment is different from the oscillating section 10 of the first embodiment in that, for example, the section of the land section 11 opposed to the frame 20 is not thin-walled in a direction H.

The frame 20 of the present embodiment is different from the frame 20 of the first embodiment in that the extending portion 20A (part of the second layer section 22) extending along the land section 11 of the oscillating section 10 is thinner in the direction H than other parts of the second layer section 22. In FIG. 26, diagonal hatching is provided to illustrate the partially thin-walled sections (that is, the partially recessed sections) of the second layer section 22 of the frame 20.

When driving the micro oscillating device X2, a reference potential is applied to the electrode section 12 of the oscillating section 10 and electrode section 70. The reference potential is applied to the electrode sections 12 and 70 in the same way as in the first embodiment. The reference potential may be, for example, a ground potential and is preferably kept constant.

A higher drive potential than the reference potential is applied to the electrode sections 60 and 80 as required. Generating electrostatic attraction between the electrode sections 12 and 60 in this way allows the oscillating section 10 to rotate around the center of axis A1. Furthermore, generating electrostatic attraction between the electrode sections 70 and 80 allows the frame 20 and oscillating section 10 to rotate around the center of axis A2. The micro oscillating device X2 is a so-called two-axis-type oscillating device. The drive potential is applied to the electrode sections 60 and 80 in the same way as in the first embodiment. A two-axis-type oscillating drive makes it possible to switch reflection directions of light reflected by the mirror surface 11' provided on the land section 11 of the micro oscillating device X2.

The micro oscillating device array Y2 includes the above described plurality of micro oscillating devices X2. In the micro oscillating device array Y2, the plurality of micro oscillating devices X2 are arranged in a row in the direction of the axis A1 so that all axes A2 are parallel to each other (not illustrated in FIG. 24).

In the micro oscillating device array Y2, the frames 30 of the respective micro oscillating devices X2 are integrated into a frame body. The frame 30 surrounds the movable parts of all the micro oscillating devices X2 including the oscillating section 10 and frame 20. The portion 31a of the first layer section 31 of the frame 30 continues across the micro oscillating devices X2. Therefore, the electrode section 12 of the oscillating section 10 and shield section 14, portions 21a and 21c of the first layer section 21 of the frame 20, portion 22a of the second layer section 22, portion 32c of the second layer section 32 of the frame 30, and the electrode section 70 in the micro oscillating devices X2 are electrically connected.

At the time of driving the micro oscillating device array Y2, a reference potential is applied commonly to the electrode section 12 of the oscillating section 10 and electrode section 70 in all the micro oscillating devices X2. In this condition, the drive potential is applied to the electrode sections 60 and 80 of a selected micro oscillating device X2. This causes the oscillating section 10 and frame 20 of each micro oscillating device X2 to be oscillated individually and makes it possible to switch the reflection directions of light reflected by the mirror surface 11' on the land section 11 of the oscillating section 10 of each micro oscillating device X2.

Figure 28:
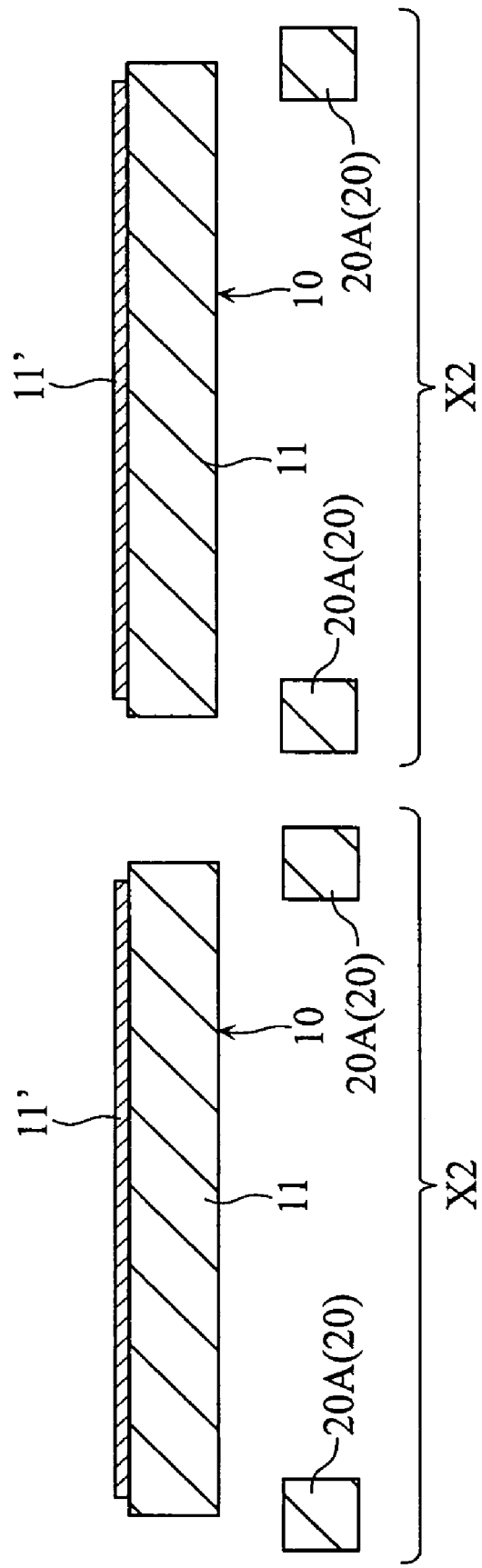
FIG. 28 is a cross-sectional view along the line XXVIII-XXVIII in FIG. 24.

The two extending portions 20A of the frame 20 in the micro oscillating device X2 are spaced apart from the body section in the direction H, that is, the oscillating direction as illustrated in FIG. 27. Furthermore, the two extending portions 20A partially overlap with the land section 11 in the direction parallel to the axis A1. That is, in the micro oscillating device array Y2 in a natural condition (when not driven), the extending portion 20A of the frame 20 is not located between the land sections 11 of two neighboring devices as illustrated in FIG. 28. Therefore, in the micro oscillating device array Y2, it is not necessary to provide a space between two neighboring devices that includes a space corresponding to the full width of each extending portion 20A and a space between the land section 11 of each device and the extending portion 20A. Therefore, in the micro oscillating device array Y2, the land section 11 or body section of neighboring devices may be arranged close to each other. In such a micro oscillating device array Y2, it is possible to increase the occupancy rate of the body section (land section 11, mirror surface 11') in the device array direction. As the occupancy rate of the mirror surface 11' in the device array direction increases, losses in optical signals reflected in the entire micro oscillating device array Y2 may be reduced.

In each micro oscillating device X2, as in the case of the first embodiment, the shield section 14, portion 22a of the second layer section 22 of the frame 20 and the portion 32c of the second layer section 32 of the frame 30 demonstrate an electric field absorbing effect. The electric field absorbing effect suppresses electric field leakage out of the micro oscillating device X2. Suppression of electric field leakage may reduce the adverse effects of electric field leakage out of the drive mechanism made up of the electrode sections 12 and 60 of one micro oscillating device X2 on the drive characteristics of other neighboring micro oscillating devices X2. Therefore, the electric field absorbing effect contributes to an increase of density of the micro oscillating device X2 in the array direction, and by extension, improvement of the occupancy rate of the body section (land section 11, mirror surface 11') of the micro oscillating device X2 in the array direction.

Figure 29:
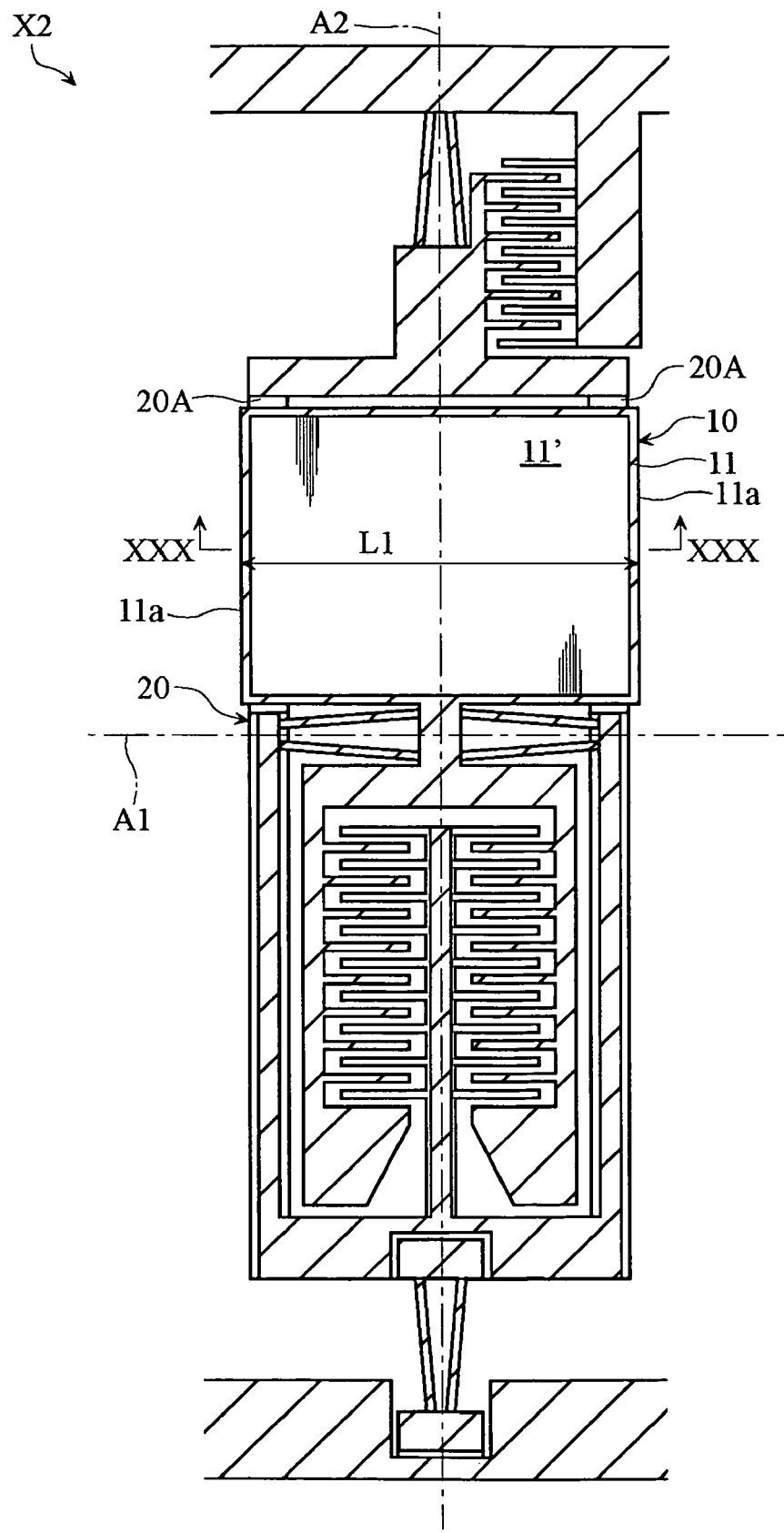
FIG. 29 is a plan view of a first modification example of the micro oscillating device according to the second embodiment.
Figure 30:
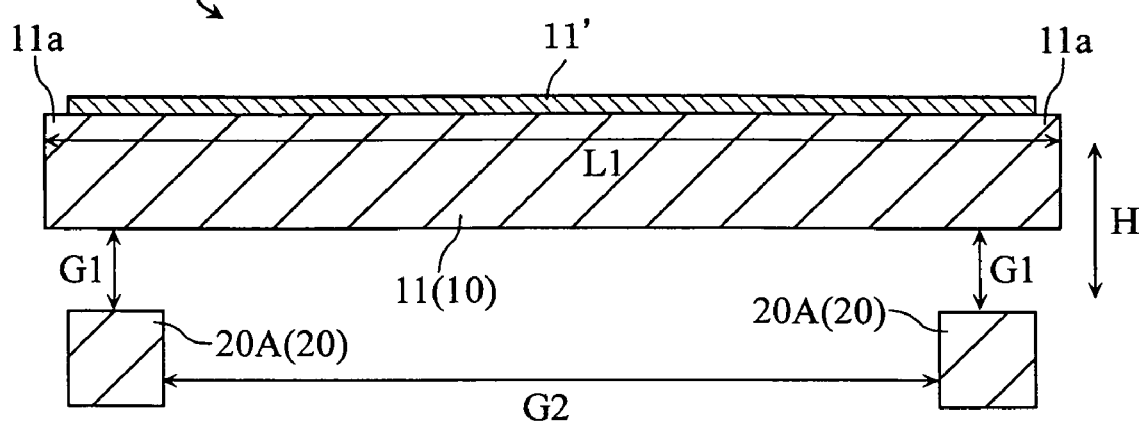
FIG. 30 is a cross-sectional view along the line XXX-XXX in FIG. 29.

FIG. 29 and FIG. 30 illustrate a first modification example of the micro oscillating device X2. FIG. 29 is a plan view of the first modification example. FIG. 30 is a cross-sectional view along the line XXX-XXX of FIG. 29.

As illustrated in FIG. 29 and FIG. 30, in the micro oscillating device X2, the length L1 of the land section 11 in the direction parallel to the axis A1 may be greater than the length L1 of the land section 11 illustrated in FIG. 25 and FIG. 27. To be more specific, it is possible to make the length L1 of the land section 11 greater than the length L1 illustrated in FIG. 25 and FIG. 27 so that the two extending portions 20A of the frame 20 in the direction parallel to the axis A1 are between the ends of the land section 11 or body section. Such a configuration is preferable in making the land section 11 or the body section of the neighboring devices closer to each other, and by extension, contributes to improvement of the occupancy rate of the body section (land section 11, mirror surface 11') in the array direction of the device.

Figure 31:
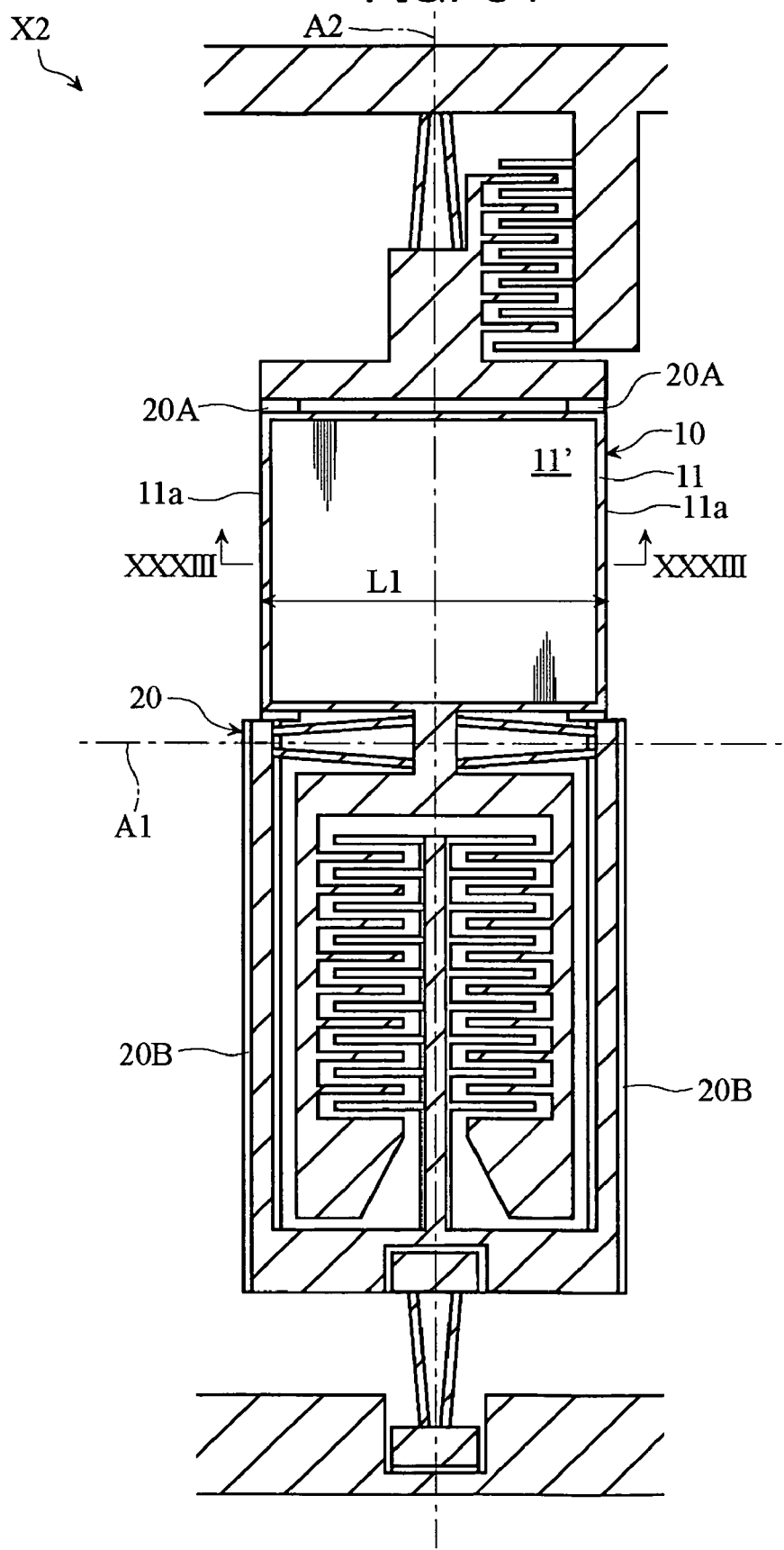
FIG. 31 is a plan view of a second modification example of the micro oscillating device according to the second embodiment.
Figure 32:
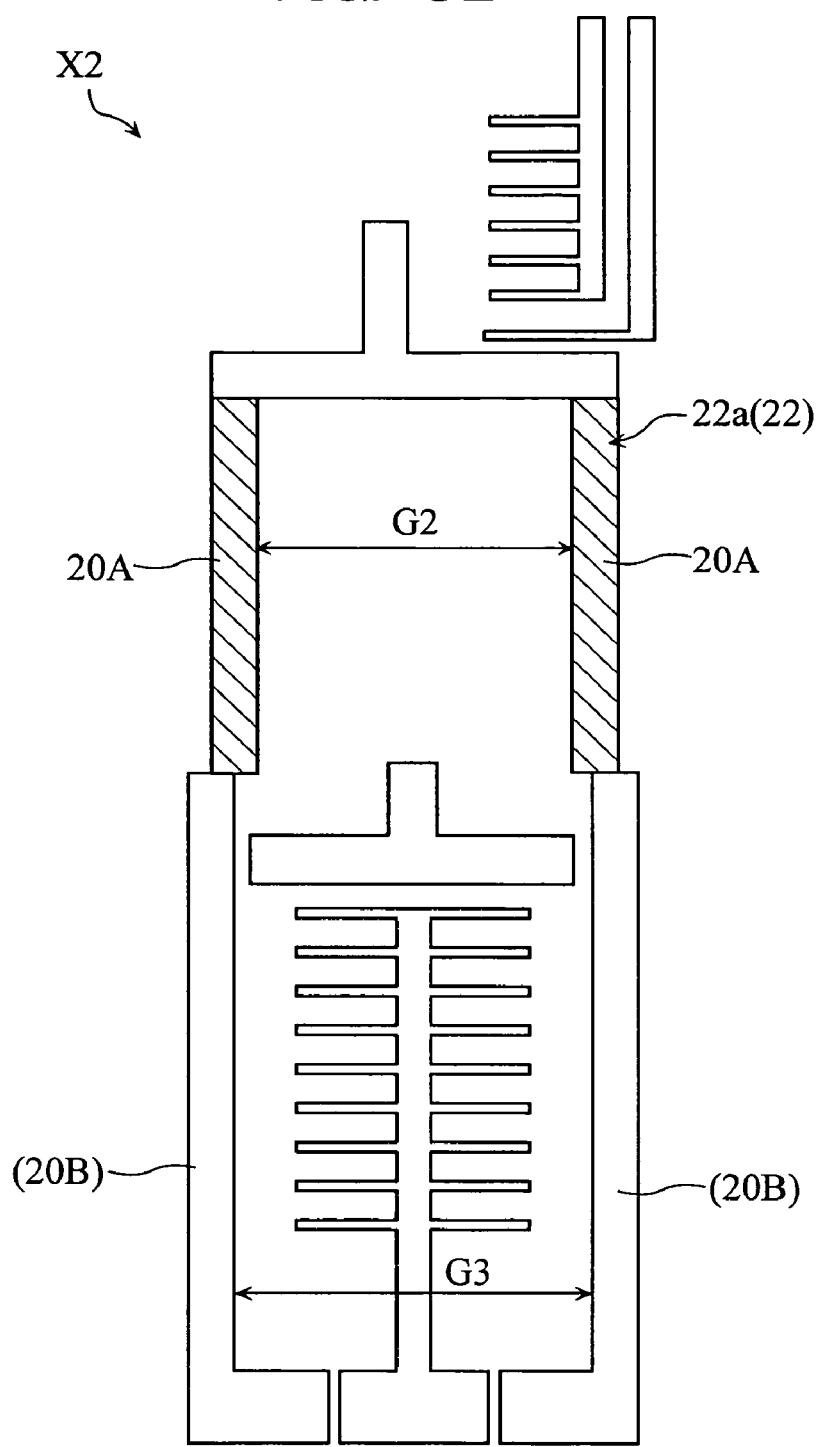
FIG. 32 is a plan view partially illustrating the micro oscillating device illustrated in FIG. 31.
Figure 33:
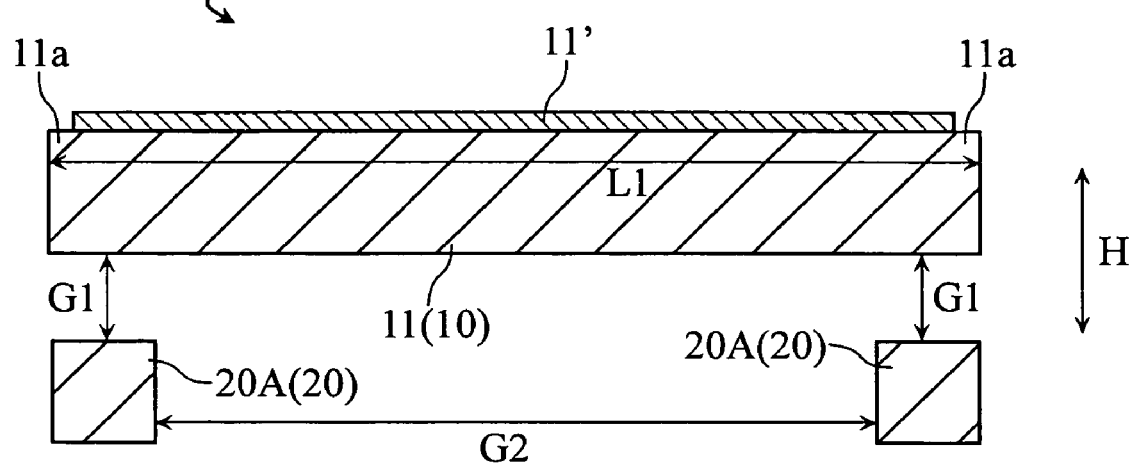
FIG. 33 is a cross-sectional view along the line XXXIII-XXXIII in FIG. 31.

FIG. 31 to FIG. 33 illustrate a second modification example of the micro oscillating device X2. FIG. 31 is a plan view of the second modification example. FIG. 32 is a plan view partially illustrating the second modification example. FIG. 33 is a cross-sectional view along the line XXXIII-XXXIII of FIG. 31.

In the micro oscillating device X2, the distance G2 between the extending portions 20A of the frame 20 as illustrated in FIG. 32 and FIG. 33 may be shorter than the distance G2 illustrated in FIG. 26 and FIG. 27. To be more specific, it is possible to make the distance G2 between the extending portions 20A shorter than the distance G2 illustrated in FIG. 26 and FIG. 27 so that the two extending portions 20A of the frame 20 are between the ends of the land section 11 or body section in the direction parallel to the axis A1. In the present modification example, the distance G2 between the extending portions 20A in the frame 20 is smaller than the distance G3 between the extending portions 20B. Such a configuration is suitable in reducing electric interference between the frames 20 of the neighboring devices. Therefore, the configuration is preferable in allowing the land section 11 or body section be close to the land section 11 or body section of other micro oscillating devices X2, and by extension, contributes to improvement of the occupancy rate of the body section (land section 11, mirror surface 11') in the array direction of the micro oscillating devices X2.

The micro oscillating device X2 may be applied to a sensing device such as an angular velocity sensor or acceleration sensor. The micro oscillating device X2 applied to a sensing device need not be provided with the mirror surface 11' on the land section 11 of the oscillating section 10. The angular velocity detection method using the micro oscillating device X2 applied to an angular velocity sensor is similar, for example, to the angular velocity detection method using the micro oscillating device X1 applied to an angular velocity sensor. The acceleration detection method using the micro oscillating device X2 applied to an acceleration sensor is similar, for example, to the acceleration detection method using the micro oscillating device X1 applied to an acceleration sensor.

FIGS. 34A-34D, FIGS. 35A-35D, and FIG. 36A-36D illustrate an example of the method of manufacturing a micro oscillating device X2 included in the micro oscillating device array Y2. This method is an example of a technique for manufacturing the micro oscillating device X2 using a bulk micro machining technique. FIGS. 34A-34D, FIGS. 35A-35D, and FIGS. 36A-36D illustrate the processes of forming the land section L, beam section B, frames F1, F2 and F3, coupling sections C1 and C2, and electrodes E1 and E2. The land section L corresponds to part of the land section 11. The beam section B corresponds to the beam section 13. The frame F1 corresponds to part of the frame 20. The frame F2 corresponds to the extending portion 20A (part of the portion 22a of the second layer section 22) of the frame 20. The frame F3 corresponds to part of the frame 30. The coupling section C1 corresponds to the coupling section 40. The coupling section C2 corresponds to the coupling sections 40, 50A and 50B. The electrode E1 corresponds to part of the electrode sections 12 and 70. The electrode E2 corresponds to part of the electrode sections 60 and 80.

Figure 34A:
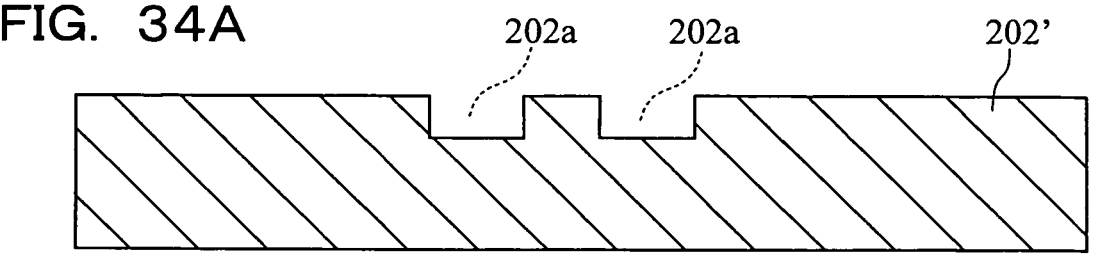
FIGS. 34A-34D illustrate manufacturing processes of the micro oscillating device illustrated in FIG. 25.

In the manufacture of the micro oscillating device X2, a silicon wafer 202' as illustrated in FIG. 34A is prepared. The silicon wafer 202' includes grooves 202a that extend in correspondence with the location at which the extending portion 20A is formed in the frame 20. In the manufacture of such a silicon wafer 202', the silicon wafer is subjected to etching to a specific depth (e.g., 30 µm) by means of DRIE using a resist pattern having an opening corresponding to the grooves 202a as a mask. The thickness of the silicon wafer may be, for example, 200 µm. The silicon wafer 202' is made of a silicon material given conductivity by doping impurities. P-type impurities such as B, and n-type impurities such as P and Sb may be adopted as impurities.

Figure 34B:
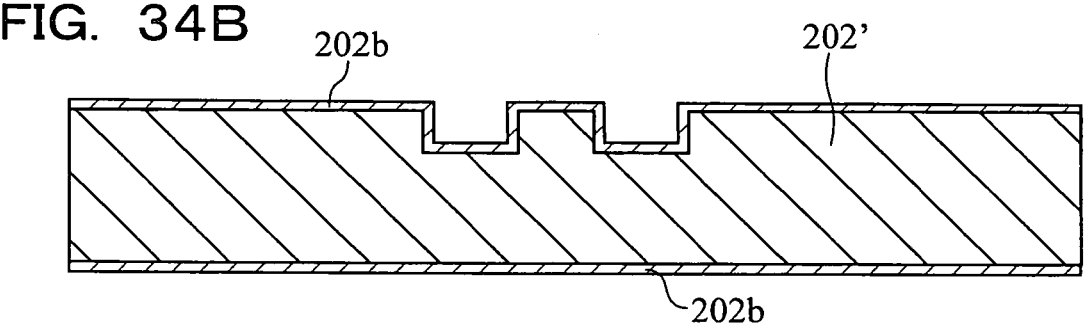

As illustrated in FIG. 34B, an insulating film 202b is formed on the silicon wafer 202'. The insulating film 202b may be formed by, for example, applying thermal oxidation to the surface of the silicon wafer 202'. The thickness of the insulating film 202b may be, for example, 500 nm. A plurality of conductive parts (not illustrated) which become parts of the conductive vias 16, 24 to 26, 34 and 35 are formed in the insulating film 202b. To be more specific, openings are formed at specific locations of the insulating film 202b and the openings are filled with a conductive material. Tungsten or polysilicon, for example, may be used as the conductive material.

Figure 34C:
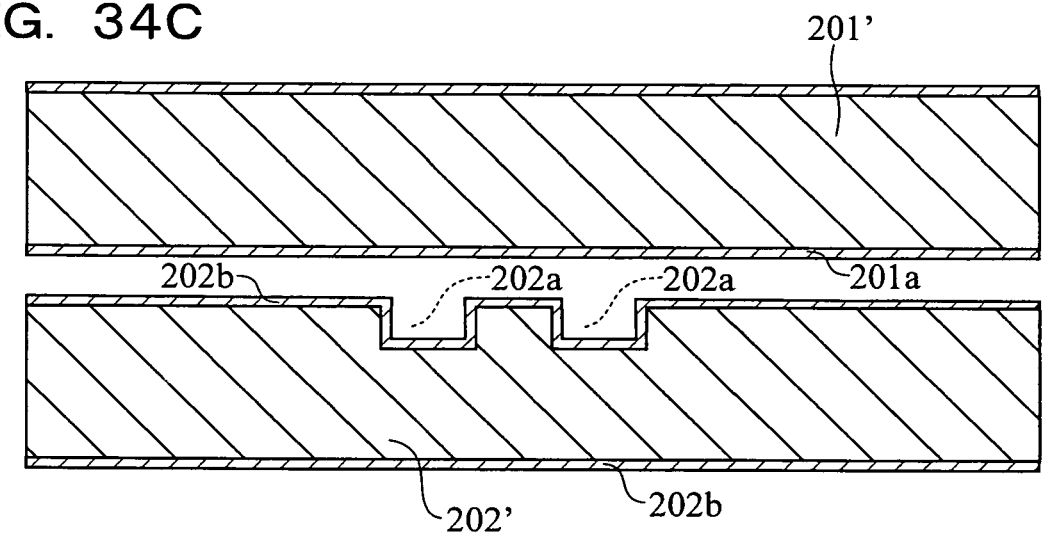

As illustrated in FIG. 34C, a silicon wafer 201', on the surface of which an insulating film 201a is formed, is prepared. The silicon wafer 201' is made of a silicon material given conductivity by doping impurities. P-type impurities such as B, or n-type impurities such as P and Sb may be adopted as impurities. The thickness of the silicon wafer 201' may be, for example, 200 µm. The thickness of the insulating film 201a may be, for example, 500 nm. The insulating film 201a is formed by applying thermal oxidation to the surface of the silicon wafer 201'. Furthermore, a plurality of conductive parts (not illustrated) which become parts of the conductive vias 16, 24 to 26, 34 and 35 of the micro oscillating device X2 are formed in the insulating film 201a. Such conductive parts are formed by forming openings at specific locations of the insulating film 201a and filling the openings with a conductive material. As the conductive material, for example, tungsten or polysilicon may be adopted.

Figure 34D:
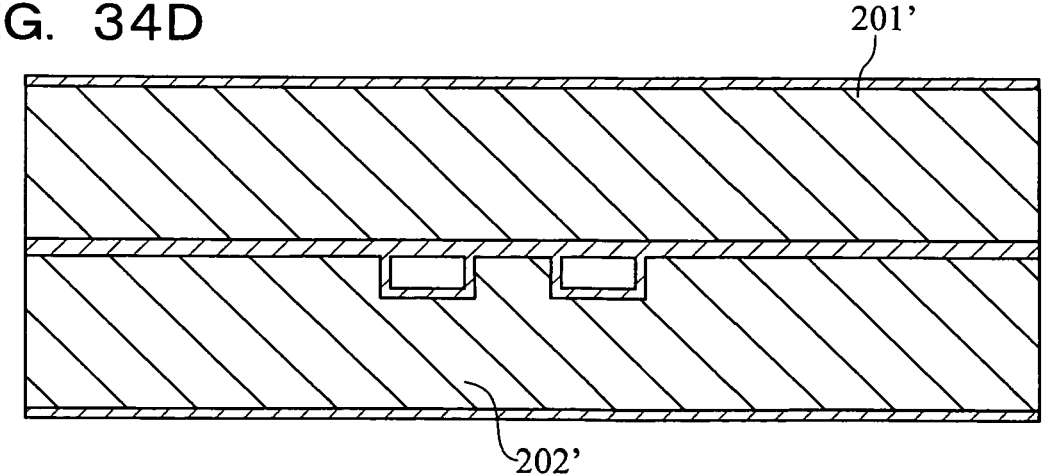

As illustrated in FIG. 34D, the silicon wafers 201' and 202' are aligned with each other and both wafers are bonded together. Thus, the conductive vias 16, 24 to 26, 34 and 35 are formed of the aforementioned conductive parts formed in the insulating film 201a and the aforementioned conductive parts formed in the insulating film 202b. The silicon wafers 201' and 202' may be pasted together, for example, by pasting both wafers together in a clean environment and annealing the wafers in a nitrogen atmosphere at a high annealing temperature of, for example, 1200° C. Before pasting the silicon wafers 201' and 202', the silicon wafers 201' and 202' may also be cleaned with an aqueous solution of ammonium.

Figure 35A:
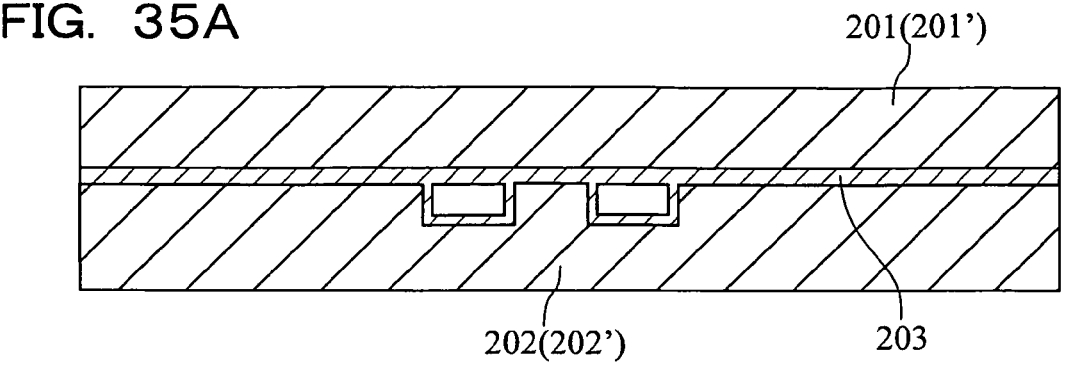
FIGS. 35A-35D illustrate manufacturing processes following FIG. 34.

The silicon wafers 201' and 202' are subjected to polishing so that the thickness of the silicon wafers 201' and 202' is reduced to a desired thickness as illustrated in FIG. 35A. Thus, a material substrate 200 having a multilayered structure is obtained, which includes the silicon layer 201, the silicon layer 202 including the grooves 202a, and the insulating layer 203 between the silicon layers 201 and 202. The material substrate 200 is a so-called SOI wafer. The aforementioned conductive vias 16, 24 to 26, 34, and 35 are formed at specific locations of the insulating layer 203 of the material substrate 200. The thickness of the silicon layer 201 may be, for example, 20 to 200 µm. The thickness of the silicon layer 202 may be, for example, 20 to 200 µm. The thickness of the insulating layer 203 may be, for example, 0.3 to 2 µm.

Figure 35B:
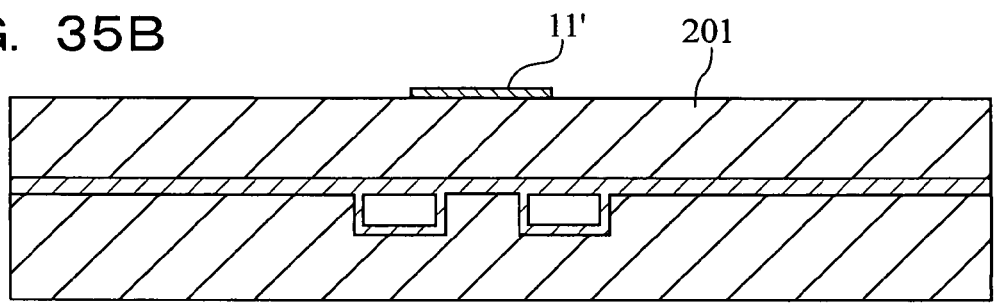

Next, as illustrated in FIG. 35B, a mirror surface 11' is formed on the silicon layer 201. The method of forming the mirror surface 11' is similar to that of the first embodiment.

Figure 35C:
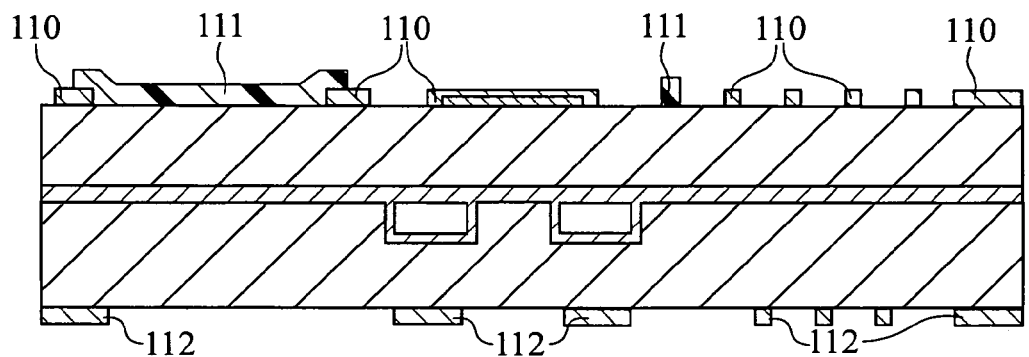

Next, as illustrated in FIG. 35C, an oxide film pattern 110 and a resist pattern 111 are formed on the silicon layer 201. Furthermore, an oxide film pattern 112 is formed on the silicon layer 202. The pattern shape and technique of forming the oxide film patterns 110 and 112 and resist pattern 111 are similar to those of the first embodiment.

Figure 35D:
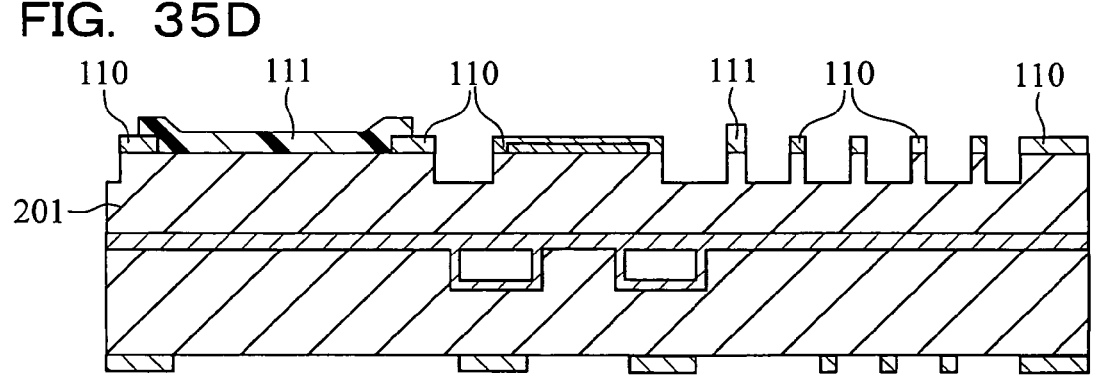

Next, as illustrated in FIG. 35D, the silicon layer 201 is subjected to etching by means of DRIE to a specific depth using the oxide film pattern 110 and resist pattern 111 as a mask. The specific depth is a depth corresponding to the thicknesses of the coupling sections C1 and C2 which may be, for example, 5 μm.

Figure 36A:
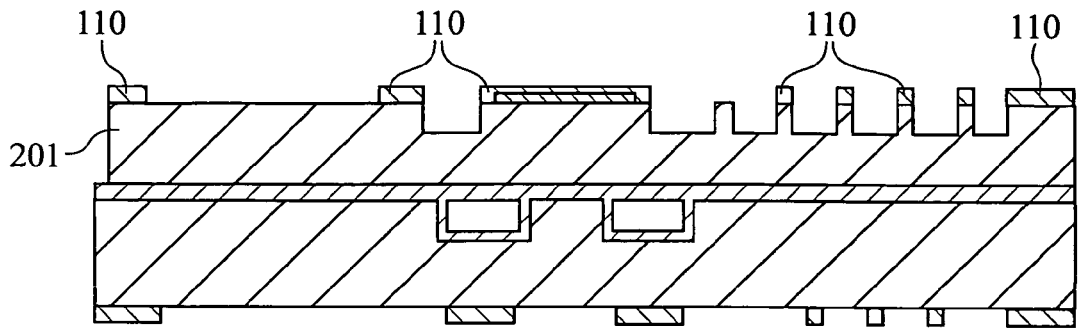
FIGS. 36A-36D illustrate manufacturing process following FIG. 35.

As illustrated in FIG. 36A, the resist pattern 111 is removed. For example, the resist pattern 111 may be peeled off by exposing the resist pattern 111 to a peeling liquid.

Figure 36B:
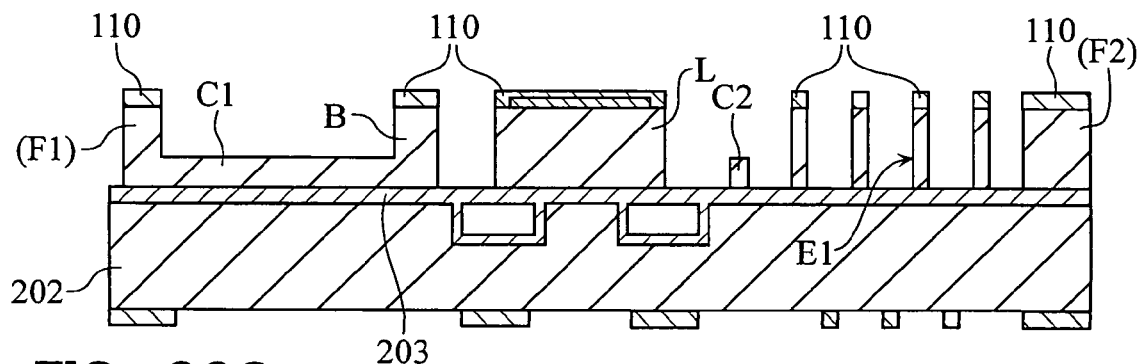

As illustrated in FIG. 36B, the silicon layer 201 is subjected to etching by means of DRIE using the oxide film pattern 110 as a mask. In this case, the coupling sections C1 and C2 are kept. In this process, the land section L, the beam section B, the electrode E1, part of the frame F1 (first layer section 21 of the frame 20), part of the frame F3 (first layer section 31 of the frame 30), and the coupling sections C1 and C2 are formed.

Figure 36C:
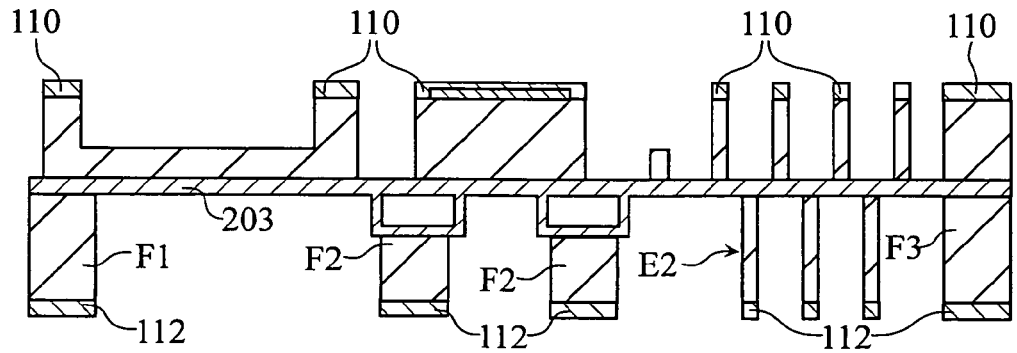

As illustrated in FIG. 36C, the silicon layer 202 is subjected to etching by means of DRIE using the oxide film pattern 112 as a mask. In this process, part of the frame F1 (second layer section 22 of frame 20), frame F2 (extending portion 20A as part of second layer section 22 of the frame 20), part of the frame F3 (second layer section 32 of the frame 30), and the electrode E2 are formed.

Figure 36D:
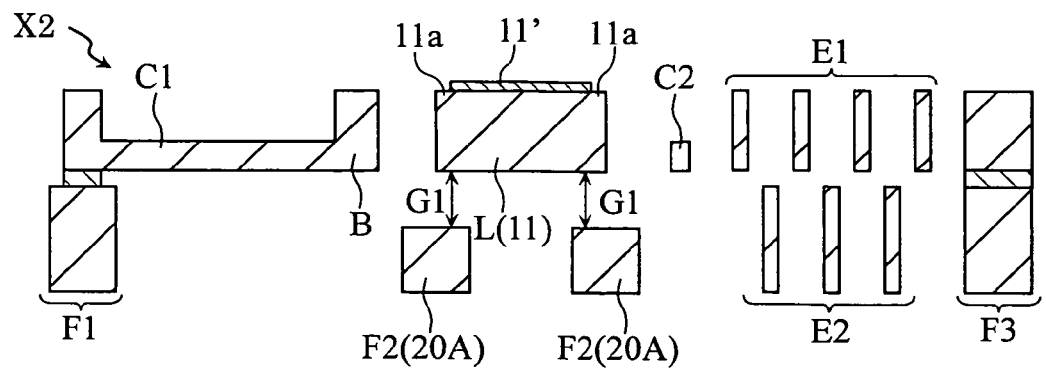

Next, as illustrated in FIG. 36D, the exposed section of the insulating layer 203 and the oxide film patterns 110 and 112 are removed by etching. The etching technique is similar to that of the first embodiment.

Through the above described processes, the micro oscillating device X2 including the land section L, beam section B, frames F1, F2 and F3, coupling sections C1 and C2, and the electrodes E1 and E2 are manufactured.

The extending portions 20A in the frame 20 are derived from the partially thin-walled sections so that the plane on the insulating layer 203 side of the silicon layer 202 of the material substrate 200 is retracted from the insulating layer 203. The distance G1 between the facing section 11a of the oscillating section 10 of the micro oscillating device X2 in the land section 11 and between the extending portion 20A of the frame 20 in the second layer section 22 is greater than the thickness of the insulating layer 203 (intermediate layer) of the material substrate 200. Thus, the present embodiment ensures a sufficient distance G1 between the land section 11 and the extending portion 20A.

Figure 37:
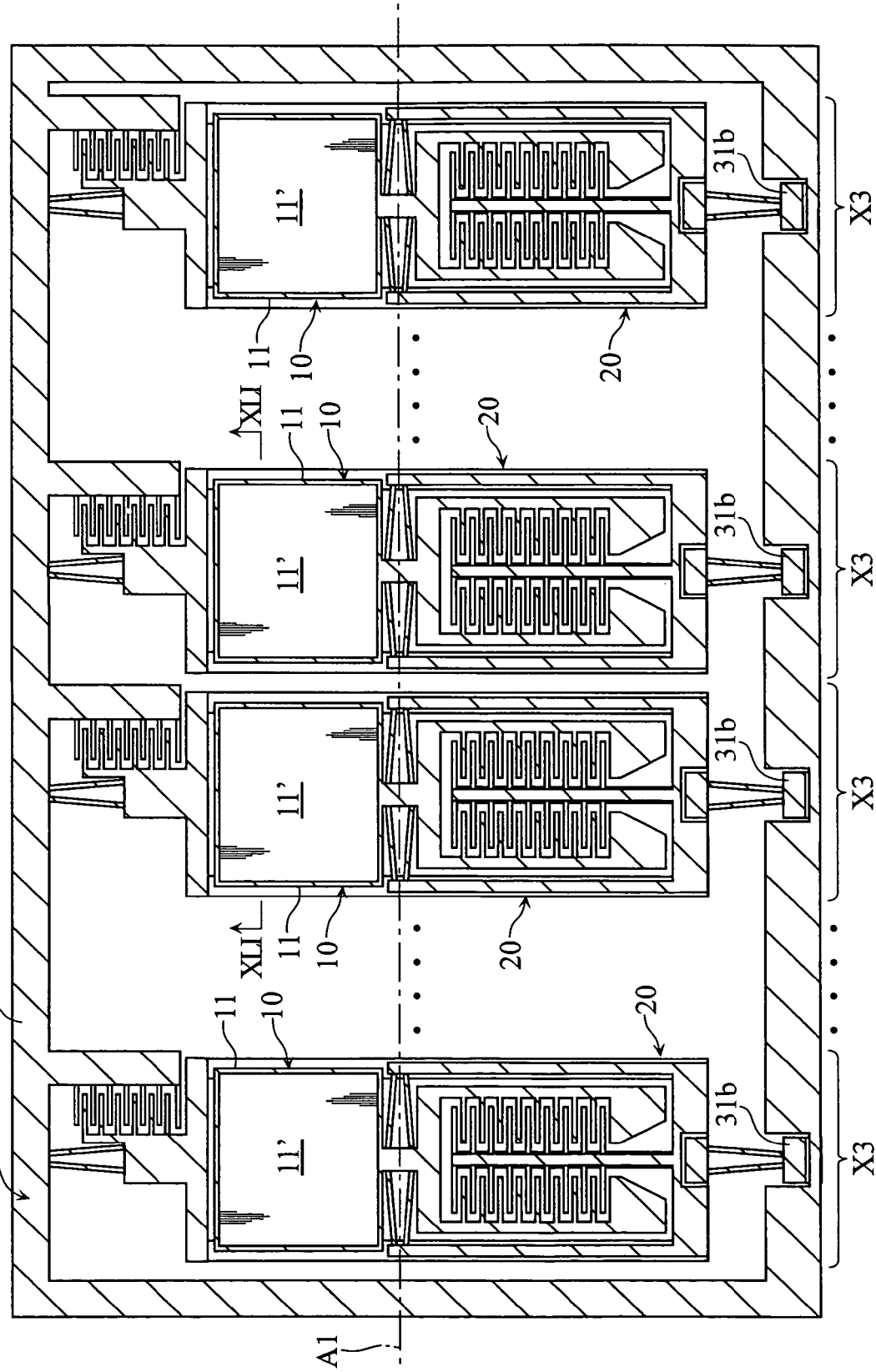
FIG. 37 is a plan view of a micro oscillating device array according to a third embodiment.

FIG. 37 is a plan view of a micro oscillating device array Y3 according to a third embodiment. The micro oscillating device array Y3 includes a plurality of micro oscillating devices X3 (some micro oscillating devices are omitted).

Figure 38:
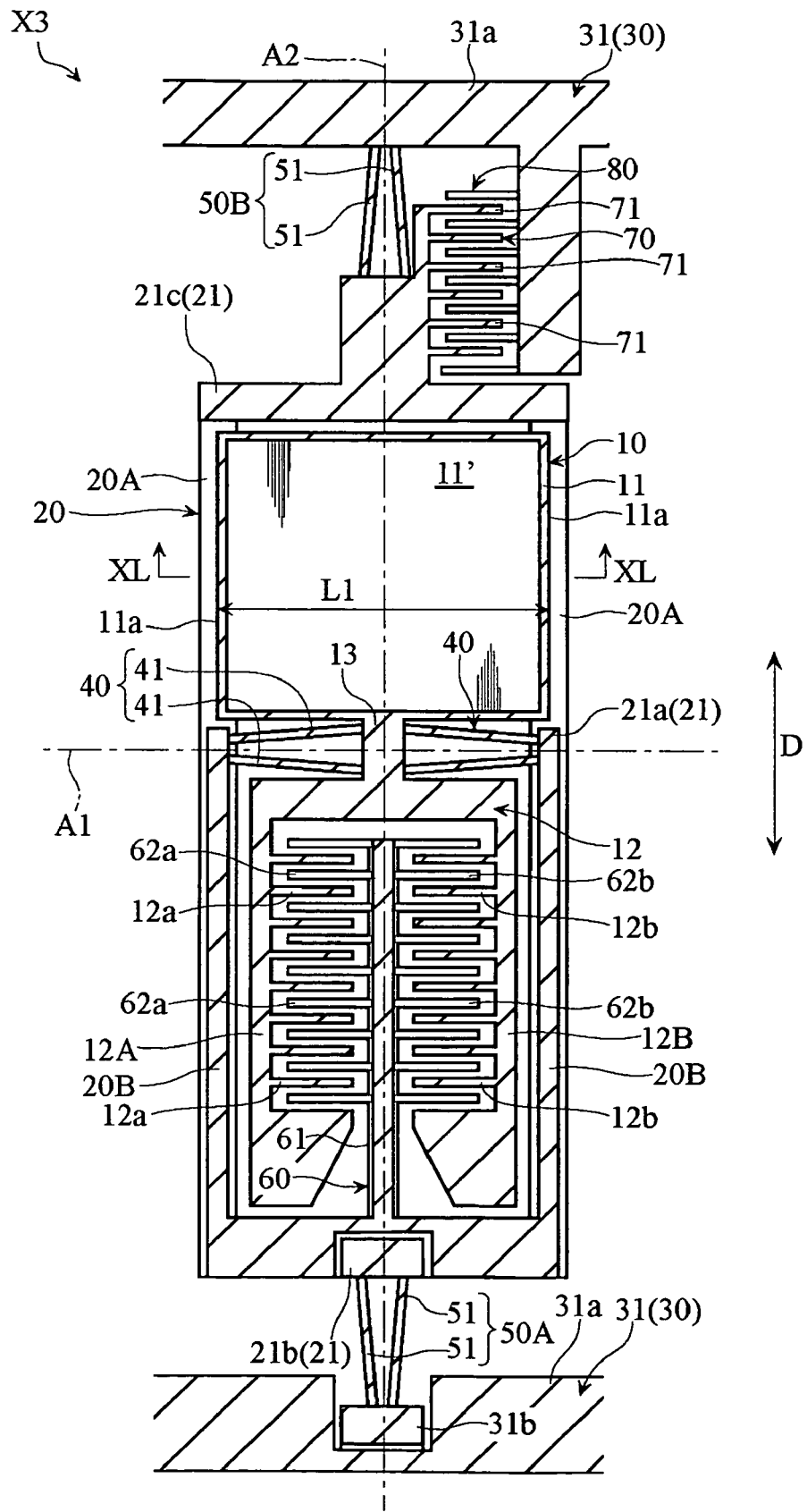
FIG. 38 is a plan view of a micro oscillating device included in the micro oscillating device array illustrated in FIG. 37.
Figure 39:
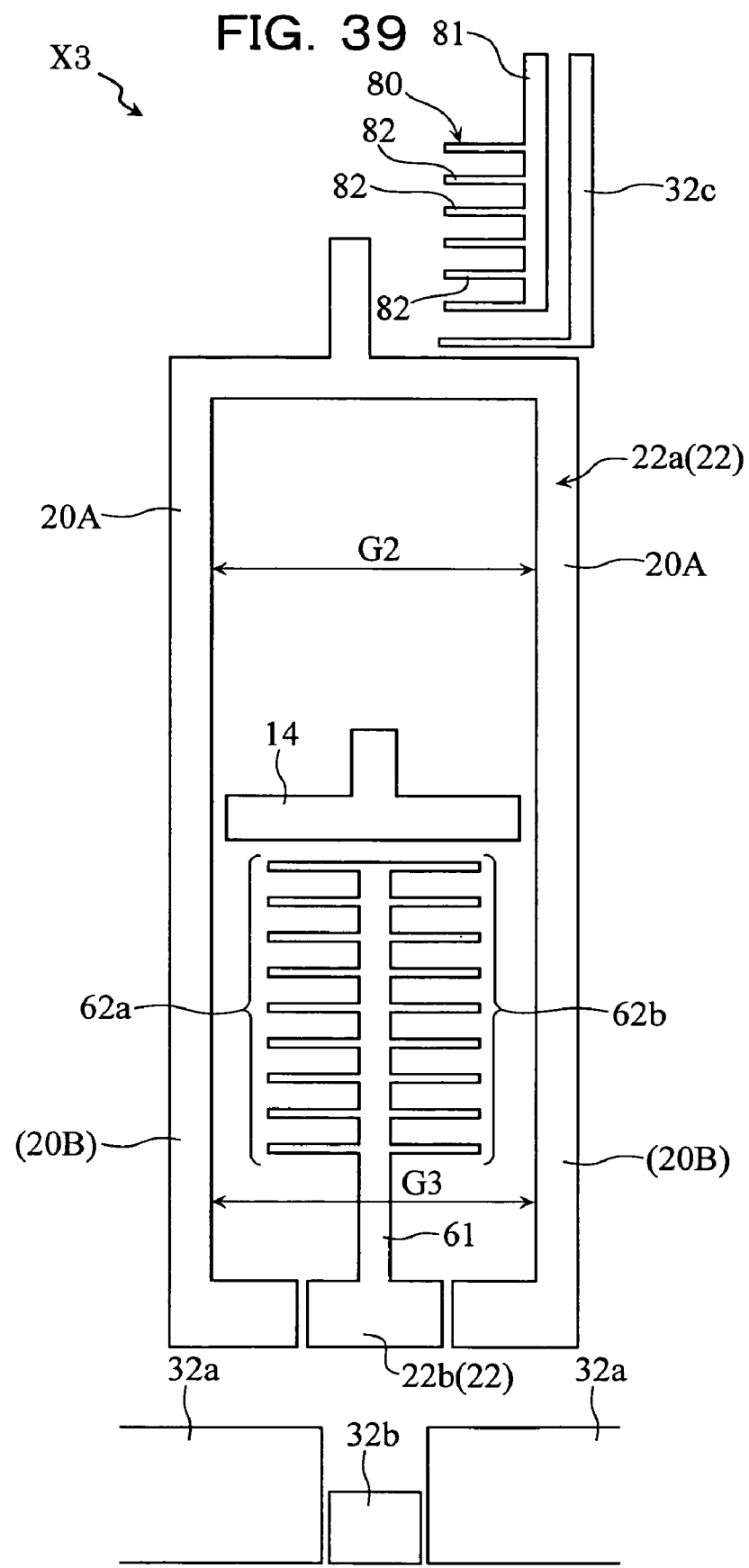
FIG. 39 is a plan view partially illustrating the micro oscillating device illustrated in FIG. 38.
Figure 40:
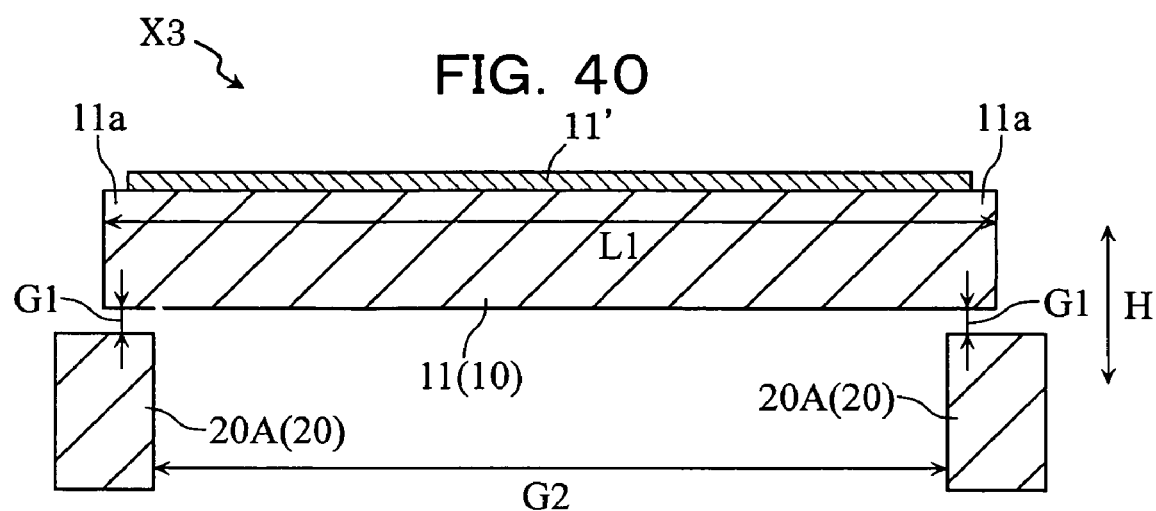
FIG. 40 is a cross-sectional view along the line XL-XL in FIG. 38.

FIG. 38 to FIG. 40 illustrate the micro oscillating device X3 included in the micro oscillating device array Y3. FIG. 38 is a plan view of the micro oscillating device X3. FIG. 39 is a plan view partially illustrating the micro oscillating device X3. FIG. 40 is a cross-sectional view along the line XL-XL of FIG. 38.

The micro oscillating device X3 includes an oscillating section 10, a frame 20, a frame 30, a pair of coupling sections 40, a pair of coupling sections 50A and 50B, and electrode sections 60, 70, and 80. The micro oscillating device X3 may be applied to, for example, a micro mirror device. Furthermore, the micro oscillating device X3 is manufactured by processing a material substrate using a bulk micro machining technique such as a MEMS technique. The material substrate has a multilayered structure including a first silicon layer, a second silicon layer, and an insulating layer between the first and second silicon layers. The first and second silicon layers are given conductivity by doping impurities. The above described parts of the micro oscillating device X3 are derived and formed from the first silicon layer or second silicon layer. Therefore, from the standpoint of clarity of drawings, FIG. 37 and FIG. 38 illustrate parts that protrude outward (i.e., in the direction H as illustrated in FIG. 40) from the insulating layer derived from the first silicon layer with diagonal hatching. Furthermore, the structure illustrated in FIG. 39 is derived from the second silicon layer in the micro oscillating device X3.

Part of the structure of the oscillating section 10 of the micro oscillating device X3 is different from the micro oscillating device X1 according to the first embodiment.

The oscillating section 10 of the present embodiment differs from the oscillating section 10 of the first embodiment in that the section (opposed section 11a) of the land section 11 opposed to the frame 20 is not thin-walled in a direction H.

At the time of driving the micro oscillating device X3, a reference potential is applied to an electrode section 12 and the electrode section 70 of the oscillating section 10. The reference potential is applied to the electrode section 12 and electrode section 70 in the same way as in the first embodiment. The reference potential may be, for example, a ground potential and is preferably kept constant.

A higher drive potential than the reference potential is applied to the respective electrode sections 60 and 80 as required. Thus, generating electrostatic attraction between the electrode sections 12 and 60 in this way allows the oscillating section 10 to be rotated around the center of axis A1. Furthermore, generating electrostatic attraction between the electrode sections 70 and 80 allows the frame 20 and oscillating section 10 to be rotated around the center of axis A2. The micro oscillating device X3 is a so-called two-axis type oscillating device. The drive potential is applied to the electrode sections 60 and 80 in the same way as in the first embodiment. A two-axis-type oscillating drive makes it possible to switch reflection directions of light reflected by the mirror surface 11' provided on the land section 11 of the micro oscillating device X3.

The micro oscillating device array Y3 includes the above described plurality of micro oscillating devices X3. In the micro oscillating device array Y3, the plurality of micro oscillating devices X3 are arranged in a row in the direction of the axis A1 so that all axes A2 are parallel to each other (not illustrated in FIG. 37).

In the micro oscillating device array Y3, the frame 30 of each micro oscillating device X3 is integrated into a frame body. The frame 30 surrounds the movable parts of all the micro oscillating devices X3 including the oscillating section 10 and frame 20. The portion 31a of the first layer section 31 of the frame 30 continues across all the micro oscillating devices X3. Therefore, the electrode section 12 of the oscillating section 10 and shield section 14, portions 21a and 21c of the first layer section 21 of the frame 20, portion 22a of the second layer section 22, portion 32c of the second layer section 32 of the frame 30, and the electrode section 70 in the micro oscillating devices X3 are electrically connected.

At the time of driving the micro oscillating device array Y3, a reference potential is applied commonly to the electrode section 12 and electrode section 70 of the oscillating section 10 in all the micro oscillating devices X3. In this condition, the drive potential is applied to the electrode sections 60 and 80 of a selected micro oscillating device X3. This causes the oscillating section 10 and frame 20 of each micro oscillating device X3 to be oscillated individually and so makes it possible to switch the reflection directions of light reflected by the mirror surface 11' on the land section 11 of the oscillating section 10 of each micro oscillating device X3.

Figure 41:
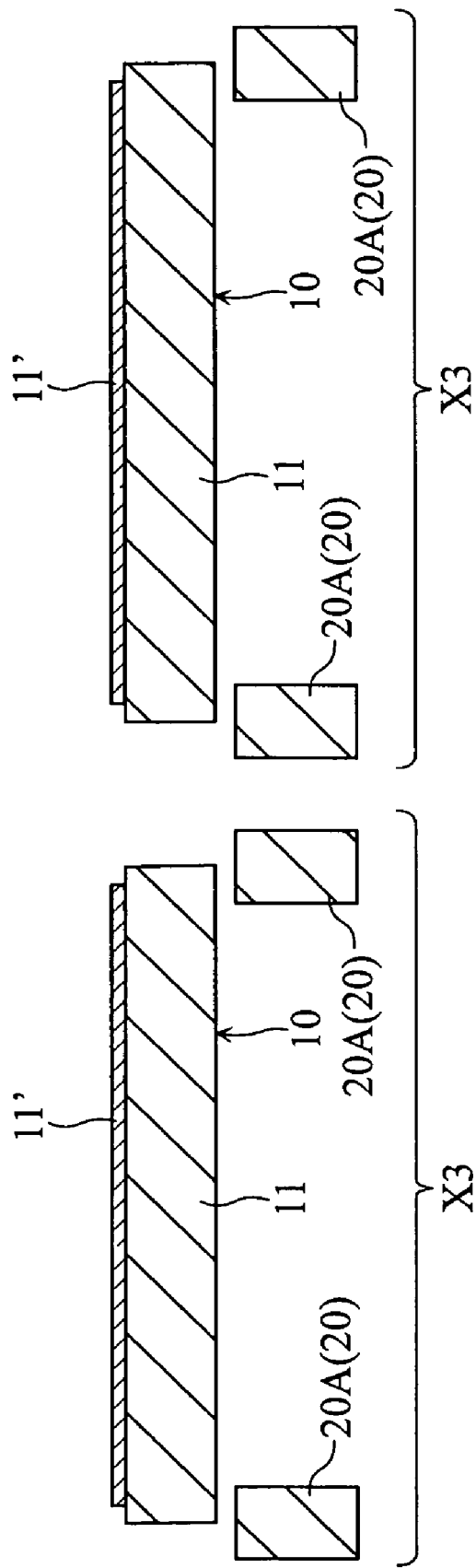
FIG. 41 is a cross-sectional view along the line XLI-XLI in FIG. 37.

The two extending portions 20A of the frame 20 in the micro oscillating device X3 are spaced apart from the body section in the direction H as illustrated in FIG. 40. Furthermore, the two extending portions 20A partially overlap the land section 11 in the direction parallel to the axis A1. That is, in the micro oscillating device array Y3 in a natural condition (when not driven), the extending portion 20A of the frame 20 is not located between the land sections 11 of neighboring two devices as illustrated in FIG. 41. Therefore, in the micro oscillating device array Y3, it is not necessary to provide a space between two neighboring devices that includes a space corresponding to the full width of each extending portion 20A and a space between the land section 11 of each device and the extending portion 20A. Therefore, the micro oscillating device array Y3 allows the land section 11 or body section in the neighboring devices to be arranged close to each other. Therefore, in the micro oscillating device array Y3, the land section 11 or body section in neighboring devices may be arranged sufficiently close to each other. In such a micro oscillating device array Y3, it is possible to increase the occupancy rate of the body section (land section 11, mirror surface 11') in the device array direction. As the occupancy rate of the mirror surface 11' in the device array direction increases, losses in optical signal reflected in the entire micro oscillating device array Y3 may be reduced.

In each micro oscillating device X3 of the micro oscillating device array Y3, as in the case of the first embodiment, the shield section 14, portion 22a of the second layer section 22 of the frame 20, and the portion 32c of the second layer section 32 of the frame 30 demonstrate an electric field absorbing effect. The electric field absorbing effect suppresses electric field leakage out of the micro oscillating device X3. Such suppression of electric field leakage may reduce the adverse affect of electric field leakage from the drive mechanism made up of the electrode sections 12 and 60 of one micro oscillating device X3 on the drive characteristics of neighboring micro oscillating devices X3. Therefore, the electric field absorbing effect contributes to an increase in density of the micro oscillating device X3 in the array direction, and by extension, improvement of the occupancy rate of the body section (land section 11, mirror surface 11') of the device in the array direction.

Figure 42:
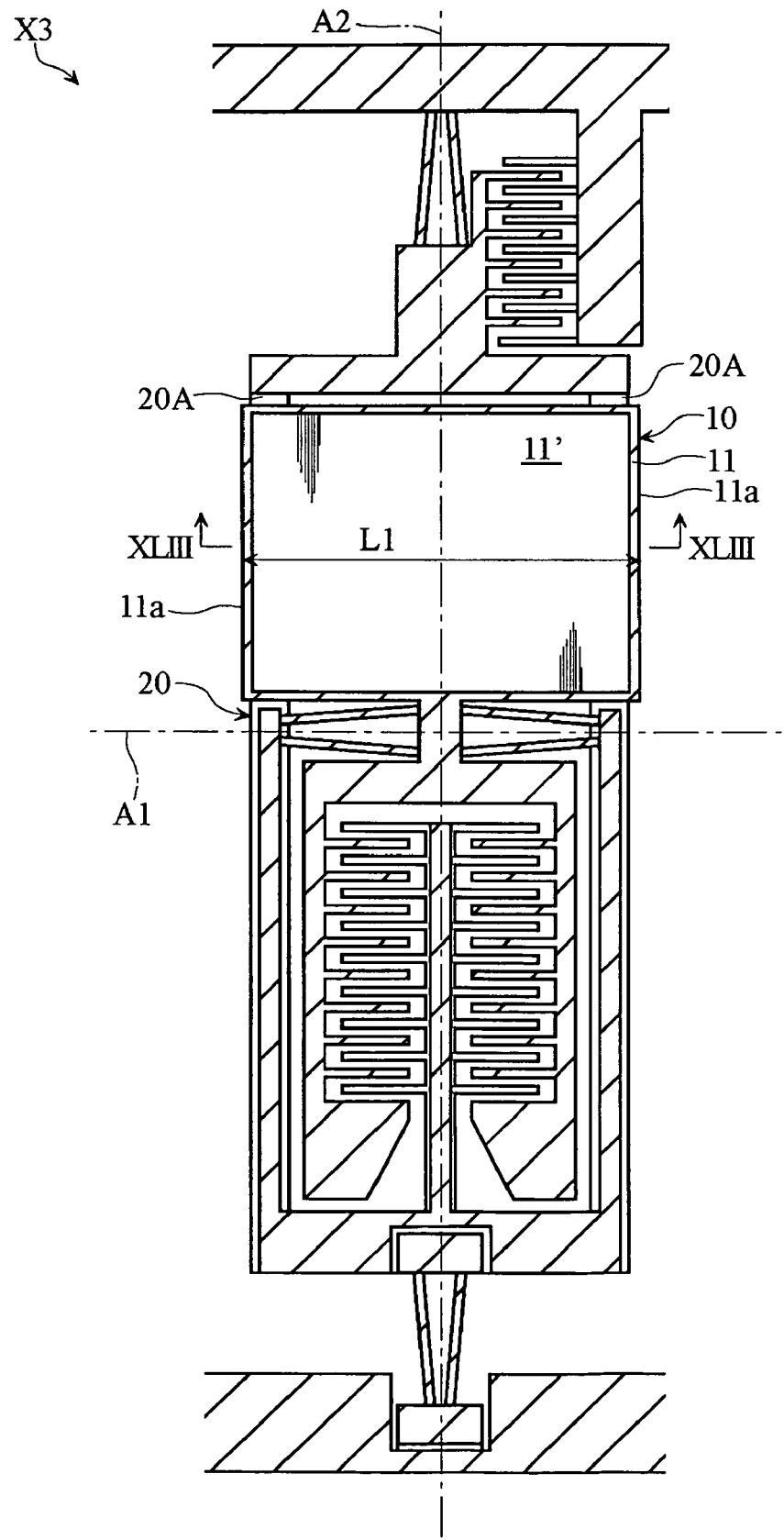
FIG. 42 is a plan view of a first modification example of the micro oscillating device according to the third embodiment.
Figure 43:
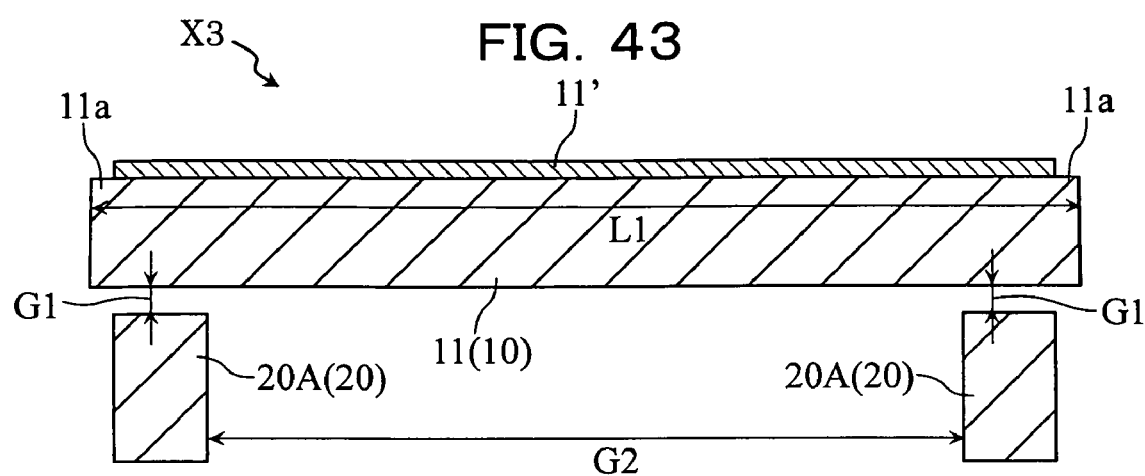
FIG. 43 is a cross-sectional view along the line XLIII-XLIII in FIG. 42.

FIG. 42 and FIG. 43 illustrate a first modification example of the micro oscillating device X3. FIG. 42 is a plan view of the first modification example. FIG. 43 is a cross-sectional view along the line XLIII-XLIII of FIG. 42.

As illustrated in FIG. 42 and FIG. 43, in the micro oscillating device X3, the length L1 of the land section 11 in the direction parallel to the axis A1 may be greater than the length L1 of the land section 11 illustrated in FIG. 38 and FIG. 40. To be more specific, it is possible to make the length L1 of the land section 11 greater than the length L1 illustrated in FIG. 38 and FIG. 40 so that the two extending portions 20A of the frame 20 in the direction parallel to the axis A1 are between the ends of the land section 11 or body section. Such a configuration is preferable in allowing the land section 11 or body section of the neighboring devices to be close to each other in the micro oscillating device array Y3, and by extension, contributes to the improvement of the occupancy rate of the body section (land section 11, mirror surface 11') in the array direction of the device.

Figure 44:
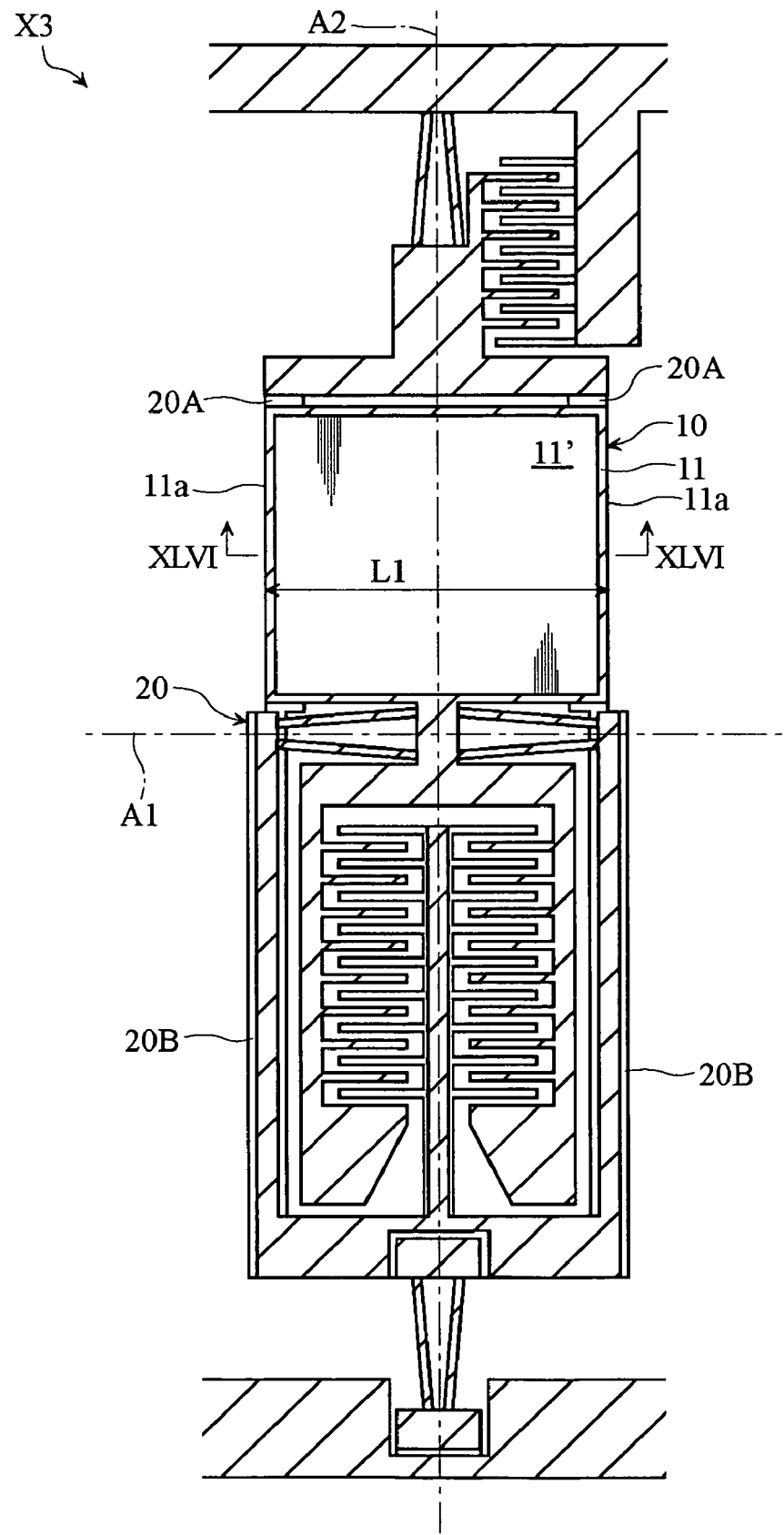
FIG. 44 is a plan view of a second modification example of the micro oscillating device according to the third embodiment.
Figure 45:
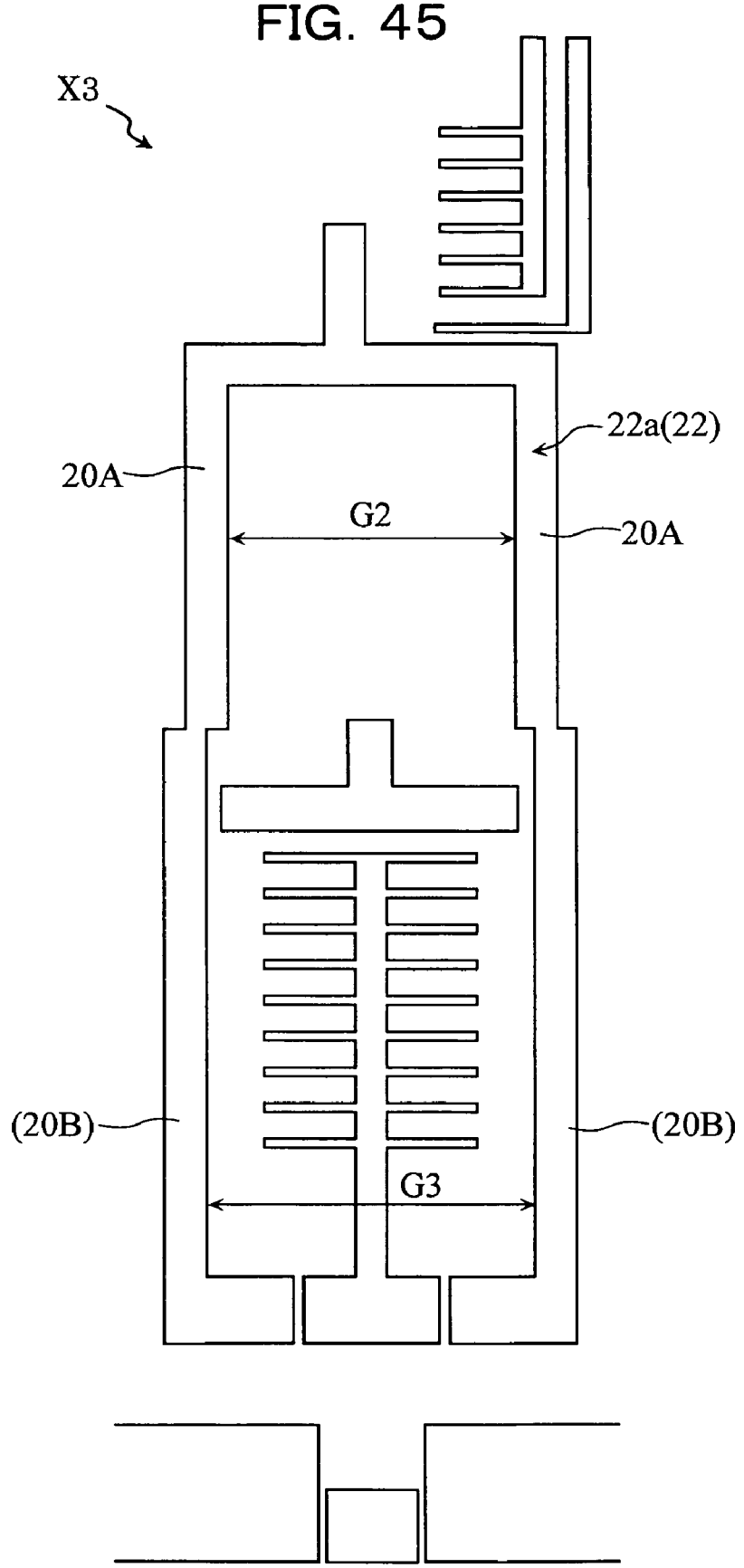
FIG. 45 is a simplified plan view of the micro oscillating device illustrated in FIG. 44.
Figure 46:
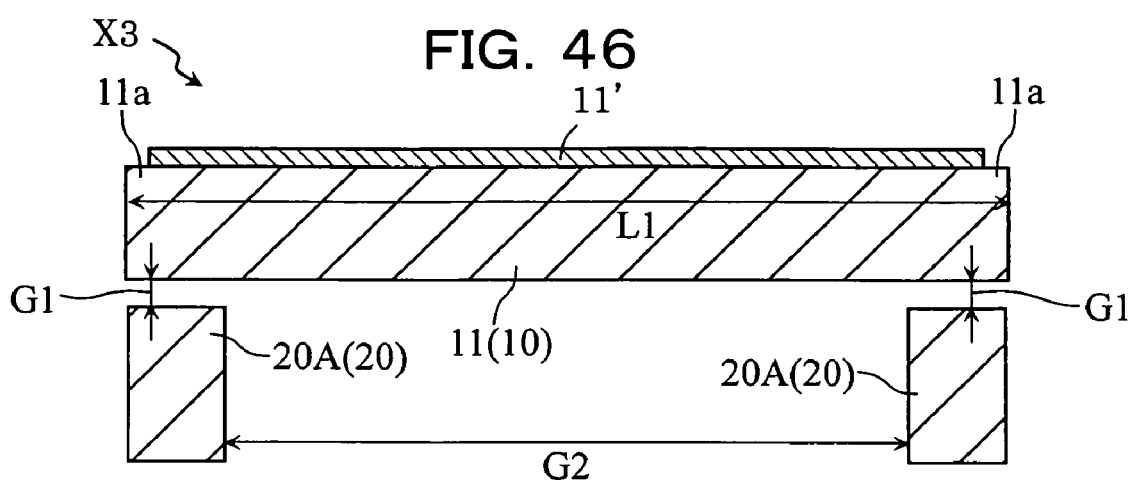
FIG. 46 is a cross-sectional view along the line XLVI-XLVI in FIG. 44.

FIG. 44 to FIG. 46 illustrate a second modification example of the micro oscillating device X3. FIG. 44 is a plan view of the second modification example. FIG. 45 is a plan view partially illustrating the second modification example. FIG. 46 is a cross-sectional view along a line XLVI-XLVI of FIG. 44.

In the micro oscillating device X3, the distance G2 between the extending portions 20A of the frame 20 as illustrated in FIG. 45 and FIG. 46 may be made shorter than the distance G2 illustrated in FIG. 39 and FIG. 40. To be more specific, it is possible to make the distance G2 between the extending portions 20A shorter than the distance G2 illustrated in FIG. 39 and FIG. 40 so that the two extending portions 20A of the frame 20 are between the ends of the land section 11 or body section in the direction parallel to the axis A1. In the present modification example, the distance G2 between the extending portions 20A in the frame 20 is smaller than the distance G3 between the extending portions 20B. Such a configuration is suitable in reducing electric interference between the frames 20 of the neighboring devices. Therefore, the configuration is preferable in allowing the land section 11 or body section to be close to the land section 11 or body section of neighboring devices, and by extension, contributes to the improvement of the occupancy rate of the body section (land section 11, mirror surface 11') in the array direction of the micro oscillating devices X3.

The micro oscillating device X3 may be applied to a sensing device such as an angular velocity sensor or acceleration sensor. The micro oscillating device X3 applied to a sensing device need not be provided with the mirror surface 11' on the land section 11 of the oscillating section 10. The angular velocity detection method using the micro oscillating device X3 applied to an angular velocity sensor is similar, for example, to the angular velocity detection method using the micro oscillating device X1 applied to an angular velocity sensor. The acceleration detection method using the micro oscillating device X3 applied to an acceleration sensor is similar, for example, to the acceleration detection method using the micro oscillating device X1 applied to an acceleration sensor.

FIGS. 47A-47D, FIGS. 48A-48D, and FIGS. 49A-49C illustrate an example of the method of manufacturing a micro oscillating device X3 included in the micro oscillating device array Y3. This method is a technique for manufacturing the micro oscillating device X3 using a bulk micro machining technique. FIGS. 47A-47D, FIGS. 48A-48D, and FIGS. 49A-49C illustrate the processes of forming the land section L, the beam section B, the frames F1, F2 and F3, the coupling sections C1 and C2, and the electrodes E1 and E2. The land section L corresponds to part of the land section 11. The beam section B corresponds to the beam section 13. The frame F1 corresponds to part of the frame 20. The frame F2 corresponds to the extending portion 20A (part of the portion 22a of the second layer section 22) of the frame 20. The frame F3 corresponds to part of the frame 30. The coupling section C1 corresponds to the coupling section 40. The coupling section C2 corresponds to the coupling sections 40, 50A, and 50B. The electrode E1 corresponds to part of the electrode sections 12 and 70. The electrode E2 corresponds to part of the electrode sections 60 and 80.

Figure 47A:
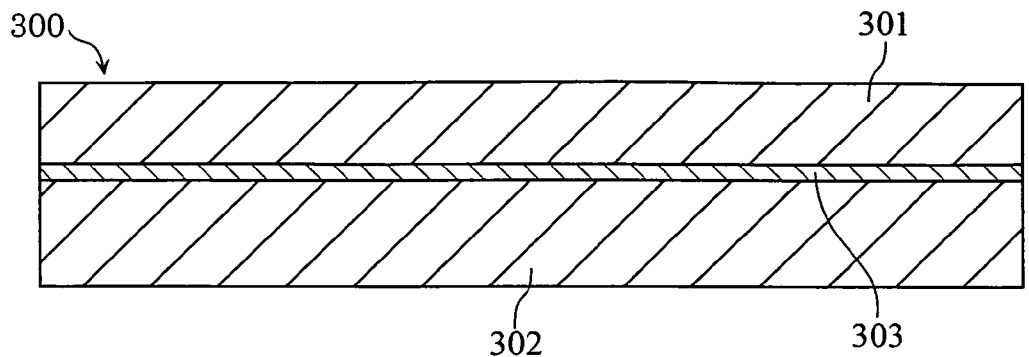
FIGS. 47A-47D illustrate manufacturing processes of the micro oscillating device illustrated in FIG. 38.

In the manufacture of the micro oscillating device X3, a material substrate 300 illustrated in FIG. 47A is prepared. The material substrate 300 is a so-called SOI wafer and has a multilayered structure including silicon layers 301 and 302 and an insulating layer 303 between the silicon layers 301 and 302. Conductive vias, which become conductive vias 16, 24 to 26, 34 and 35, are embedded in the material substrate 300. The silicon layers 301 and 302 are made of a silicon material given conductivity by doping impurities. P-type impurities such as B, or n-type impurities such as P and Sb are adopted as impurities. The insulating layer 303 may be made of, for example, silicon oxide. The thickness of the silicon layer 301 may be, for example, 20 to 200 µm. The thickness of the silicon layer 302 may be, for example, 20 to 200 µm. The thickness of the insulating layer 303 may be, for example, 0.3 to 2 µm.

Figure 47B:
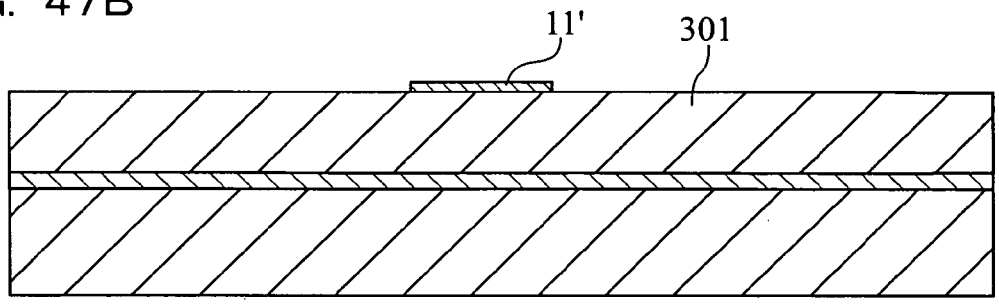

As illustrated in FIG. 47B, the mirror surface 11' is formed on the silicon layer 301. The technique of forming the mirror surface 11' is similar to that of the first embodiment.

Figure 47C:
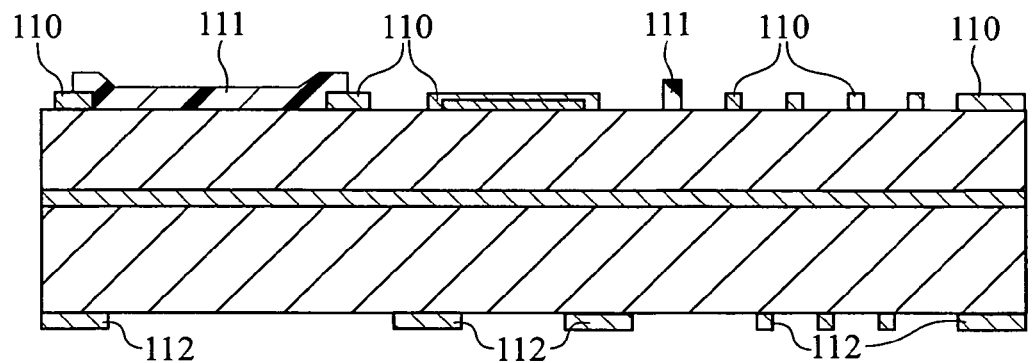

As illustrated in FIG. 47C, the oxide film pattern 110 and the resist pattern 111 are formed on the silicon layer 301. Furthermore, the oxide film pattern 112 is formed on the silicon layer 302. The shape and technique of forming patterns of the oxide film patterns 110 and 112, and the resist pattern 111 are similar to those of the first embodiment.

Figure 47D:
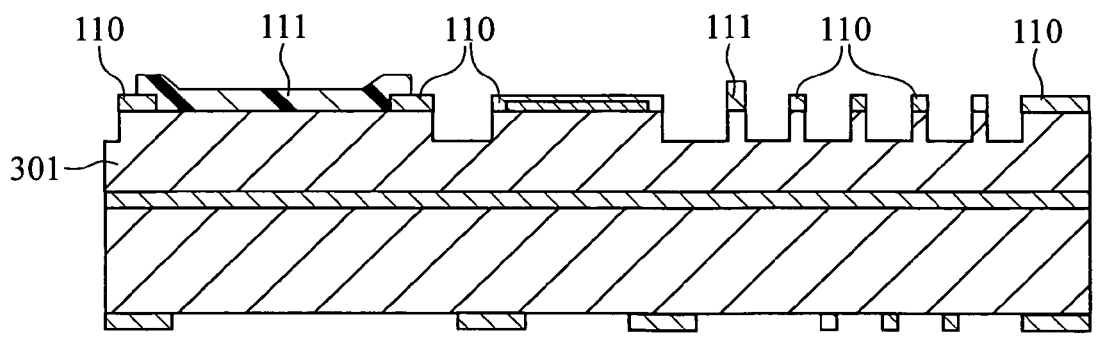

As illustrated in FIG. 47D, the silicon layer 301 is subjected to etching by means of DRIE to a specific depth using the oxide film pattern 110 and resist pattern 111 as a mask. The specific depth may be a depth of, for example, 5 μm corresponding to the thicknesses of the coupling sections C1 and C2.

Figure 48A:
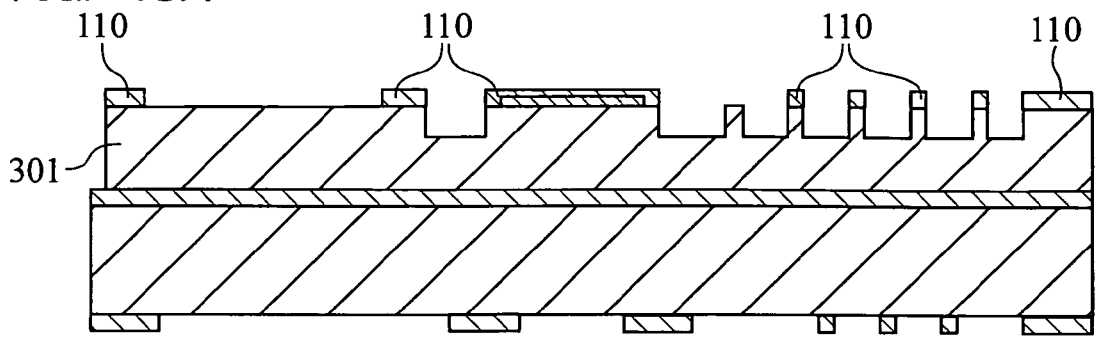
FIGS. 48A-48D illustrate manufacturing processes following FIG. 47.

As illustrated in FIG. 48A, the resist pattern 111 is removed. For example, the resist pattern 111 may be peeled off by exposing the resist pattern 111 to a peeling liquid.

Figure 48B:
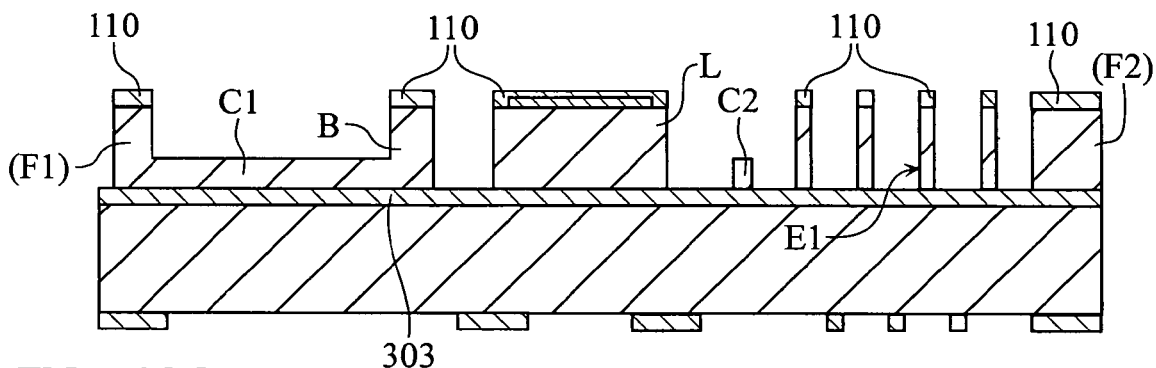

As illustrated in FIG. 48B, the silicon layer 301 is subjected to etching by means of DRIE using the oxide film pattern 110 as a mask. In this case, the coupling sections C1 and C2 are kept. In this process, the land section L, the beam section B, the electrode E1, part of the frame F1 (first layer section 21 of the frame 20), part of the frame F3 (first layer section 31 of the frame 30), and the coupling sections C1 and C2 are formed.

Figure 48C:
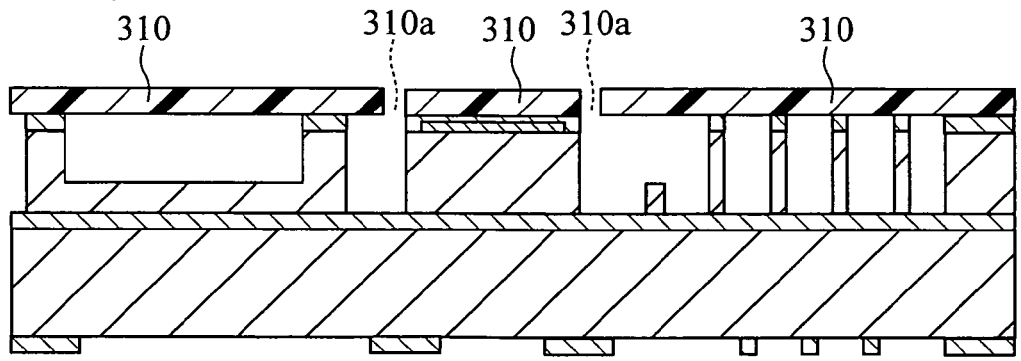

As illustrated in FIG. 48C, a resist pattern 310 is formed on the silicon layer 301 side of the material substrate 300. The resist pattern 310 has openings 310a that extend along the edge opposed to the frame F2 (extending portion 20A of the frame 20) in the land section L (land section 11). When the resist pattern 310 is formed, a resist film is pasted to the silicon layer 301 of the material substrate 300. The resist film is patterned.

Figure 48D:
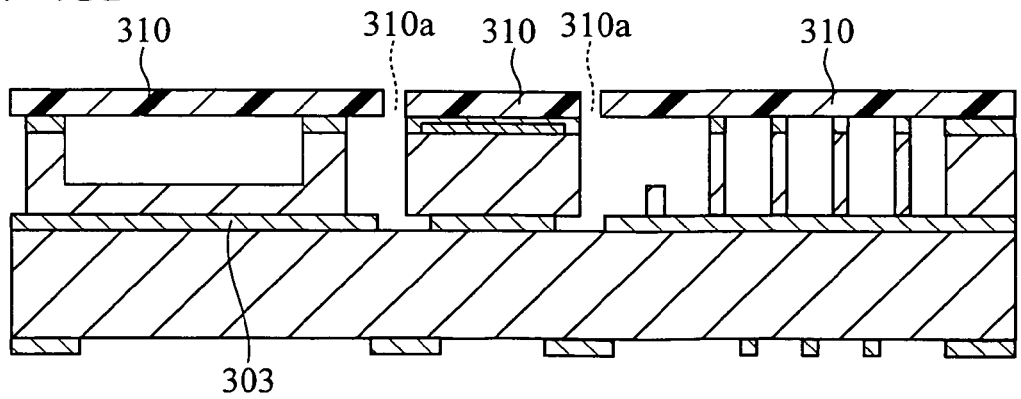

As illustrated in FIG. 48D, the insulating layer 303 is subjected to etching using the resist pattern 310 as a mask. Dry etching or wet etching may be adopted as an etching technique. When dry etching is adopted, CF4, CHF3 or the like is used as an etching gas. When wet etching is adopted, a buffered fluorinated acid (BHF) including, for example, fluorinated acid and ammonium fluoride is used as an etching liquid.

Figure 49A:
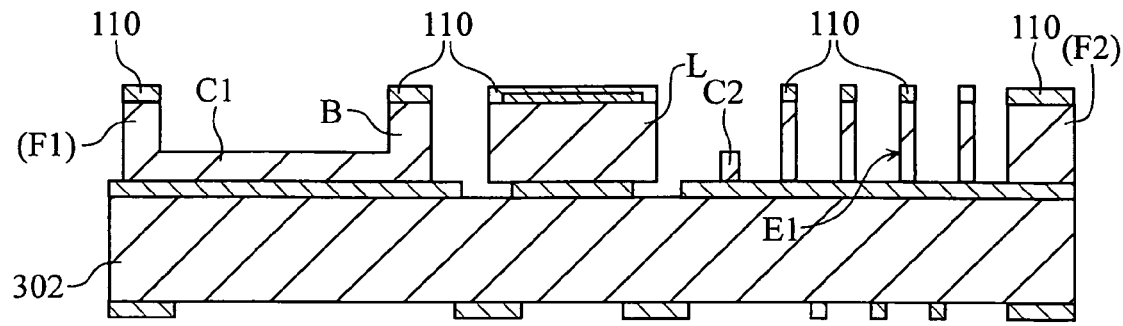
FIGS. 49A-49C illustrate manufacturing processes following FIG. 48.

As illustrated in FIG. 49A, the resist pattern 310 is removed. For example, the resist pattern 310 may be peeled off by causing the resist pattern 310 to be exposed to a peeling liquid.

Figure 49B:
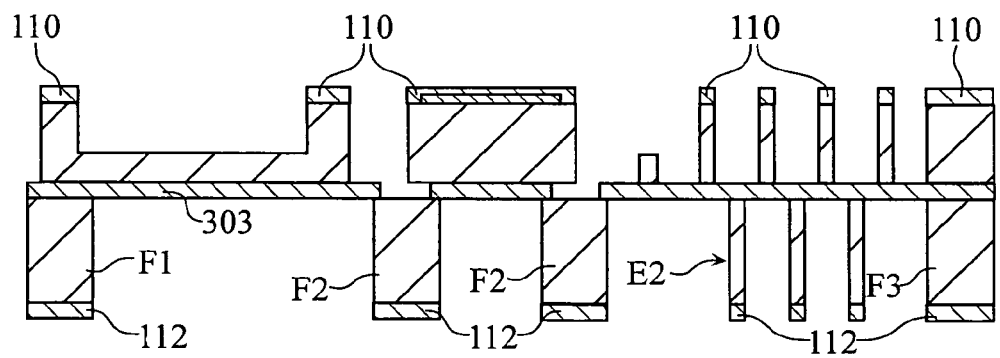

As illustrated in FIG. 49B, the silicon layer 302 is subjected to etching by means of DRIE using the oxide film pattern 112 as a mask. In this process, part of the frame F1 (second layer section 22 of the frame 20), frame F2 (extending portion 20A as part of the second layer section 22 of the frame 20), part of the frame F3 (second layer section 32 of the frame 30), and the electrode E2 are formed.

Figure 49C:
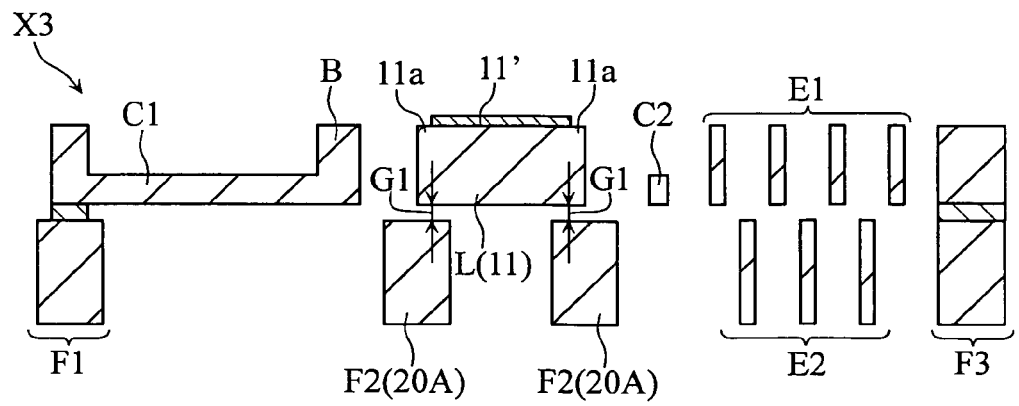

As illustrated in FIG. 49C, the exposed section of the insulating layer 303 and the oxide film patterns 110 and 112 are removed by etching. The etching technique is similar to that of the first embodiment.

Through the above described processes, the micro oscillating device X3 including the land section L, beam section B, frames F1, F2 and F3, coupling sections C1 and C2, and a set of electrodes E1 and E2 are manufactured.

The distance G1 between the opposed section 11a of the land section 11 of the oscillating section 10 and the extending portion 20A of the second layer section 22 of the frame 20 of the micro oscillating device X3 manufactured using this method is approximately equal to the thickness of the insulating layer 303 (intermediate layer) of the material substrate 300. In the present embodiment, the distance G1 may be set with high accuracy.

The micro oscillating devices X1 to X3 included in the above described micro oscillating device arrays Y1 to Y3 may also be so-called one-axis-type oscillating devices. When the micro oscillating devices X1 to X3 are one-axis-type oscillating devices, a structure of fixing the frame 20 to the frame 30 is adopted. Furthermore, the electrode sections 70 and 80 need not be provided.

The above described micro oscillating devices X1 to X3 may also be adopted as a micro mirror device included in an optical switching apparatus.

FIG. 50 is a diagram of a spatial-optical coupling type optical switching apparatus 400 according to a fourth embodiment. The optical switching apparatus 400 includes a pair of micro mirror array units 401 and 402, an input fiber array 403, an output fiber array 404, and a plurality of micro lenses 405 and 406. The input fiber array 403 includes a plurality of input fibers 403a. The micro mirror array unit 401 is provided with a plurality of micro mirror devices 401a corresponding to respective input fibers 403a. The output fiber array 404 includes a plurality of output fibers 404a. The micro mirror array unit 402 is provided with a plurality of micro mirror devices 402a corresponding to respective output fibers 404a. The micro mirror devices 401a and 402a each include a mirror surface to reflect light. The micro mirror devices 401a and 402a are configured to be able to control the orientations of the mirror surfaces. At least one of the above described micro oscillating devices X1 to X3 may be adopted for the micro mirror devices 401a and 402a. At least one of the micro oscillating device arrays Y1 to Y3 corresponds to the micro mirror array units 401 and 402. The plurality of micro lenses 405 are opposed to respective ends of the input fibers 403a. Furthermore, the plurality of micro lenses 406 are opposed to respective ends of the output fibers 404a.

In the optical switching apparatus 400, light L1 outgoing from the input fiber 403a passes through the corresponding micro lens 405. This causes the light L1 to become parallel light and travel toward the micro mirror array unit 401. The light L1 is reflected by the corresponding micro mirror device 401a and deflected toward the micro mirror array unit 402. In this case, the direction of the mirror surface of the micro mirror device 401a is adjusted so as to allow the light L1 to be incident upon the desired micro mirror device 402a. Next, the light L1 is reflected by the micro mirror device 402a and deflected toward the output fiber array 404. In this case, the direction of the mirror surface of the micro mirror device 402a is adjusted so as to allow the light L1 to be incident upon the desired output fiber 404a.

Thus, according to the optical switching apparatus 400, the light L outgoing from each input fiber 403a arrives at the desired output fiber 404a after being deflected by the micro mirror array units 401 and 402. That is, the input fiber 403a and the output fiber 404a are connected in a one-to-one correspondence. The output fiber 404a at which the light L1 arrives is switched by changing the angles of deflection at the micro mirror devices 401a and 402a as appropriate.

Examples of characteristics required for an optical switching apparatus include a large capacitance, high speed, and high reliability. From these standpoints, a micro mirror device manufactured using a micro machining technique is preferable as the switching device incorporated in an optical switching apparatus. This is because the use of the micro mirror device allows switching processing with the same light signal without converting the light signal to an electric signal between a light transmission path on the input side of the optical switching apparatus and a light transmission path on the output side and is therefore suitable in acquiring the above described characteristics.

FIG. 51 is a diagram of a wavelength selection-type optical switching apparatus 500 according to a fifth embodiment. The optical switching apparatus 500 includes a micro mirror array unit 501, one input fiber 502, for example, three output fibers 503, a plurality of micro lenses 504a and 504b, a spectroscope 505, and a condensing lens 506. The micro mirror array unit 501 includes a plurality of micro mirror devices 501a. The plurality of micro mirror devices 501a are arranged, for example, in a row on the micro mirror array unit 501. Each micro mirror device 501a includes a mirror surface to reflect light. Each micro mirror device 501a is configured to be able to control the orientation of the mirror surface. At least one of the above described micro oscillating devices X1 to X3 is adopted as a micro mirror device 501a. At least one of the above described micro oscillating device arrays Y1 to Y3 may be adopted as the micro mirror array unit 501. The micro lens 504a is opposed to an end of the input fiber 502. The micro lens 504b is opposed to an end of the output fiber 503. The spectroscope 505 is a reflection-type diffraction grating in which the degree of diffraction of reflected light varies from one wavelength to another.

In the optical switching apparatus 500, light L2 (in which a plurality of wavelengths are mixed) outgoing from the input fiber 502 is transformed into parallel light by passing through the micro lens 504a. This light L2 is reflected by the spectroscope 505 (the light L2 is reflected at angles differing from one wavelength to another). The reflected light passes through the condensing lens 506. The reflected light is condensed toward the corresponding micro mirror device 501a at the micro mirror array unit 501 for each wavelength. Light of each wavelength is reflected by the corresponding micro mirror device 501a in a specific direction. In this case, the direction of the mirror surface of the micro mirror device 501a is adjusted so as to allow light of the corresponding wavelength to arrive at the desired output fiber 503. The light reflected by the micro mirror device 501a then is incident upon a selected output fiber 503 via the condensing lens 506, the spectroscope 505, and the micro lens 504b. Thus, the optical switching apparatus 500 may select light of a desired wavelength from the light L2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A micro-movable device comprising:
a frame;
a movable section including a body section; and
a torsion coupling section for coupling the frame with the movable section to define a first axis of oscillation of the movable section,
wherein the frame includes a first extending portion and a second extending portion, both parallel to the first axis and extending along the body section, separated from the body section by a gap and separated from each other by a distance that is smaller than a length of the body section in a direction parallel to the first axis.

2. The micro-movable device according to claim 1, wherein the first extending portion and the second extending portion are provided between ends of the body section in the direction parallel to the first axis.

3. The micro-movable device according to claim 1, wherein the movable section further includes a first electrode section and a beam section for coupling the first electrode section with the body section, and
the torsion coupling section is coupled to the beam section of the movable section,
the frame further includes a second electrode section for generating a drive force of the oscillation of the movable section in cooperation with the first electrode section.

4. The micro-movable device according to claim 3, wherein the first electrode section and the second electrode section include a comb electrode structure made up of a plurality of electrode teeth arranged parallel to each other.

5. The micro-movable device according to claim 3, wherein the frame includes a third extending portion and a fourth extending portion, both parallel to the first axis and extending along the first electrode section, and a distance between the third extending portion and the fourth extending portion is greater than the length of the first electrode section in a direction parallel to the first axis.

6. The micro-movable device according to claim 5, wherein the distance between the first extending portion and the second extending portion in the frame is smaller than the distance between the third extending portion and the fourth extending portion.

7. The micro-movable device according claim 1, wherein the micro-movable device is manufactured by processing a material substrate including a first layer, a second layer, and an intermediate layer between the first layer and the second layer,
the body section includes a part derived from the first layer and the part derived from the first layer includes a first opposed section opposed to the first extending portion and a second opposed section opposed to the second extending portion,
the first extending portion and the second extending portion are derived from the second layer,
the distance between the first opposed section and the first extending portion is equal to or greater than the thickness of the intermediate layer, and
the distance between the second opposed section and the second extending portion is equal to or greater than the thickness of the intermediate layer.

8. The micro-movable device according to claim 1, wherein the first opposed section and the second opposed section of the body section are derived from a partially thin-walled portion in which a surface on the intermediate layer side is retracted from the intermediate layer in the first layer.

9. The micro-movable device according to claim 7, wherein the first extending portion and the second extending portion are derived from a partially thin-walled portion in which a surface on the intermediate layer side retracts from the intermediate layer in the second layer.

10. The micro-movable device according to claim 1, further comprising an additional frame and an additional torsion coupling section for coupling the additional frame with the frame to define a second axis of oscillation of the frame.

11. A micro-movable device array comprising:
a plurality of micro-movable devices, each micro-movable device comprising:
a frame;

a movable section including a body section; and a torsion coupling section for coupling the frame with the movable section to define an axis of oscillation of the movable section, wherein the frame includes a first extending portion and a second extending portion, both parallel to the axis and extending along the body section, separated from the body section by a gap and separated from each other by a distance that is smaller than a length of the body section in a direction parallel to the first axis.

12. An optical switching apparatus comprising a plurality of micro mirror devices, each micro mirror device comprising:

a frame;

a movable section including a body section; and a torsion coupling section for coupling the frame with the movable section to define an axis of oscillation of the movable section; and a mirror section formed in the movable section, wherein the frame includes a first extending portion and a second extending portion, both parallel to the axis and extending along the body section, separated from the body section by a gap and separated from each other by a distance that is smaller than a length of the body section in a direction parallel to the first axis.

* * * * *

UNITED STATES PATENT AND TRADEMARK OFFICE
CERTIFICATE OF CORRECTION

| | |
|---|---|
| PATENT NO. | : 8,320,035 B2 |
| APPLICATION NO. | : 12/458601 |
| DATED | : November 27, 2012 |
| INVENTOR(S) | : Osamu Tsuboi et al. |

Page 1 of 1

It is certified that error appears in the above-identified patent and that said Letters Patent is hereby corrected as shown below:

Column 24, Line 50, In Claim 8, delete "claim 1," and insert -- claim 7, --, therefor.

Signed and Sealed this
Nineteenth Day of February, 2013

Teresa Stanek Rea
*Acting Director of the United States Patent and Trademark Office*